United States Patent
Shimizu et al.

(10) Patent No.: US 6,236,488 B1
(45) Date of Patent: May 22, 2001

(54) OPTICAL PULSE POSITION DETECTING CIRCUIT AND AN OPTICAL PULSE GENERATING APPARATUS AND THEIR METHODS

(75) Inventors: Katsuhiro Shimizu; Takashi Mizuochi; Takeshi Komiya; Kiwami Matsushita; Tadayoshi Kitayama; Masatoshi Suzuki; Hidenori Taga; Shu Yamamoto; Noboru Edagawa; Itsuro Morita, all of Tokyo (JP)

(73) Assignees: Mitsubishi Denki Kabushiki Kaisha; Kokusai Denshin Denwa Co., Ltd, both of Tokyo (JP)

( * ) Notice: Subject to any disclaimer, the term of this patent is extended or adjusted under 35 U.S.C. 154(b) by 0 days.

(21) Appl. No.: 09/052,072

(22) Filed: Mar. 31, 1998

(30) Foreign Application Priority Data

Mar. 31, 1997 (JP) .................................... 9-080069
Aug. 8, 1997 (JP) .................................... 9-214215

(51) Int. Cl.[7] .................................... H04B 10/04

(52) U.S. Cl. .................... 359/187; 359/181; 359/158

(58) Field of Search .................. 359/181, 183, 359/158

(56) References Cited

U.S. PATENT DOCUMENTS

| 4,794,598 | 12/1988 | Desurvire et al. |
|---|---|---|
| 5,361,130 | 11/1994 | Kersey et al. |
| 5,513,030 | 4/1996 | Epworth . |
| 5,557,406 | 9/1996 | Taylor et al. |
| 5,574,588 | 11/1996 | Kawanishi et al. |
| 5,726,789 | * 3/1998 | Horiuchi et al. .................... 359/184 |
| 5,872,647 | * 2/1999 | Taga et al. .................... 359/184 |
| 5,912,755 | * 6/1999 | Bergano .................... 359/181 |

FOREIGN PATENT DOCUMENTS

| 2001928A | 8/1990 | (JP) . |
|---|---|---|
| 5323245A | 7/1993 | (JP) . |
| 9102776A | 4/1997 | (JP) . |

OTHER PUBLICATIONS

Japanese Abstract: JPA63–144307, Jan. 8, 1990, Manufacture of Matrix Type Display Device.

The 1996 Institute of Electronics, Information and Communication, Engineers (IEICE) General Conference B–1118, Optical Time–Division–Multiplexer Based on Modulation Signal to Optical Modulators, Shoko Ohteru et al, pps 1–4 w/figures 1–7.

The 1996 Institute of Electronics, Information and COmmunication Engineers (IEICE) General Conferences, B–1121, A Control Method of Phase Between Ultrashort Optical Pulses and Modulcation Data Inforamtion, Tazuko Tomioka, et al, pps 1–3 w/figures 1–3.

* cited by examiner

Primary Examiner—Leslie Pascal
Assistant Examiner—Hanh Phan

(57) ABSTRACT

Detection of an optical pulse position uses an optical pulse string with a determined repetitive ratio and an electric clock signal with a same frequency as the repetitive ratio of the optical pulse string. A phase of the electric clock signal oscillator is shifted and supplied to an optical modulator. The optical modulator modulates the optical pulse string based on the electric clock signal and outputs a modulated optical signal. A photo detector converts the modulated optical signal output from the optical modulator to an electric signal. The phase shift amount of the electric clock signal is controlled to maximize an output from the photo detector. Additionally, a dither signal may be used in the control of the phase shift, more than the optical modulator may be employed, and/or more than color light source may be employed. The use of at least one of feed forward and feedback control provided by maximizing an output of the photo detector allows an optical pulse having a short width to be realized.

20 Claims, 46 Drawing Sheets

APPLIED VOLTAGE VS. TRANSMITTANCY RATE IN OPTICAL MODULATOR

OPTICAL PULSE POSITION DETECTING CIRCUIT AND AN OPTICAL PULSE GENERATING APPARATUS AND THEIR METHODS

BACKGROUND OF THE INVENTION

1. Field of the Invention

This invention relates to an optical transmission system, particularly to an optical time division multiplexing technique. This invention can be applied to, a measuring system, particularly to a temperature sensor and a pressure sensor.

2. Description of the Related Art

In an optical transmission system according to the related art, a transmitting apparatus performs TDM (Time Division Multiplexing) of a plurality of low-speed signals by processing in an electronic circuit and generates high-speed signals. A receiving apparatus or a node performs DEMUX (Demultiplexing) of the high-speed signals by processing in an electronic circuit and regenerates the low-speed signals. A transmission system with a transmission level of 10 Gb/s (bits per second) has been already realized by adopting the TDM technique in an electronic circuit. However, a processing speed of the electronic circuit is likely to become a bottle neck for a future transmission system with a larger capacity. Therefore, the time division multiplexing technique (optical TDM technique) for performing optical processing is currently under intense studies.

According to the optical TDM technique, an optical signal is processed without being converted to an electric signal. Optical pulse strings inputted from various transmission lines must be multiplexed synchronously. However, the optical pulse strings are transmitted in the transmission lines at different transmission rates depending on environmental factors such as a temperature, etc. Further, pulse positions (phases) of inputted optical pulse strings change constantly. Therefore, it is necessary to provide a method for detecting the pulse positions. The pulse positions are relative time relationships of standard clock signals with repetitive frequencies of the optical pulse strings and inputted pulses.

A technique for detecting a pulse position is disclosed by Ohteru, et. al.

A block chart in "Optical Time-Division-Multiplexer Based on Modulation Signal to Optical Modulators," B-1118 in Proceedings of the 1996 Institute of Electronics, Information and Communication Engineers (IEICE) General Conference is revised in FIG. 43.

In FIG. 43, an optical pulse string input terminal 1, an optical multiplexer 2, an optical modulator 3 for modulating an optical power level, a phase shifter 4, an oscillator 5, optical power meters 6a and 6b for detecting power levels of optical signals and a transmittancy rate detector 7 are illustrated.

In FIG. 43, an optical pulse string is inputted from the optical pulse string input terminal 1 and multiplexed into two transmission lines by the optical multiplexer 2. A first output from the optical multiplexer 2 is inputted to the first optical power meter 6a and a second output from the optical multiplexer is inputted to the optical modulator 3. A standard clock signal outputted from the oscillator 5 drives the optical modulator 3 via the phase shifter 4. An optical signal outputted from the optical modulator 3 is inputted to the second power meter 6b. The transmittancy rate detector 7 performs a comparative operation of outputs from the first and second optical power meters 6a and 6b, and detects a transmittancy rate of a pulse in the optical modulator. Since the comparative operation of the outputs from the first and second power meters 6a and 6b is performed, even if the optical power level of the inputted optical pulse string fluctuates, the transmittancy rate in the optical modulator 3 can be measured. As discussed below, the transmittancy rate of a pulse in the optical modulator is determined from a phase of a clock signal for driving the optical modulator and a position (phase) of an optical pulse string inputted to the optical modulator. Therefore, a pulse position can be known from the transmittancy rate. The phase shifter 4 is controlled manually to increase a value of the transmittancy rate. Accordingly, the phase of the inputted optical pulse and the phase of the standard clock signal can be synchronized.

An operation of FIG. 43 is discussed with reference to FIG. 44.

In FIG. 44, pulse positions (a) in an optical pulse string inputted to the optical modulator 3 are illustrated. A relation (b) of a time and a transmittancy rate in the optical modulator 3 is also shown. The relation corresponds to the clock signal which drives the optical modulator 3. A relation (c) of a time and a transmittancy rate of a pulse is also shown.

In FIG. 44, three pulse positions (a) of pulse 1, pulse 2 and pulse 3 in the optical pulse string correspond to transmittancy rates 1, 2 and 3 in (c). Since the pulse positions and the transmittancy rates correspond, the pulse positions can be known by detecting the transmittancy rates.

In technique illustrated in FIG. 43, it is assumed that a pulse position detector is provided as an error signal detecting circuit for controlling pulse positions. Therefore, it is not necessary to detect an accurate pulse position. It is only necessary to detect a sign relationship (left-or-right from position A in (b) of FIG. 44) of the detected pulse position.

However, when it is necessary to detect the pulse positions accurately, following problems arise from the technique illustrated in FIG. 43. As apparent from (c) of FIG. 44, the transmittancy rates 1, 2 and 3 correspond to pulses 1', 2' and 3' as well as pulses 1, 2 and 3. A range for detecting positions is limited to field T in (b) of FIG. 44. Since the transmittancy rate in the optical modulator corresponds to two phase shift amounts, it is difficult to optimize the phase shift amounts. As shown in (c) of FIG. 44, the relation of the transmittancy rate and the pulse position is not a straight-line but a sine function curve, a complicated operation circuit is necessary to detect the accurate pulse positions.

It is necessary to detect the accurate pulse positions to simplify a controlling circuit of the pulse positions and to perform more complicated optical processing. Detection of the accurate pulse positions is also necessary for various sensors that utilize changes of a transmission delay time in transmission lines.

Another technique for detecting a pulse position is disclosed in Japanese Unexamined Published Patent Application HEI 2-1828. FIG. 1 in HEI 2-1828 is revised in FIG. 45 for this specification.

In FIG. 45, the optical pulse string input terminal 1, an optical demultiplexer 33, a fully-optical modulator 43 for modulating an optical pulse string with an optical clock pulse and a photo detector 8 are illustrated. In FIG. 45, an optical delayer controlling circuit 34, an optical clock pulse generating circuit 44, an optical delayer 24 and a phase shift amount output terminal 10 are also illustrated. An optical signal is inputted from the optical pulse string input terminal 1 and inputted to the photo detector 8 via the fully-optical modulator 43. Then, the photo detector 8 outputs a signal to the optical clock pulse generating circuit 44, and the optical clock pulse generating circuit 44 outputs an optical clock pulse. The optical delayer 24 delays the optical clock pulse and the optical demultiplexer 33 inputs the delayed optical clock pulse to the fully-optical modulator 43. The fully-optical modulator 43 is designed to have a higher transmittancy rate when an optical signal with a higher power is inputted. Therefore, when phases of the optical signal inputted from the optical pulse string input terminal 1 and the optical clock pulse synchronize, the photo detector 8 detects a maximum optical power. When the optical delayer 24 is controlled to maximize the output from the photo detector 8, the optical clock pulse synchronizes with the inputted optical pulse. A pulse position of the inputted optical pulse string can be detected by monitoring an amount of delay for the optical delayer 24 from the phase shift amount output terminal 10.

In the technique illustrated in FIG. 45, the optical clock pulse generating circuit 44 needed to detect an accurate pulse position is complicated. In particular, the optical clock pulse generating circuit 44 needs to output an optical clock pulse synchronized with an inputted optical signal. However, it is not desirable that such a complicated optical clock pulse generating circuit 44 is provided only to detect the pulse position. Besides, even though some embodiments of the fully-optical modulator 43 are known, they are not available in a market. Further, it is difficult to produce the optical delayer 24 for controlling a longer delay time more accurately than an electric delayer (phase shifter).

An importance of realizing a short pulse generating circuit according to the optical TDM technique is discussed. The short pulse is an optical pulse with a short pulse width.

When a transmission capacity increases, an optical pulse with a shorter pulse width is required. Therefore, generation of the short pulse is important in the optical TDM technique. For example, in a transmission system with a transmission capacity of 20 Gb/s according to the optical TDM technique, an optical pulse with a pulse width of 20 ps (pico second) or less is necessary. In a transmission system with a transmission capacity of 100 Gb/s, an optical pulse with a pulse width of 4 ps or less is necessary.

One known pulse generation method uses an optical modulator which includes a pulse type gate. A technique of connecting optical modulators which include pulse type gates in multi-layers and thinning an effective gate width to generate a short pulse is disclosed in "Super High Speed Optical Technique, 2. Chapter 2," by Tatsuo Yajima, Maruzen Co.

In order to generate the short pulse by connecting the optical modulators in multi-layers, it is necessary to balance a phase of an electric signal for driving each of the optical modulators with a phase of an optical pulse inputted to each of the optical modulators.

Generally, optical amplifiers are provided between the optical modulators to compensate an insertion loss to each of the optical modulators. However, since the optical signals are transmitted at different transmission rates in the optical amplifiers and the transmission lines depending on environmental temperatures, it is difficult to balance the phases of the electric signal and the optical pulse without providing a system for absorbing a fluctuation in a delay time of the optical signal.

A technique for balancing the phases is disclosed by Tomioka, et. al.

A block chart in "A Control Method of Phase between Ultrashort Optical Pulses and Modulation Data," B-1121 in Proceedings of the 1996 Institute of Electronics, Information and Communication Engineers (IEICE) General Conference is revised for FIG. 46.

In FIG. 46, a light source 26, a first optical modulator 3a, an optical amplifier 29, a second optical modulator 3b, RF (Radio Frequency) amplifiers 28a and 28b, the phase shifter 4, and the oscillator 5 are illustrated. In FIG. 46, a 2:1 multiplexing circuit 32, a pulse pattern generator 31, the optical multiplexer 2, a modulation light output terminal 30 and an optical power meter 6 are also shown.

Operations are performed as follows.

A clock signal is outputted from the oscillator 5 and branched to the pulse pattern generator 31 and the phase shifter 4. A phase of the clock signal is shifted by the phase shifter 4 and amplified by the RF amplifier 28a. The amplified clock signal is inputted to the optical modulator 3a. The optical modulator 3a modulates an optical signal outputted from the light source 26 by the clock signal outputted from the RF amplifier 28a, and outputs an optical pulse. The optical pulse outputted from the optical modulator 3a is amplified by the optical amplifier 29 and inputted to the second optical modulator 3b. An output from the pulse pattern generator 31 is RZ (Return to Zero) encoded by the 2:1 multiplexing circuit 32, and amplified by the RF amplifier 28b. A RZ signal synchronized with the clock signal outputted from the oscillator 5 is inputted from the RF amplifier 28b to the second optical modulator 3b. The second optical modulator 3b modulates the optical pulse outputted from the optical amplifier 29 with the RZ signal outputted from the RF amplifier 28b. At this time, it is necessary that the optical pulse inputted to the optical modulator 3b and the RZ signal are synchronized.

A part of an output from the optical modulator 3b is branched by the optical multiplexer 2 and inputted to the optical power meter 6.

An operation principle is discussed with reference to FIG. 47. A relation between the phase shift amount of the phase shifter 4 and the transmittancy rate in the optical modulator 3b is shown in (b). In (b) of FIG. 47, when the optical pulse inputted to the optical modulator 3b and the RZ signal are synchronized, the phase amount is a phase shift amount 2. When the phase shift amount is too small (phase shift amount 1) or too large (phase shift amount 3), the transmittancy rate in the optical modulator 3b decreases. Therefore, a phase relation of the optical pulse inputted to the optical modulator 3b and the RZ signal can be optimized by controlling the phase shift amount of the phase shifter 4 manually to maximize an optical power level of the output from the optical power meter 6.

The technique illustrated in FIG. 46 is not intended to generate a short pulse but to generate a RZ modulated optical signal. Therefore, the optical modulator-3b is driven by the RZ signal. However, when the RZ signal for driving the optical modulator 3b is in an ideal short wave, the phase shift amount cannot be measured from the transmittancy rate in the optical modulator 3b. Further, even if it is intended to generate a proper pulse waveform, since the relation between the transmittancy rate and the pulse position is not a straight-line but a sine function curve, a change ($\Delta P$) of the transmittancy rate in the optical modulator 3b against a change ($\Delta \Phi$) of the phase shift amount becomes smaller around the optimal phase shift amount (phase shift amount 2). Hence, a control accuracy drops. Besides, since the transmittancy rates in optical modulators correspond to two phase shift amounts as in technique illustrated in FIG. 43, it is difficult to optimize the phase shift amount in the technique illustrated in FIG. 46. Further, a comparison of the outputs from the first optical power meter 6a and the second optical power meter 6b is not performed in the configuration illustrated in FIG. 46 differing from the configuration illustrated in FIG. 43. Therefore, when one of the optical power outputted from the light source 26, the transmittancy rate in the optical modulator 3a and a gain of the optical amplifier 29 is changed, it becomes impossible to measure the transmittancy rate in the optical modulator 3b.

In a long distance optical amplifying relay transmission system, it is well known that an optical S/N ratio (Optical Signal to Noise Ratio) deteriorates or fluctuates by polarization hole burning in an optical amplifying delayer and a polarization reliance loss in transmission lines. In order to improve the optical S/N ratio, polarization scramble is performed. The polarization scramble is a method for transmitting a signal by switching two kinds of independent polarizations from time to time. The polarization scramble is performed one or more times for a signal of one bit. Particularly, the polarization scramble must be performed at a speed of a signal bit rate or higher to average out a fluctuation (signal fading) of the optical S/N ratio. Generally, a Lithium Niobate optical phase modulator is used to perform polarization scramble.

Particularly, in the polarization scramble, phase modulation occurs simultaneously with polarization modulation. It is published in Japanese Unexamined Published Patent Application HEI 8-111662 that the polarization scramble is used to compensate wave-form deterioration due to dispersion of transmission lines (differences in optical transmission rates according to frequencies based on transmission line characteristics). In HEI 8-111662, a polarization scrambler must be driven by a data clock synchronized with a data fluctuation bit. Therefore, it is discussed that a significant improvement in a sign error rate in a super long distance optical amplifying relay transmission system across the ocean. Hence, when a determined relation between a phase of a driving signal of the polarization scrambler and a phase of a data is maintained, an opening of an eye can be further enlarged to an advantage for distinguishing a signal, even if a fiber dispersion (differences in transmission rates of light according to frequencies based on fiber characteristics) and an amplitude fluctuation at an input terminal by fluctuation of non-linear refractive index occur.

FIG. 43 illustrates a technique for controlling phases between the optical modulators based on optical power level. However, since two pulse positions are assumed from a transmittancy rate, it is impossible to know a direction of the phase shift only from the optical power level. Further, since the phase shifter is controlled manually, it is difficult to control the phases between the optical modulators automatically reflecting a change in a transmission line length between the optical modulators which fluctuates from time to time. Further, since the relation between the transmittancy rate and the pulse position is not a straight-line, a complicated operation circuit is necessary.

FIG. 45 illustrates another technique for detecting the pulse position. However, a complicated optical clock pulse generating circuit, a fully-optical modulator which is difficult to obtain and an accurate optical delayer which is difficult to be controlled are necessary.

FIG. 46 illustrates a technique for solving a phase balancing problem caused by fluctuation in a delay time to generate an optical pulse. However, in this technique, a control accuracy drops around an optimal phase shift amount. Further, when an optical signal power changes, it becomes impossible to measure a transmittancy rate in the optical modulator. Further, since two phase shift amounts are assumed from a transmittancy rate in an optical modulator as in the technique illustrated in FIG. 43, it is difficult to optimize the phase shift amount.

In HEI 8-111662, an effect of synchronizing a driving signal of the polarization scrambler and a data is discussed. However, a solution for disturbance in synchronization (a fluctuation of a transmission delay time of a fiber due to a temperature fluctuation, for example) is not disclosed. In HEI 8-111662, a circuit configuration for detecting a phase of a data signal inputted to the polarization scrambler and driving the polarization scrambler in an optimal synchronized phase is not disclosed.

SUMMARY OF THE INVENTION

This invention is intended to solve the above mentioned problems in the related art.

Primarily, this invention is intended to provide an optical pulse position detecting circuit for detecting a pulse position without a complicated operation circuit.

Secondly, this invention is intended to provide an accurate optical pulse position detecting circuit without using an optical clock pulse generating circuit, a fully-optical modulator and an optical delayer.

Thirdly, this invention is intended to provide an optical pulse generating apparatus for generating an optical pulse by optimizing a phase shift amount.

Fourthly, this invention is intended to provide an optical pulse generating apparatus for outputting a plurality of short pulses with different wavelengths simultaneously.

Fifthly, this invention in intended to provide a pulse generating apparatus for modulating synchronously with an optical pulse.

According to one aspect of this invention, an optical pulse position detecting circuit comprises an optical pulse string input terminal receiving an optical pulse string with a determined repetitive ratio, an oscillator for outputting an electric clock signal with a same frequency as the repetitive ratio of the optical pulse string, a phase shifter for receiving the electric clock signal outputted from the oscillator, shifting a phase of the electric clock signal, and outputting a shifted electric clock signal, an optical modulator for receiving the shifted electric clock signal outputted from the phase shifter and the optical pulse string received by the optical pulse string input terminal, modulating the optical pulse string based on the electric clock signal and outputting a modulated optical signal, a photo detector for converting the modulated optical signal outputted from the optical modulator to an electric signal and outputting the electric signal, a phase controlling circuit for receiving the electric signal outputted from the photo detector and controlling a phase shift amount of the phase shifter to maximize an output from the photo detector, and a phase shift amount output terminal for outputting the phase shift amount of the phase shifter.

According to another aspect of this invention, an optical pulse generating circuit comprises a light source for outputting an optical signal with a determined wavelength, an oscillator for outputting an electric clock signal with a determined frequency, a first optical modulator connected to the oscillator for modulating a power of the optical signal based on an electric clock signal and outputting a first modulated optical signal, a second optical modulator for modulating a power of the first modulated optical signal outputted from the first optical modulator based on the electric clock signal and outputting a second modulated optical signal, an optical multiplexer, receiving one of the first modulated optical signal and the second modulated optical signal, outputting a part of the optical signal and branching a part of the optical signal, a photo detector for converting the optical signal multiplexed by the optical multiplexer to an electric signal, a phase changing unit for changing a phase of the signal, and a controlling circuit for receiving the electric signal outputted from the photo detector and controlling a phase change amount of the phase changing unit to maximize the output from the photo detector.

According to another aspect of this invention, an optical pulse position detecting method comprises inputting an optical pulse string with a determined repetitive ratio, oscillating an electric clock signal with a same frequency with the repetitive ratio of the optical pulse string and outputting an oscillated electric clock signal, shifting a phase of the oscillated electric clock signal and outputting a shifted electric clock signal, modulating the optical pulse string based on the shifted electric clock signal, converting the optical signal outputted from the modulating step to an electric signal and outputting the electric signal, controlling, in response to the electric signal, a phase shift amount in the shifting step to maximize the electric signal outputted from the converting step, and outputting the phase shift amount for the shifting step.

According to another aspect of this invention, an optical pulse generating method comprises outputting an optical signal with a determined wavelength, outputting an electric clock signal with a determined frequency, first modulating a power of the optical signal based on the electric signal and outputting a first modulated optical signal, second modulating a power of the first modulated optical signal based on the electric signal and outputting a second modulated optical signal, multiplexing one of the first modulated optical signal and the second modulated optical signal, outputting a part of a multiplexed optical signal and branching a part of the multiplexed optical signal, converting the multiplexed optical signal to an electric signal, changing a phase of the optical signal, and controlling, in accordance with the electric signal, a phase change amount in the changing step to maximize the electric signal outputted from the converting step.

According to another aspect of this invention, an optical pulse generating apparatus comprises a light source for outputting an optical signal with a determined wavelength, an oscillator for outputting an electric clock signal with a determined frequency, a first optical modulator connected to the oscillator for modulating a power of the optical signal with the electric clock signal and outputting a first modulated optical signal, a second optical modulator for modulating a power of the first modulated optical signal outputted from the first optical modulator with the electric clock signal and outputting a second modulated optical signal, an optical multiplexer for receiving one of the first modulated optical signal inputted to the second optical modulator and the second modulated optical signal outputted from the second optical modulator, outputting a part of a multiplexed optical signal and branching a part of the multiplexed optical signal, a photo detector for converting the multiplexed optical signal from the optical multiplexer to an electric signal, a phase changing unit for changing a phase of an optical signal, and a controlling circuit for receiving the electric signal outputted from the photo detector and the electric clock signal outputted from the oscillator, and controlling a phase change amount of the phase changing unit to match a phase of the electric signal and a phase of the electric clock signal.

According to another aspect of this invention, an optical pulse generating method comprises outputting an optical signal with a determined wavelength, outputting an electric clock signal with a determined frequency, first modulating a power of the optical signal with the electric clock signal and outputting a first modulated optical signal, second modulating a power of the first modulated optical signal outputted with the electric signal and outputting a second modulated optical signal, multiplexing one of the first modulated optical signal and the second modulated optical signal, outputting a part of a multiplexed optical signal and branching a part of the multiplexed optical signal, converting the multiplexed optical signal to an electric signal, changing a phase of an optical signal, and controlling, in response to the electric signal and the electric clock signal, a phase change amount in the changing step to match a phase of the electric signal and a phase of the electric clock signal.

Further scope of applicability of the present invention will become apparent from the detailed description given hereinafter. However, it should be understood that the detailed description and specific examples, while indicating preferred embodiments of the invention, are give by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

BRIEF DESCRIPTION OF THE DRAWINGS

The present invention will become more fully understood from the detailed description give hereinbelow and the accompanying drawings which are given by way of illustration only, and thus are not limitative of the present invention, and wherein.

DETAILED DESCRIPTION OF THE PREFERRED EMBODIMENTS

Embodiment 1

Figure 1:
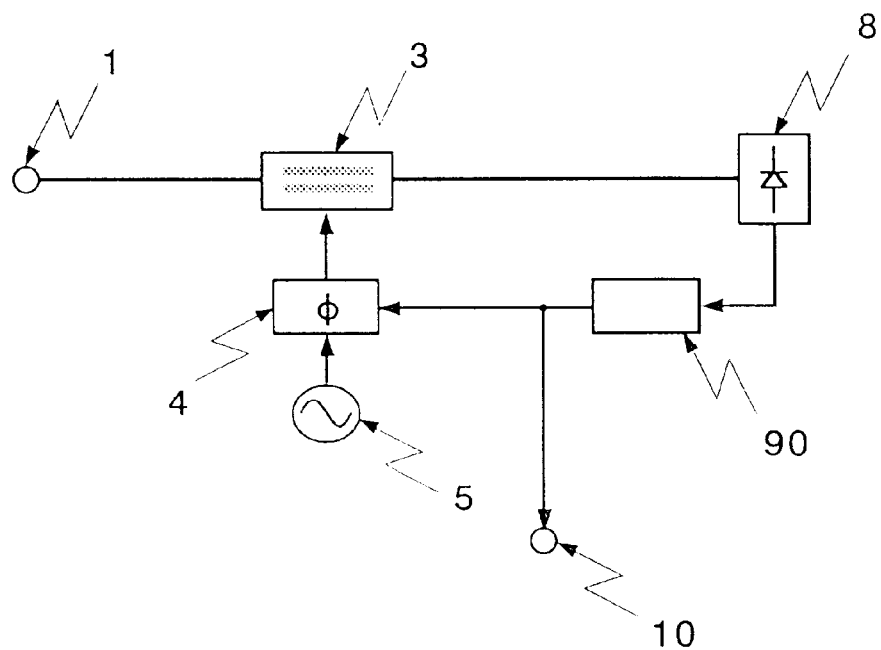
FIG. 1 shows a fundamental configuration block chart of an optical pulse position detecting circuit according to embodiment 1 of this invention.

FIG. 1 shows a configuration block chart of an optical pulse position detecting circuit in an embodiment of this invention.

In FIG. 1, the optical pulse string input terminal 1 for inputting an optical pulse string in which optical pulses are generated in a determined repetitive ratio and the optical modulator 3 for receiving the optical pulse string, modulating an optical power of the optical pulse string based on an electric clock signal and outputting an optical signal are illustrated. In FIG. 1, the phase shifter 4 for shifting a phase of the electric clock signal, the oscillator 5 for generating an electric clock signal with a same frequency as the repetitive ratio of the optical pulse string as a driving signal for the optical modulator, the photo detector 8 for converting an optical power of an optical signal to an electric signal, a phase controlling circuit 90 for outputting a control signal for controlling the phase shift amount of the phase shifter 4 and the phase shift amount output terminal 10 for outputting the phase shift amount of the phase shifter are also illustrated.

As the optical modulator 3, optical modulators for controlling an output optical power level by an electric signal, e.g., a Lithium Niobate (LiNbO3) Mach-Zehnder type optical modulator can be used. The phase shifter 4 is a device for controlling the phase shift amount with an electric signal.

Figure 2:
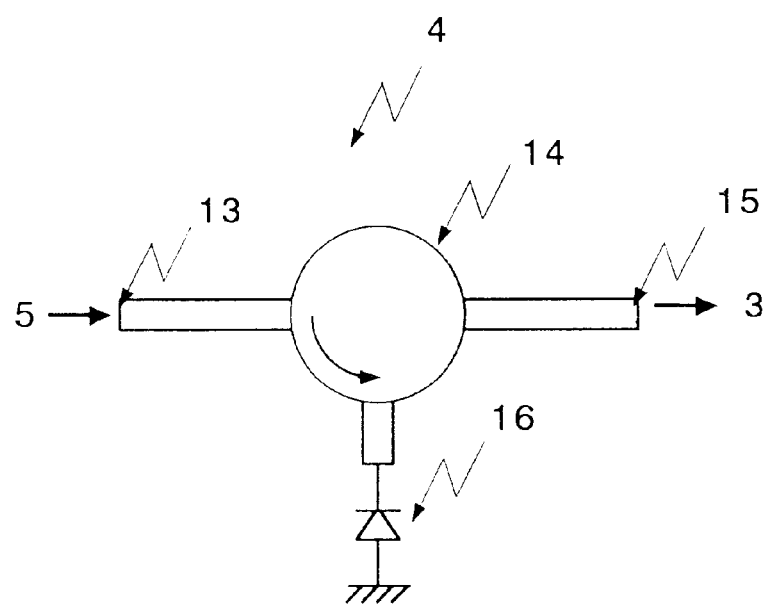
FIG. 2 illustrates a phase shifter in the optical pulse position detecting circuit of FIG. 1.

FIG. 2 illustrates an example in an embodiment of the phase shifter 4.

In FIG. 2, a phase shifter input terminal 13, a circulator 14, a phase shifter output terminal 15 and a varactor diode 16 are illustrated. Since a capacity of the varactor diode changes with a voltage, a reflective phase of a microwave at the varactor diode is controlled by a voltage of a control signal outputted from the phase controlling circuit 90. Many types of phase shifters, such as a phase shifter for switching a transmission line length by a digital control, an analog phase shifter which uses a balanced modulator, a phase shifter for switching a transmission line length by a switch or a motor, are available in a market. For these phase shifters, control voltages indicate the shift amounts of the phase shifters. Therefore, when the control voltage outputted from the phase controlling circuit 90 is monitored by the phase shift amount output terminal 10, a phase shift amount, i.e., a pulse position can be detected. As the photo detector 8, a photo diode (PD) etc. for converting an optical signal to an electric signal can be used.

An operation is explained with reference to FIG. 3.

According to the technique of this invention, a pulse position is a phase relationship of the inputted optical pulse string and a standard electric clock signal outputted from the oscillator 5. An optical pulse is inputted from the optical pulse string input terminal 1 and outputted to the optical modulator 3. The optical modulator 3 is driven by an electric clock signal outputted from the oscillator 5. A frequency of the electric clock signal outputted from the oscillator 5 is same as a repetitive ratio of the optical pulse string inputted from the optical pulse string input terminal 1. The phase shifter 4 is controlled to maximize an optical power level outputted from the optical modulator 3 by the phase controlling circuit 90. As shown in FIG. 3, when the phase shifter is controlled to maximize the output from the optical modulator, the phase shift amount corresponds to the pulse position.

Figure 3:
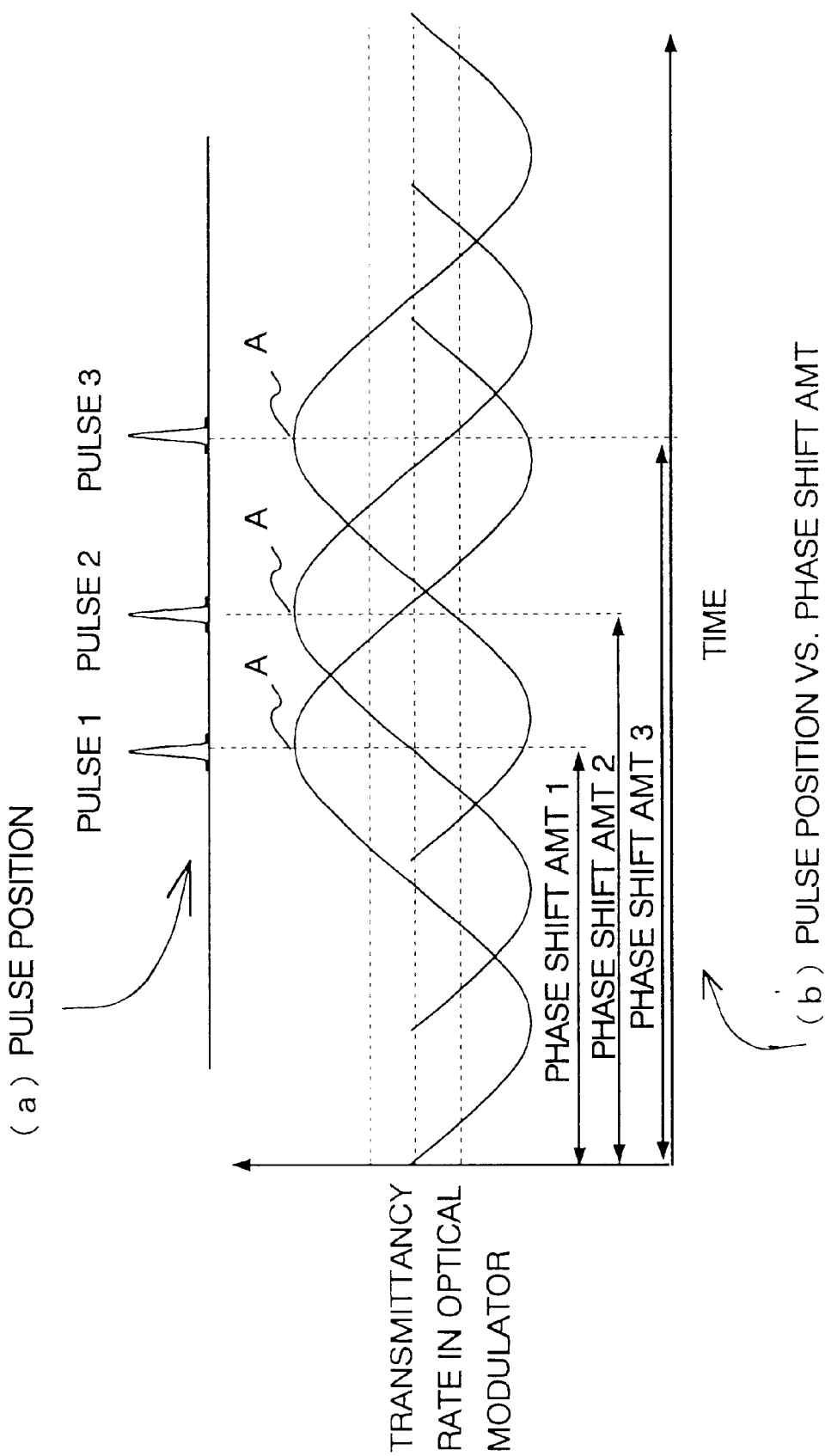
FIG. 3 shows an explanatory chart of an operation of the optical pulse position detecting circuit of FIG. 1.

In FIG. 3, three optical pulses at pulse 1, pulse 2 and pulse 3 in the optical pulse string correspond to phase shift amount 1, phase shift amount 2 and phase shift amount 3. Even if an optical pulse string with any pulse position is inputted, the phase of the electric clock signal is automatically shifted by the phase shifter and the optical power level of the optical signal outputted from the optical modulator 3 is maximized.

Figure 4:
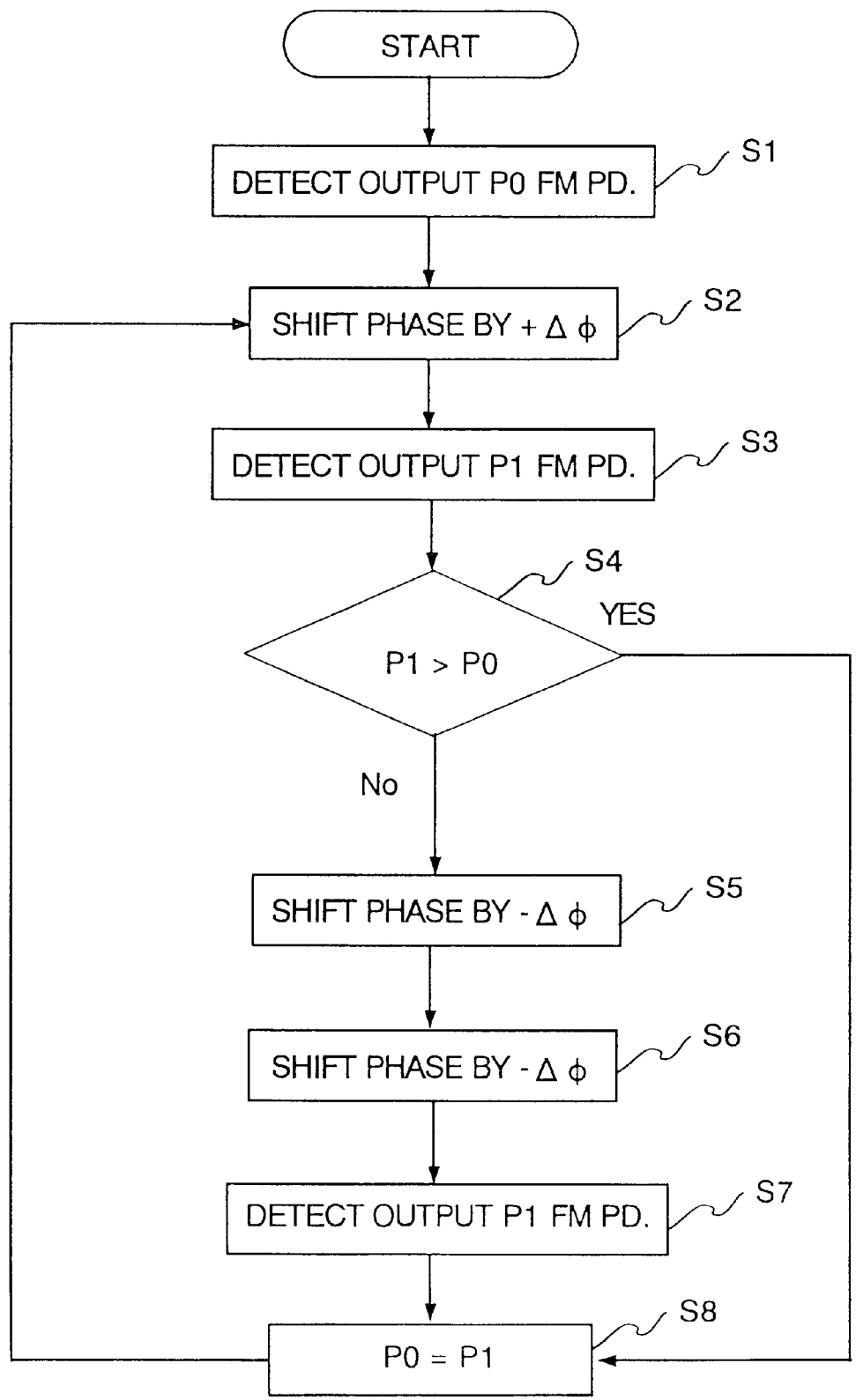
FIG. 4 shows an explanatory chart of an operation of the optical pulse position detecting circuit of FIG. 1.

A technique for controlling the phase shifter 4 to maximize the optical power outputted from the optical modulator 3 is shown in FIG. 4.

The phase controlling circuit 90 controls the phase shift amount of the phase shifter by monitoring an output from the photo detector 8. When the phase is increased by $\Delta\Phi$ (step S2), if the output from the photo detector increases (step S3 and YES for step S4), the phase is further increased by $\Delta\Phi$ (steps S8 and S2). When the phase is increased by $\Delta\Phi$, if the output from the photo detector is not increased (step S3 and NO for step S4), the phase is once reduced by $\Delta\Phi$ and returned to the original phase (step S5). Then, the phase is further reduced by $\Delta\Phi$ (step S6), and the output from the photo detector is detected (step S7). If the output from the photo detector is increased by repeatedly reducing the phase by $\Delta\Phi$, the phase shifter 4 can be controlled to maximize the optical power level outputted from the optical modulator 3.

Figure 5:
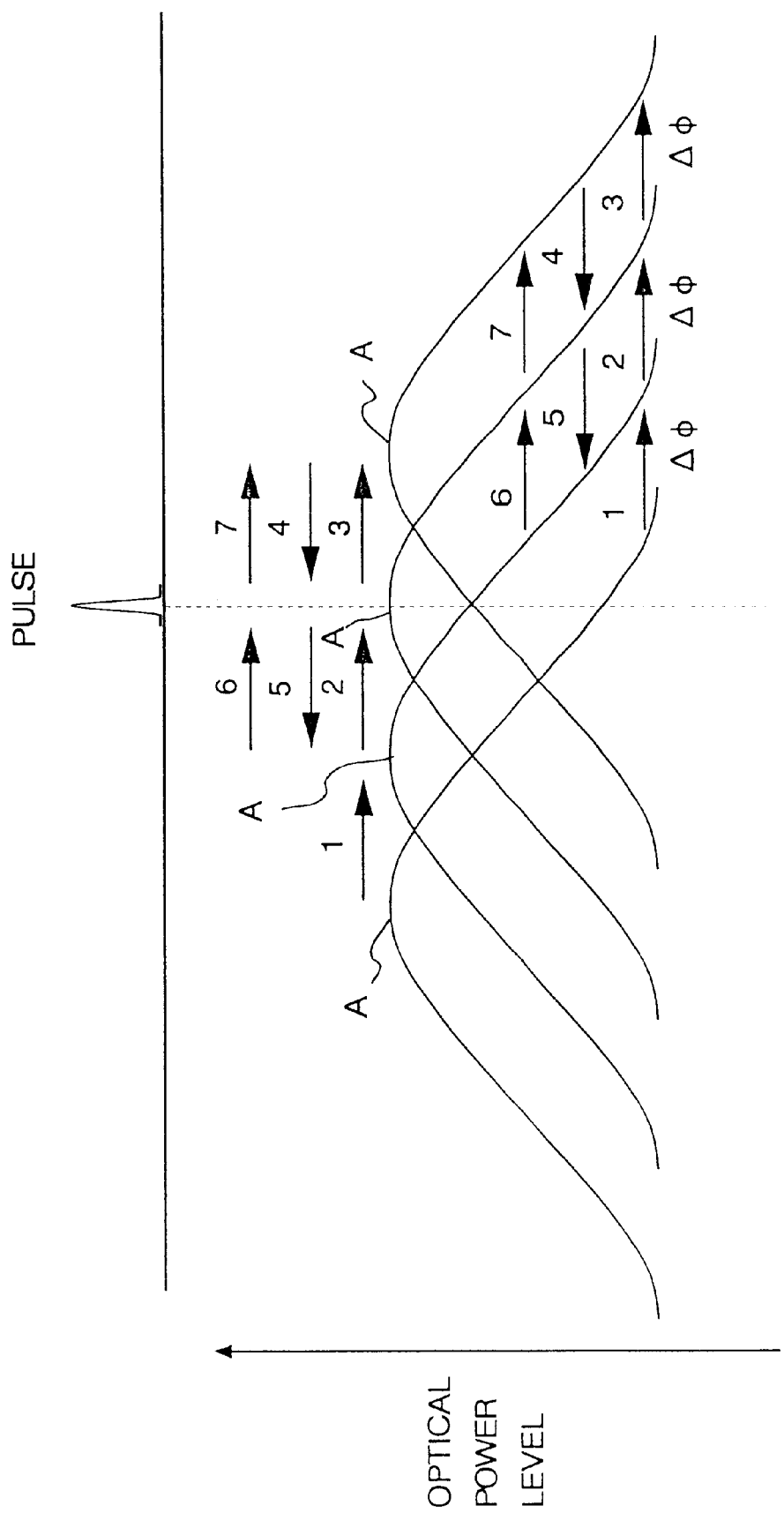
FIG. 5 shows an explanatory chart of an operation of the optical pulse position detecting circuit of FIG. 1.

FIG. 5 shows actual operations.

In FIG. 5, the phase of the electric clock signal shifts as indicated by arrows 1, 2, 3, 4, 5, 6 and 7, and the pulse position almost matches with a target position A of the electric clock signal. According to the algorithm in FIG. 4, a shift direction for increasing the optical power is detected by either increasing or decreasing the phase by $\Delta\Phi$. Therefore, even if an optical power level corresponds to two phase shift amounts, the pulse position and the target position A can coincide. Further, in the algorithm of FIG. 4, since the optical power levels before and after increasing or decreasing the phase by $\Delta\Phi$ are compared, it is not necessary to obtain the transmittancy rate in the optical modulator. The phase controlling circuit 90 in FIG. 1 can be realized by providing a simple logic circuit or a simple CPU and software. An algorithm besides the algorithm in FIG. 4 can be also used.

The pulse position which is detected according to this invention may be used when processing of a signal synchronized with the phase of the inputted optical pulse string is necessary. The processing of the signal synchronized with the phase of the inputted pulse includes modulating of the signal, time division multiplexing by optical processing, time division demultiplexing by optical processing, etc.

Embodiment 2

Figure 6:
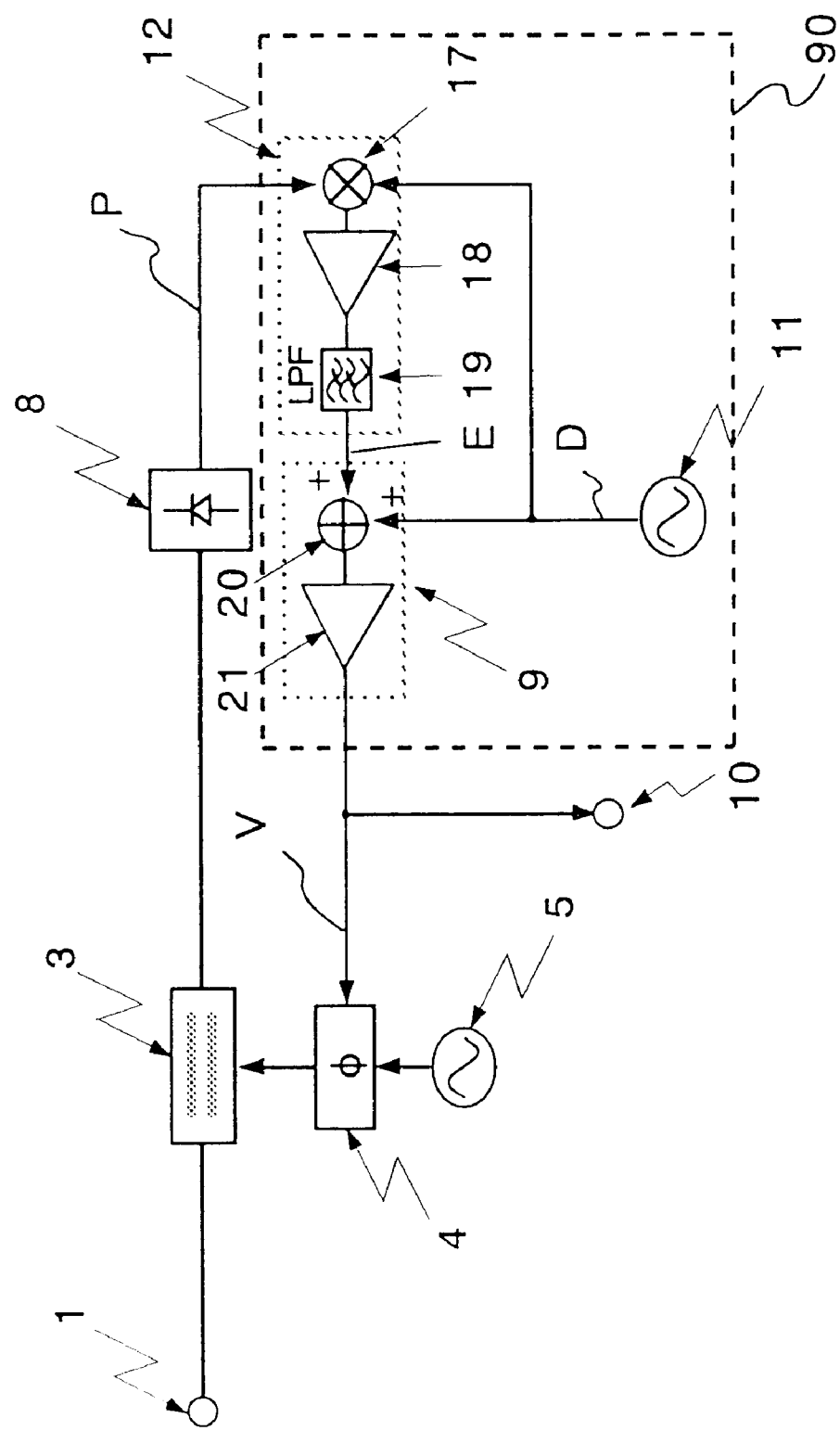
FIG. 6 shows a fundamental configuration block chart of an optical pulse position detecting circuit according to embodiment 2 of this invention.

FIG. 6 shows a configuration block chart of the optical pulse position detecting circuit in another embodiment of this invention.

In FIG. 6, the optical pulse string input terminal 1, the optical modulator 3, the phase shifter 4, the oscillator 5, the photo detector 8 for converting an optical signal to an electric signal, a phase shifter controlling circuit 9 for controlling a phase shift amount of the phase shifter 4, the phase shift amount output terminal 10 for outputting the phase shift amount of the phase shifter, a dither signal generating circuit 11, a phase comparator 12 for detecting synchronization and the phase controlling circuit 90 are illustrated. The phase shifter controlling circuit 9 includes an adder 20 and an amplifier 21. The adder 20 and the amplifier 21 can easily be realized by operation amplifiers. The phase comparator 12 includes a mixer 17, an amplifier 18 and a low-pass filter 19. The phase controlling circuit 90 includes the dither signal generating circuit 11, the phase comparator 12 and the phase shifter controlling circuit 9.

The dither signal generating circuit 11 outputs a dither signal D with a micro amplitude in a low frequency f of 1 kHz to 15 kHz. The dither signal D which is an alternating current element is added to an error signal E which is a direct current element outputted from the phase comparator 12 by the adder 20, and a controlling voltage V is generated. The controlling voltage V is applied to the phase shifter 4. Synchronization of an electric signal P outputted from the photo detector 8 and the dither signal D is detected by the phase comparator 12. An output signal from the phase comparator 12 is inputted to the adder 20 as the error signal E. Thus, a feedback circuit is configured.

A basic operation of FIG. 6 is similar to FIG. 1, except that FIG. 6 includes a step of detecting synchronization to detect a phase shift amount for maximizing an optical power level of an optical signal outputted from the optical modulator in addition to the operations shown in FIG. 1. An operation principle is discussed with reference to FIGS. 7–12.

Figure 7:
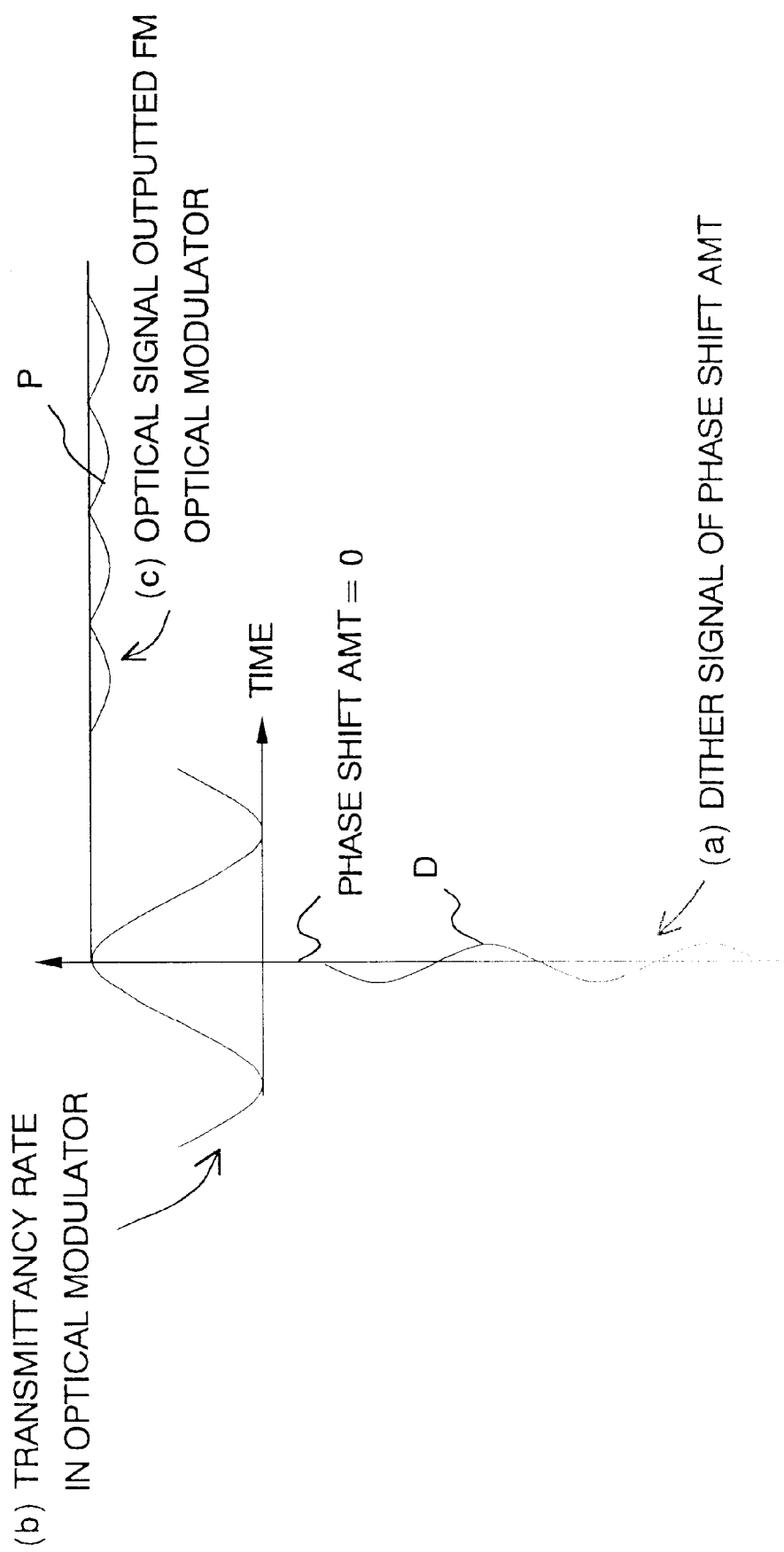
FIG. 7 shows an explanatory chart of an operation of the optical pulse position detecting circuit of FIG. 6 when a phase shift amount is optimal.
Figure 8:
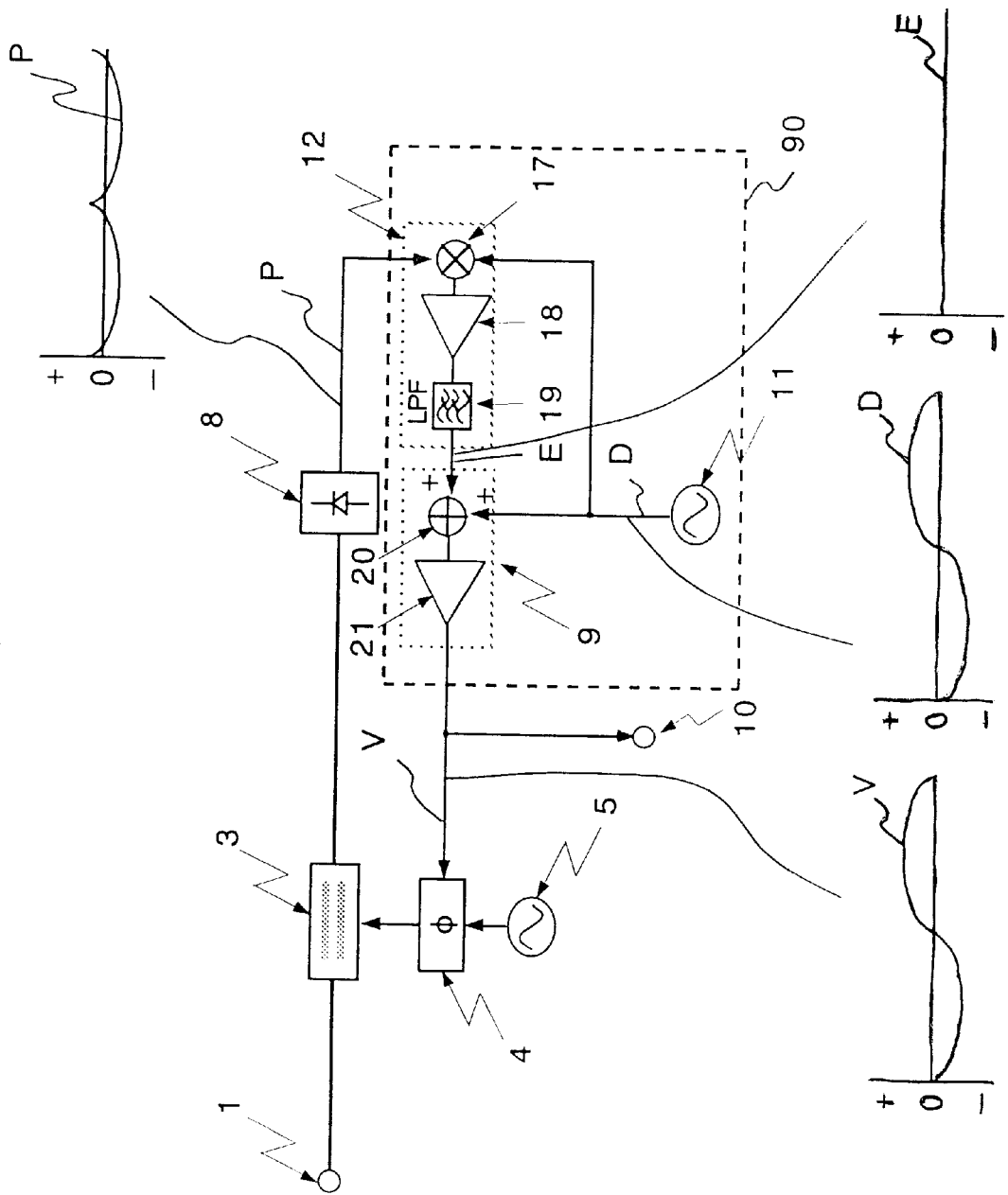
FIG. 8 shows an explanatory chart of an operation of the optical pulse position detecting circuit of FIG. 6 when the phase shift amount is optimal.

FIGS. 7 and 8 show an operation when the phase shift amount of the phase shifter 4 is a value for maximizing an output from the optical modulator. When the transmittancy rate in the optical modulator 3 is as shown in (b) of FIG. 7 and a phase of a driving signal for the optical modulator is modulated to a micro amplitude by the dither signal D with the frequency f which is as shown in (a) of FIG. 7, a low frequency signal element of an optical signal as shown in (c) of FIG. 7 is outputted from the optical modulator. As also shown in FIG. 8, the output (c) in FIG. 7 from the optical modulator is a low frequency signal element with a frequency 2f. Since an element with the frequency f does not exist, an output from the phase comparator 12 after detecting synchronization of the output (c) in FIG. 7 from the optical modulator 3 and the dither signal (a) in FIG. 7 is zero, and the error signal E of zero is outputted from the phase comparator 12.

Figure 9:
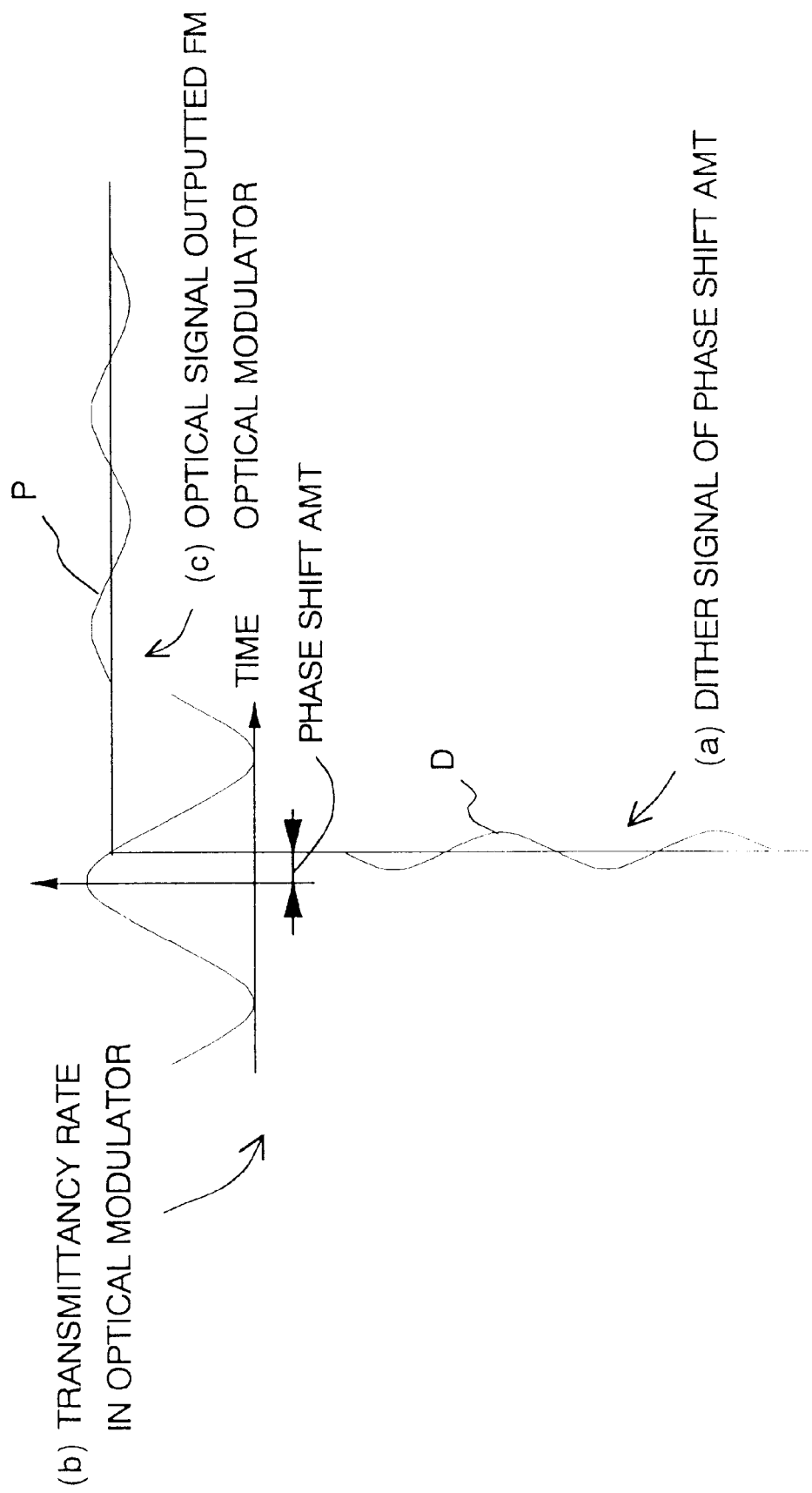
FIG. 9 shows an explanatory chart of an operation of the optical pulse position detecting circuit of FIG. 6 when the phase shift amount is more than the optimal phase shift amount.
Figure 10:
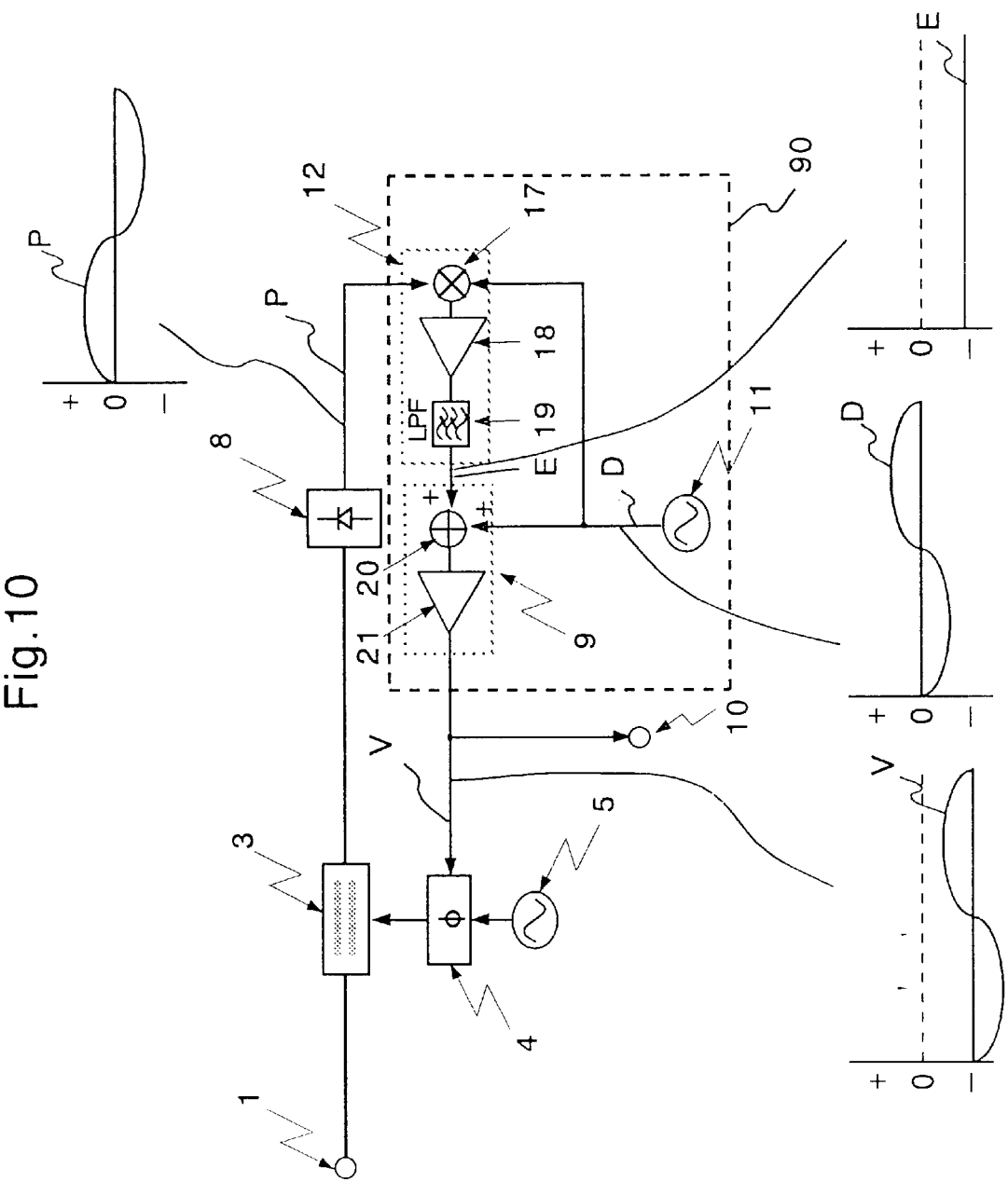
FIG. 10 shows an explanatory chart of an operation of the optical pulse position detecting circuit of FIG. 6 when the phase shift amount is more than the optimal phase shift amount.

FIGS. 9 and 10 show an operation when the phase shift amount of the phase shifter is more than the value for maximizing the output from the optical modulator.

When the transmittancy rate in the optical modulator is as shown in (b) of FIG. 9 and a phase of a driving signal for the optical modulator is modulated to a micro amplitude by the dither signal D with the frequency f as shown in (a) of FIG. 9, a low frequency signal element of an optical signal as shown in (c) of FIG. 9 is outputted from the optical modulator. Since the phase of the output (c) in FIG. 9 from the optical modulator and the phase of the dither signal (a) in FIG. 9 are inverted as also shown in FIG. 10, an output from detecting synchronization is negative. Hence, a negative error signal E is outputted from the phase comparator 12. The error signal E is a direct current element. A phase shift amount (controlling voltage V) corresponding to a value of the error signal E is generated and outputted by the phase shifter controlling circuit 9. When the outputted error signal E is negative, the phase shift amount is reduced.

Figure 11:
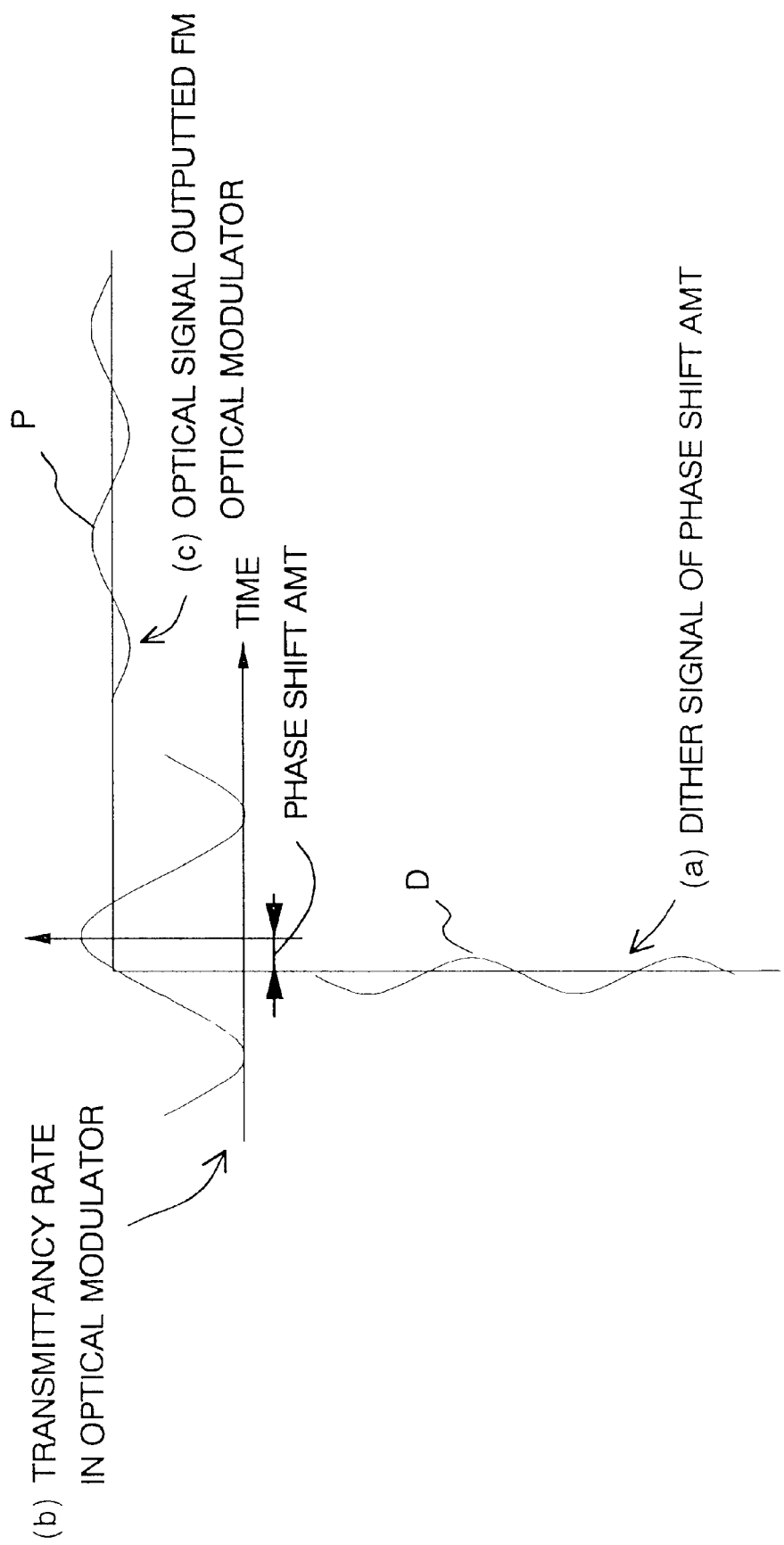
FIG. 11 shows an explanatory chart of an operation of the optical pulse position detecting circuit of FIG. 6 when the phase shift amount is less than the optimal phase shift amount.
Figure 12:
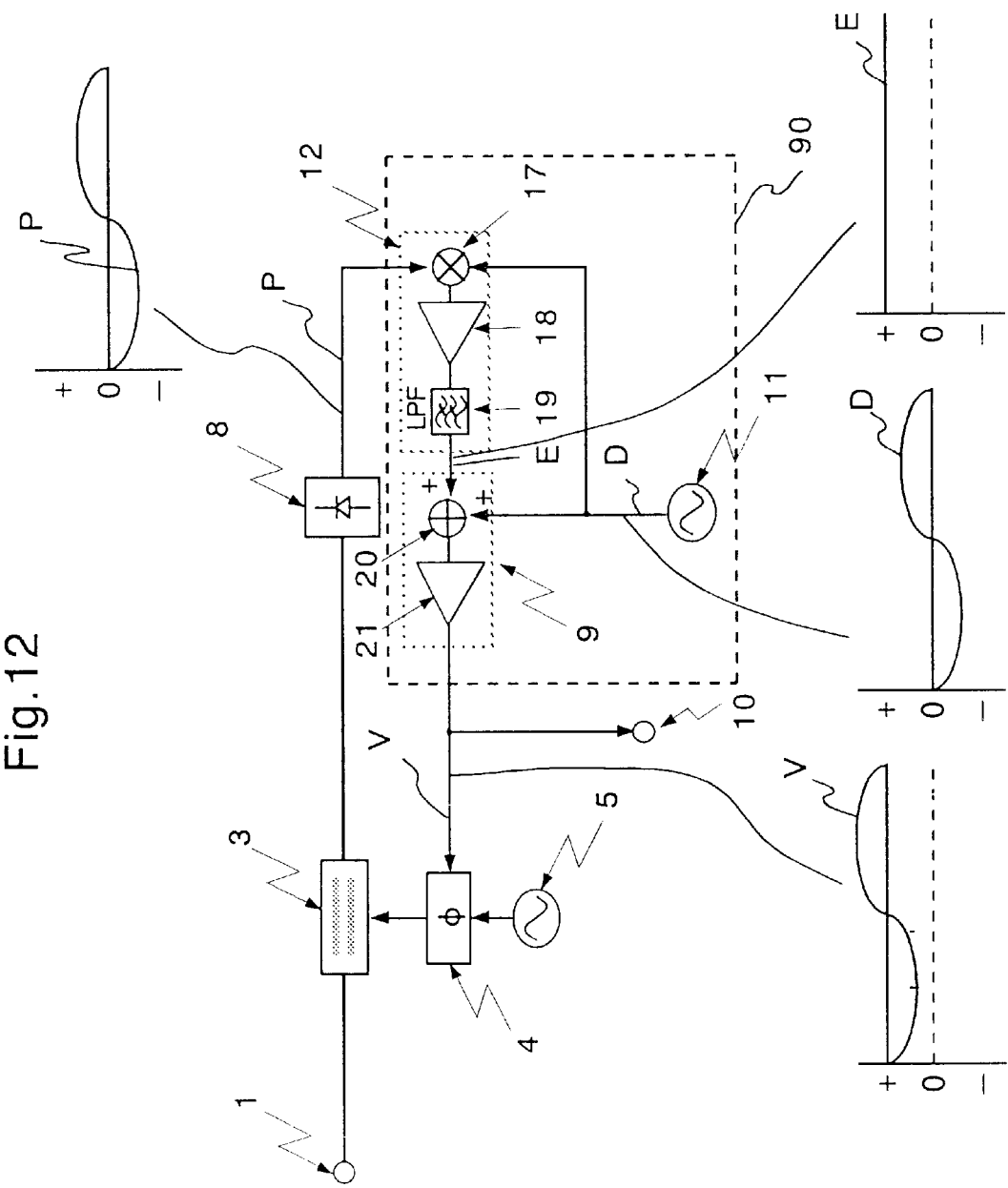
FIG. 12 shows an explanatory chart of an operation of the optical pulse position detecting circuit of FIG. 6 when the phase shift amount is less than the optimal phase shift amount.

FIGS. 11 and 12 show an operation when the phase shift amount of the phase shifter is less than the value for maximizing the output from the optical modulator. When the transmittancy rate in the optical modulator is as shown in (b) of FIG. 11 and a phase of a driving signal for the optical modulator is modulated to a micro amplitude by the dither signal D with the frequency f as shown in (a) of FIG. 11, a low frequency signal element (c) of an optical signal in FIG. 11 is outputted from the optical modulator. Since the phase of the output (c) in FIG. 11 from the optical modulator and the phase of the dither signal (a) in FIG. 11 are the same, the output from detecting synchronization is positive. Hence, a positive error signal E is outputted from the phase comparator 12. When the positive error signal E is outputted, the phase shift amount is increased.

Since synchronization is detected according to this invention, an accurate feedback circuit is realized in a relatively simple configuration. Since synchronization is detected, the dither signal can be modulated to a micro amplitude and sensitivity can be improved. Since the frequency of the dither signal for detecting synchronization does not relate to the repetitive frequency of the inputted optical pulse string, a low frequency of around 1 kHz for easy processing can be selected. Since the dither signal is an alternate current element, an error is not caused for the controlling voltage V indicating the phase shift amount which is the direct current element outputted from the phase shifter controlling circuit 9.

Embodiment 3.

Figure 13:
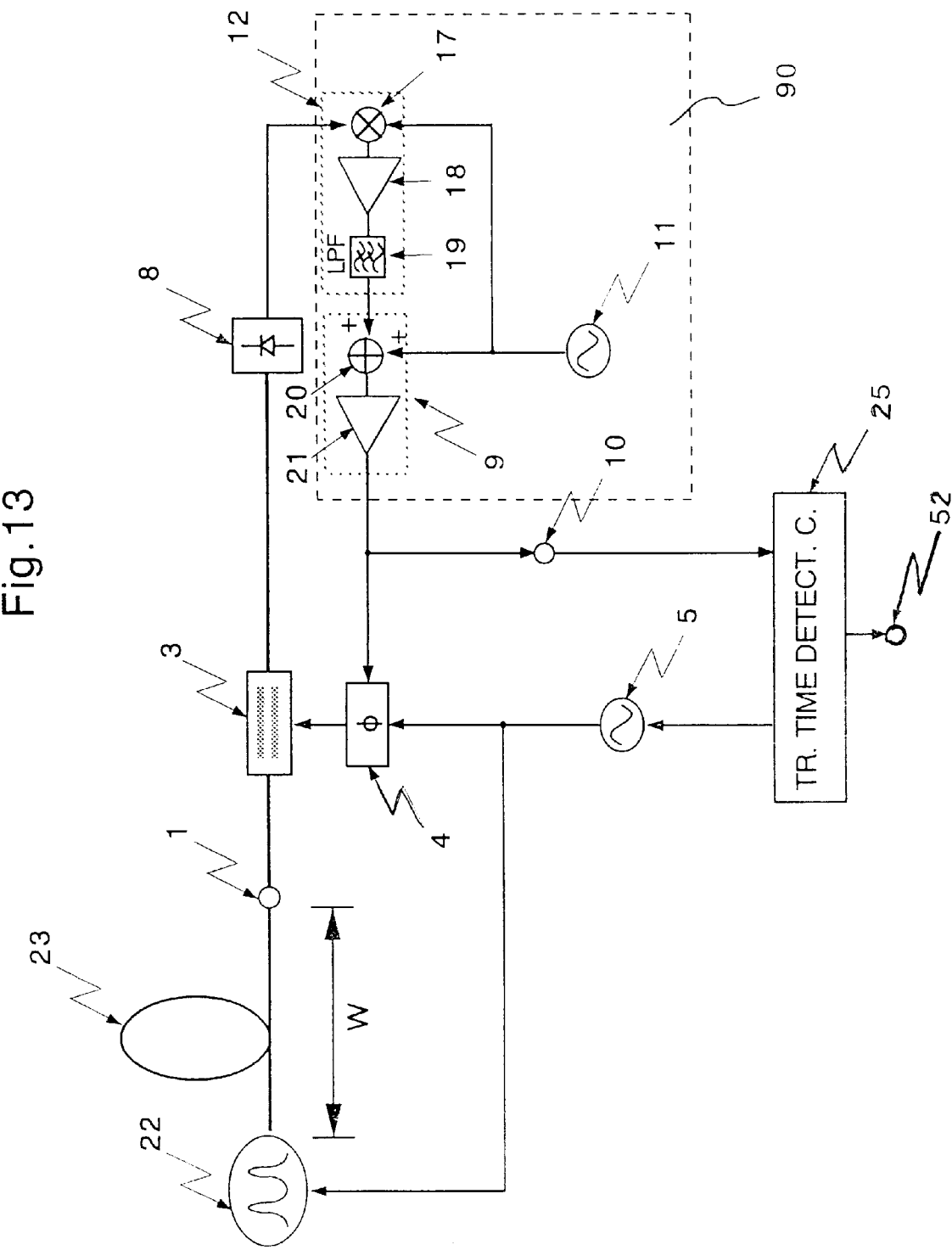
FIG. 13 shows a fundamental configuration block chart of an optical pulse position detecting circuit according to embodiment 3 of this invention.

FIG. 13 shows a configuration block chart of the optical pulse position detecting circuit according to another embodiment of this invention.

In FIG. 13, in addition to the elements in FIG. 6, a light source 22 for generating an optical pulse string, an optical fiber 23 for a transmission line, a transmission time detecting circuit 25 and a transmission time output terminal 52 are provided. The light source 22 for generating the optical pulse string is driven by an output from the oscillator 5 for generating an electric clock signal. As the light source 22 for generating the optical pulse string, a gain switching operation of a semiconductor laser, a mode lock operation of the semiconductor laser, a mode lock operation in an external oscillating structure, etc. can be used.

The oscillator 5 generates electric clock signals with two or more different frequencies. The transmission time detecting circuit 25 measures a transmission time of an optical pulse in the optical fiber 23 for the transmission line by storing and operating a change in an output from the phase shift amount output terminal 10 by changing the frequency of the electric clock signal from the oscillator 5. The measured transmission time is outputted from the transmission time output terminal 52 to various sensors.

An operation is as follows.

A time for which an optical pulse is transmitted in the optical fiber 23 for the transmission line is T (sec) and a frequency of an electric clock signal of the oscillator 5 is f (Hz). (The frequency f of the electric clock signal is different from the frequency f of the dither signal D.) A relative pulse delay time calculated from an output from the phase shift amount output terminal 10 is t (sec). Then, a following equation is obtained:

$$T=N/f+t \tag{1}$$

In equation (1), N is a natural number and it is a number of optical pulses which exist simultaneously in the optical fiber 23 for the transmission line.

When the equation (1) is differentiated by f, a following equation is obtained:

$$N=f^2 \cdot (dt/df) \tag{2}$$

Therefore, the time T for which the optical pulse is transmitted in the optical fiber for the transmission line is calculated as follows:

$$T=f^2 \cdot (dt/df)+t \tag{3}$$

The equation (3) shows that the time T (see) for which the optical pulse is transmitted in the optical fiber 23 for the transmission line is obtained from the frequency f (Hz) of the electric clock signal of the oscillator 5, the relative pulse delay time t (sec) calculated from the output from the phase shift amount output terminal 10 and dt/df. The dt/df is obtained by measuring an amount of change dt of the pulse delay time t when the clock frequency f outputted from the oscillator 5 is changed by df. Accordingly, the time T for which the optical pulse is transmitted in the optical fiber 23 for the transmission line is obtained from the equation (3) which is extended from the equation (1). The transmission time detecting circuit 25 is a circuit in which the frequency of the electric clock signal outputted from the oscillator 5 is changed by df, an amount of change dt of an output from the phase shift amount output terminal 10 is inputted and the time T for which the optical pulse is transmitted is calculated by the equation (3). The transmission time detecting circuit 25 is easily realized by a computer.

Since a transmission rate of an optical pulse in the optical fiber 23 for the transmission line is generally known, a length W of the optical fiber 23 for the transmission line is obtained by measuring the time T for which the optical pulse is transmitted in the optical fiber for the transmission line. According to this invention, the length W of the optical fiber 23 for the transmission line is measured from the time T for which the optical pulse is transmitted in the optical fiber for the transmission line. Further, this invention provides a method for measuring the length of the transmission line accurately in a very dynamic range. This invention may be applied to a transmission line, e.g., a waveguide space, etc., which transmits the optical pulse besides the optical fiber.

Since the length W of the transmission line can be measured accurately according to this invention, this invention can be applied to sensors. For example, since a fiber length and refractive rate of the optical fiber change according to an environment temperature, the environment temperature of the optical fiber can be obtained by measuring the transmission time in the optical fiber. Similarly, this invention may also be used to measure a pressure applied to the optical fiber. This invention may also be applied to an optical time domain reflectometer (OTDR: Optical Time Domain Reflectometer) for measuring a transmission time of an optical pulse from a fault location in the transmission line.

Embodiment 4.

Figure 14:
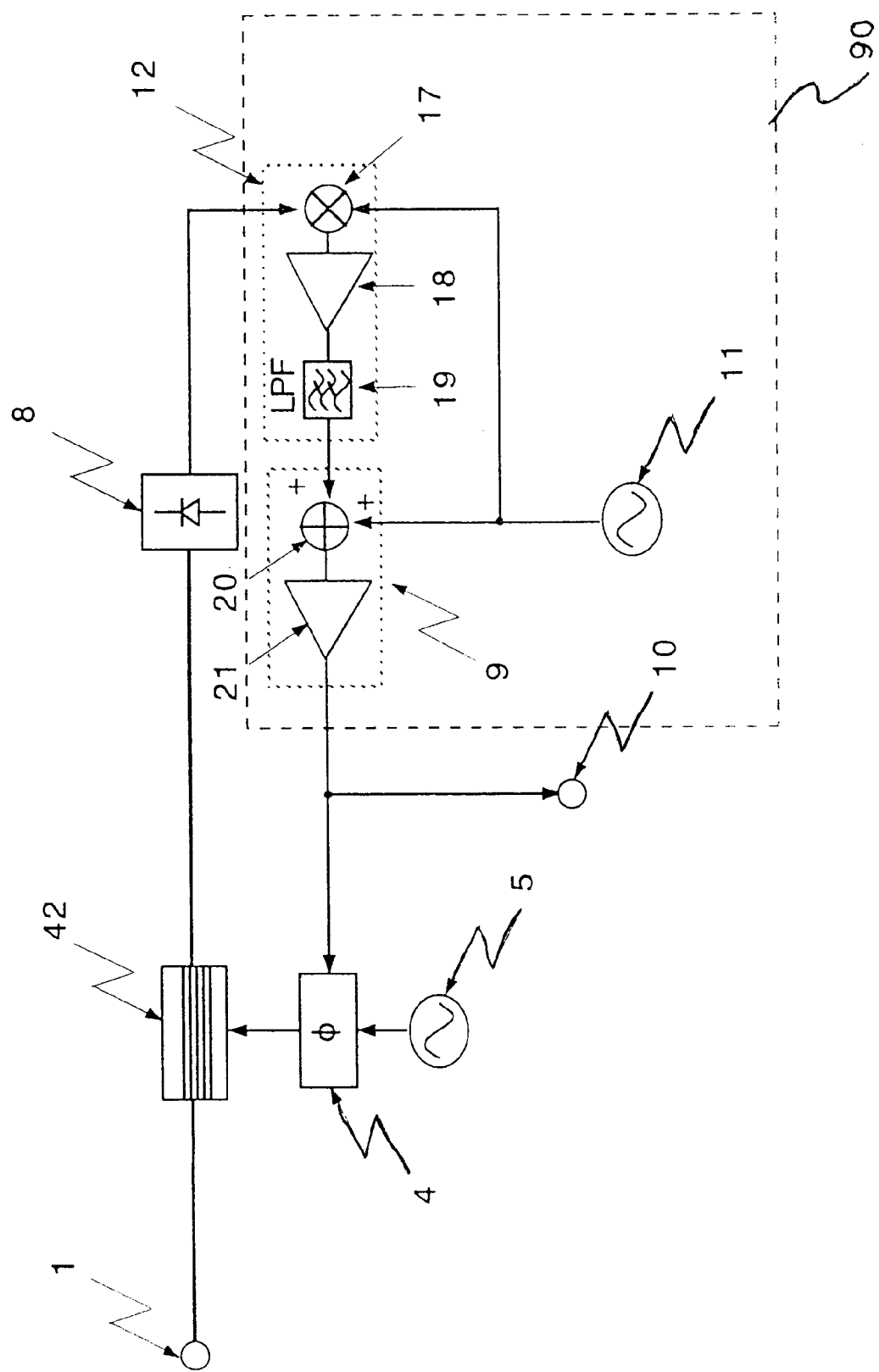
FIG. 14 shows a fundamental configuration block chart of an optical pulse position detecting circuit according to embodiment 4 of this invention.

FIG. 14 shows a configuration block chart of the optical pulse position detecting circuit according to another embodiment of this invention.

The modulator in FIG. 6 is replaced by a semiconductor electro-absorption type optical modulator 42 in FIG. 14. The semiconductor electro-absorption type optical modulator 42 is a device in which an optical absorption coefficient changes in accordance with an applied voltage.

An operation is as follows.

A basic operation is same as in FIG. 6.

Figure 15:
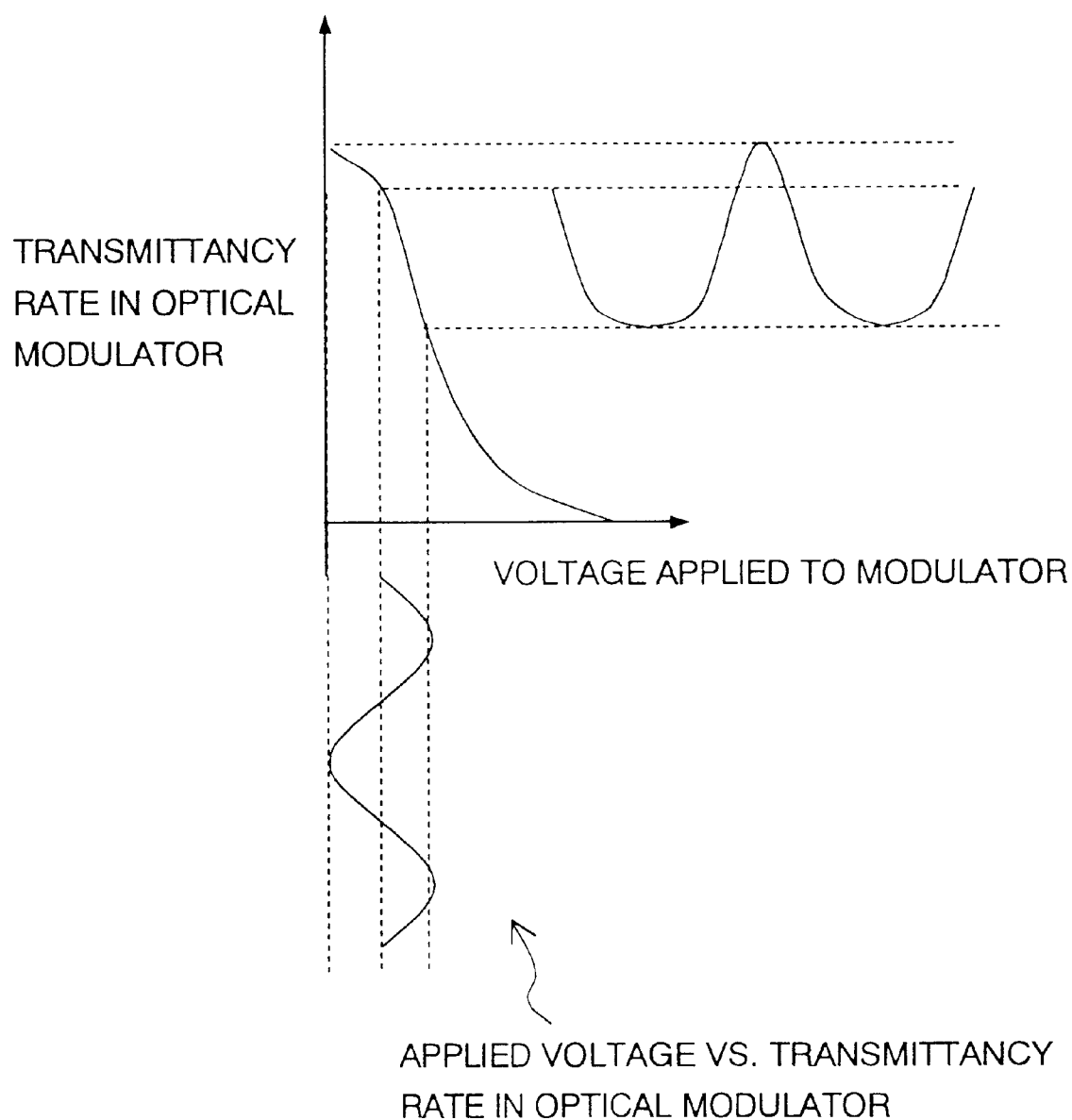
FIG. 15 shows an explanatory chart of an operation of the optical pulse position detecting circuit of FIG. 14.

As shown in FIG. 15, when the applied voltage increases, a transmittancy rate of the semiconductor electro-absorption type optical modulator 42 sharply drops. Generally, a logarithm of the transmittancy rate is proportional to the applied voltage. Therefore, as shown in FIG. 15, the semiconductor electro-absorption type optical modulator driven by the electric clock signal in a sine function curve is a steep gate in a pulse form.

Figure 16:
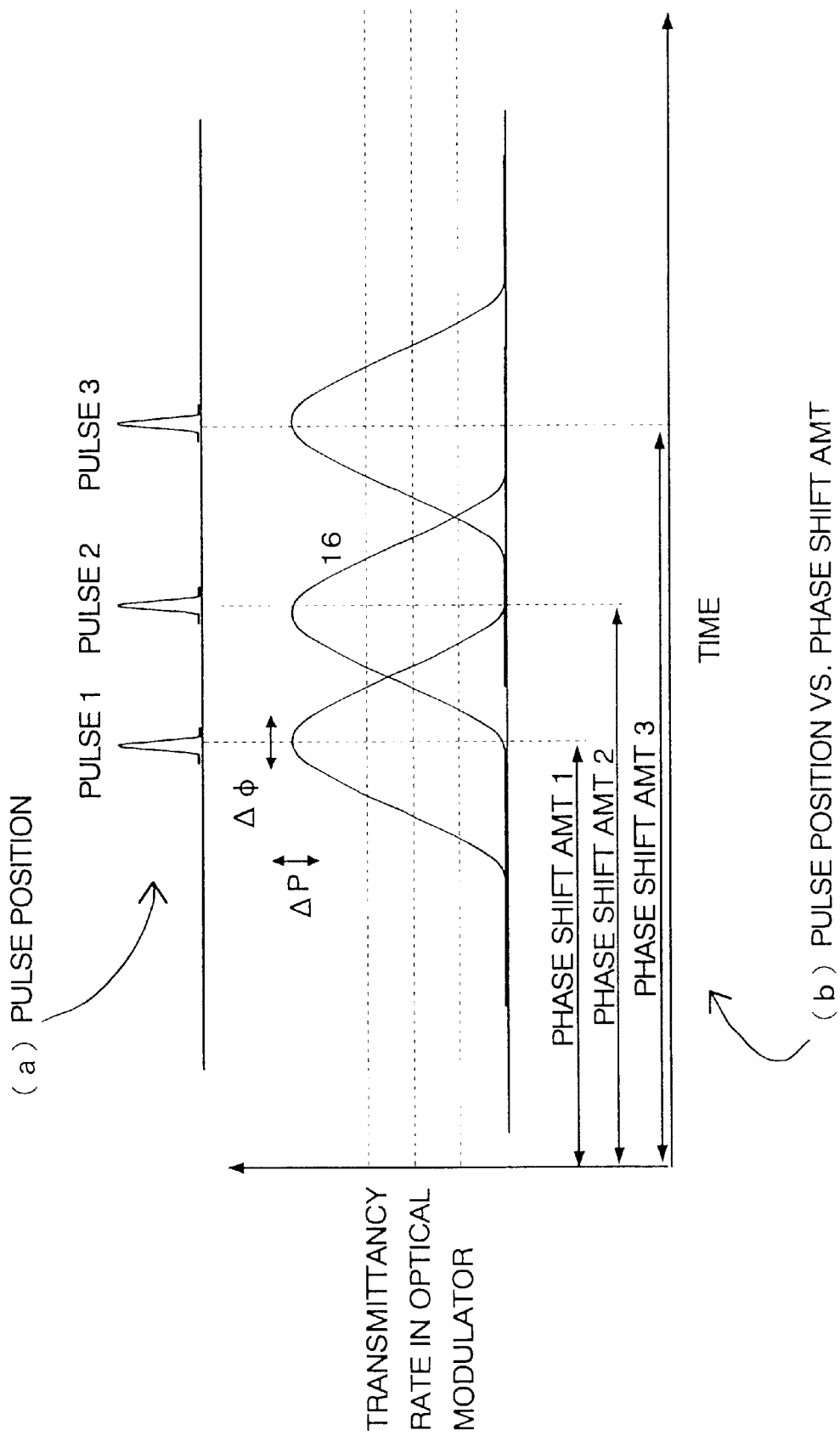
FIG. 16 shows an explanatory chart of an operation of the optical pulse position detecting circuit of FIG. 14.

FIG. 3 for explaining an operation principle is revised in FIG. 16 to explain an operation of the semiconductor electro-absorption type optical modulator.

Since the transmittancy rate of the optical modulator is a steep gate, when the phase shift amount of the phase shifter changes even slightly by $\Delta\Phi$, an optical power level of a light which is transmitted through the optical modulator is changed even by $\Delta P$. Accordingly, the phase shift amount for maximizing the optical power level transmitted through the optical modulator can be detected sensitively.

Embodiment 5.

Figure 17:
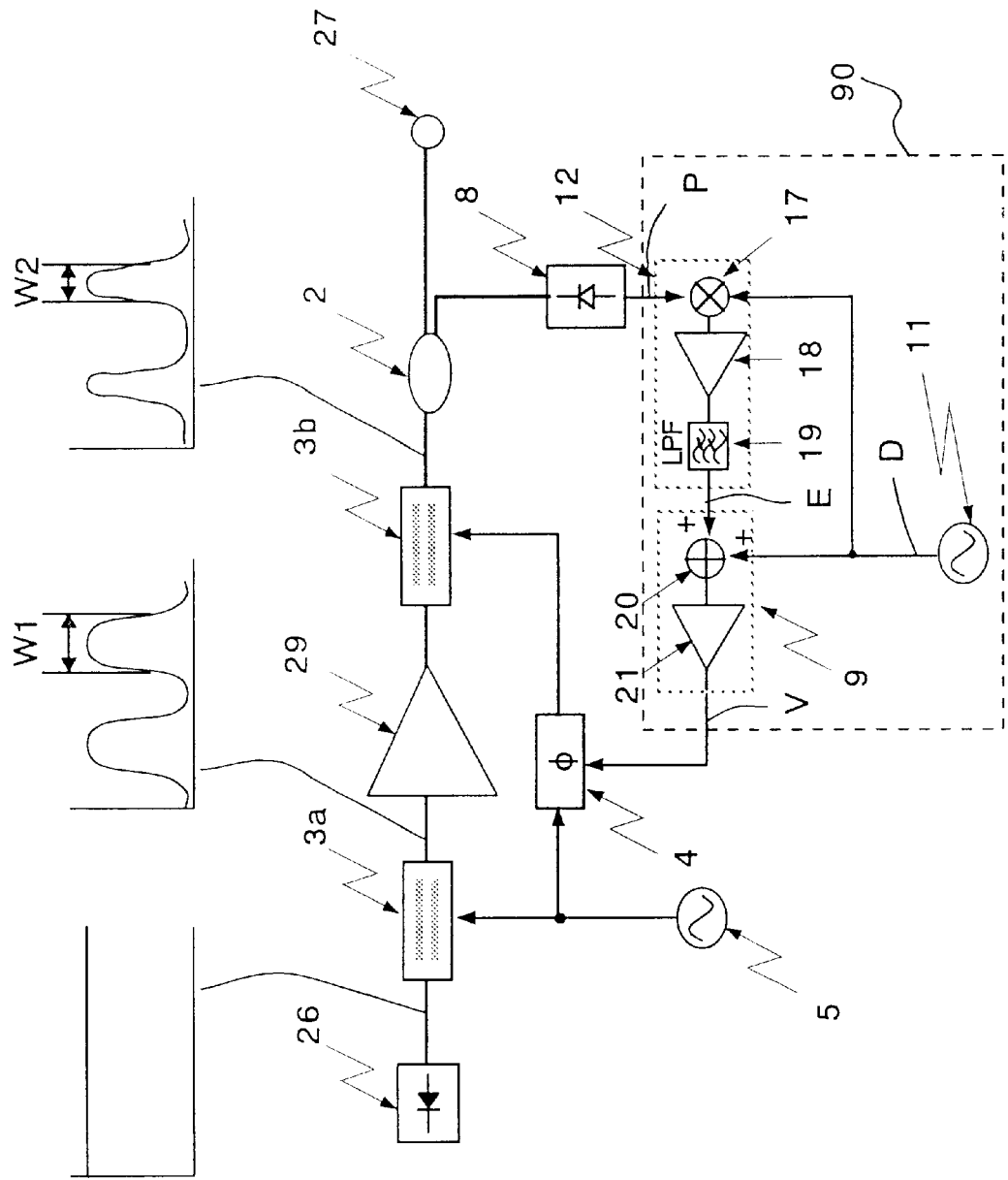
FIG. 17 shows a fundamental configuration block chart of an optical pulse generating apparatus according to embodiment 5 of this invention.

FIG. 17 shows a configuration block chart of an optical pulse generating apparatus according to another embodiment of this invention.

In FIG. 17, the light source 26 for oscillating an optical signal with a determined wavelength, the first optical modulator 3a, the optical amplifier 29, the second optical modulator 3b, the optical multiplexer 2, an optical pulse output terminal 27, the oscillator 5 and the phase shifter 4 which is a kind of a phase changing unit according to this invention are illustrated. In FIG. 17, the photo detector 8, the phase comparator 12, the phase shifter controlling circuit 9, the dither signal generating circuit 11 and the phase controlling circuit 90 which is a kind of a controlling circuit according to this invention are also illustrated. The phase shifter controlling circuit 9 includes the adder 20 and the amplifier 21. The adder 20 and the amplifier 21 can be easily realized by operation amplifiers. The phase comparator 12 includes the mixer 17, the amplifier 18 and the low-pass filter 19. The phase controlling circuit 90 includes the phase shifter controlling circuit 9, the dither signal generating circuit 11 and the phase comparator 12.

The dither signal generating circuit 11 outputs a dither signal D in a micro amplitude with a low frequency f of 1 kHz to 15 kHz. The dither signal D is added to an error signal E outputted from the phase comparator 12 by the adder 20 and applied to the phase shifter 4. Then, synchronization of an electric signal P outputted from the photo detector 8 and the dither signal D is detected by the phase comparator 12. An output signal from the phase comparator 12 is inputted to the adder 20 as the error signal E. Accordingly, a feedback circuit is configured.

As the light source 26, a semiconductor laser diode, fiber laser, solid laser, etc. may be used. As the optical modulators 3a and 3b, Lithium Niobate (LiNb03: Lithium Niobate) Mach-Zehnder (Mach-Zehnder) type optical modulator, etc. for controlling an optical power level by an electric signal may be used. The phase shifter 4 is a device for controlling a phase shift amount by an electric signal. As discussed above regarding FIG. 1, many types of devices for the phase shifter are available in the market. As the optical amplifier 29, a fiber amplifier for using an optical fiber doped with a rare-earth element, a semiconductor optical amplifier for using a semiconductor, an optical amplifier for using non-linear effect such as Raman effect, etc. may be used.

A power level of an optical signal outputted from the light source 26 is modulated by an electric clock signal outputted from the oscillator 5 in the optical modulator 3a and an optical pulse signal is generated. Then, the power level of the optical pulse signal is amplified by the optical amplifier 29. The optical pulse signal is outputted from the optical amplifier 29 and the power level of the optical pulse signal is further modulated by the optical modulator 3b. Since the phase shifter 4 controls the optical modulator 3b to synchronize with the inputted optical pulse signal, a pulse width of the optical pulse outputted from the optical modulator 3b is less than a pulse width of the optical pulse inputted to the optical modulator 3b (W1>W2). The phase shifter controlling circuit 9 receives a dither signal and an output from the phase comparator 12, and controls the phase shifter 4 to maximize the output from the photo detector 8. This operation is discussed with reference to FIGS. 18, 19 and 20.

Figure 18:
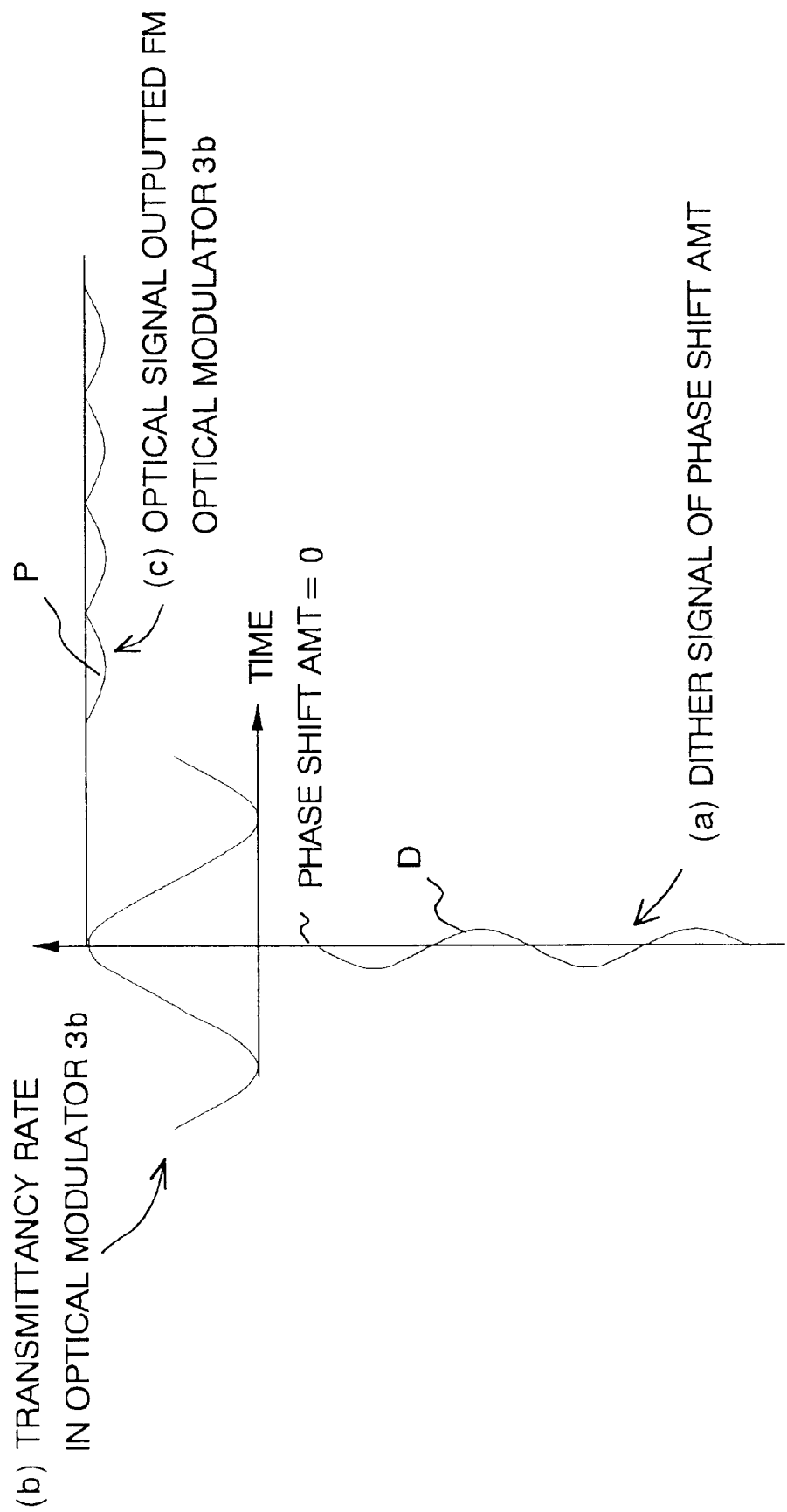
FIG. 18 shows an explanatory chart of an operation of the optical pulse generating apparatus of FIG. 17 when a phase shift amount is optimal.

In FIG. 18, the phase shift amount of the phase shifter is optimal.

The phase shift amount is set to maximize a transmittancy rate in the optical modulator 3b as shown in (b) of FIG. 18. When the phase shift amount of the phase shifter is modulated to a micro amplitude by the dither signal D with the frequency f as shown in (a) of FIG. 7 and the dither signal is superimposed on the driving signal of the optical modulator 3b, a low frequency signal element of the optical signal as shown in (c) of FIG. 7 is outputted from the optical modulator 3b. As shown in FIG. 18, the output from the optical modulator 3b is a low frequency signal element with a frequency 2f and an element with a frequency f does not exist. Therefore, an output from detecting synchronization of an output from the optical modulator 3b which is (c) in FIG. 18 and the dither signal which is (a) in FIG. 18 is zero and the error signal is zero.

Figure 19:
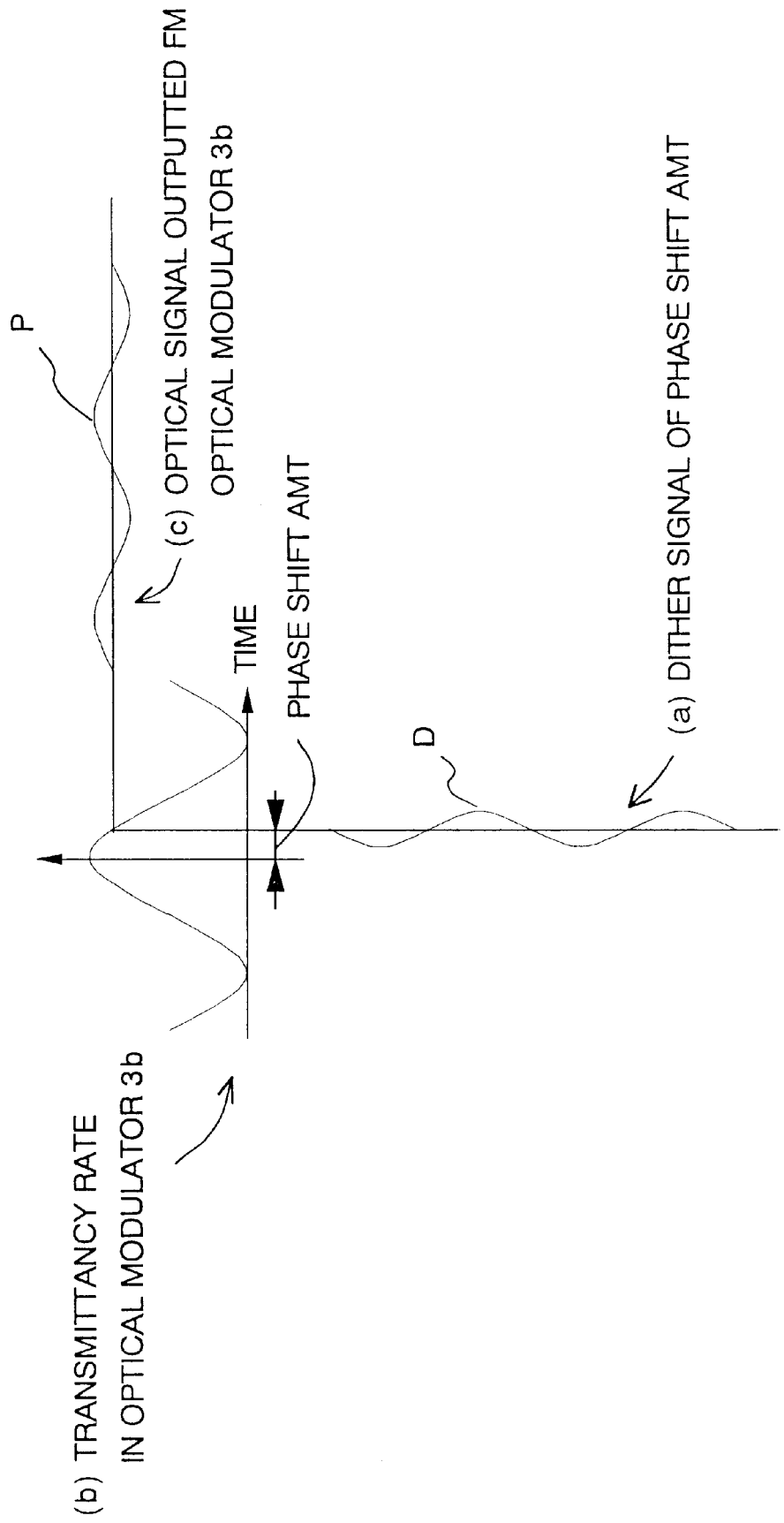
FIG. 19 shows an explanatory chart of an operation of the optical pulse generating apparatus in FIG. 17 when the phase shift amount is more than the optimal phase shift amount.

FIG. 19 shows an operation when the phase shift amount of the phase shifter is more than the optimal value.

The transmittancy rate in the optical modulator 3b is shown in (b) of FIG. 19. When the driving signal of the optical modulator 3b is modulated to a micro amplitude by the dither signal with the frequency f as shown in (a) of FIG. 19, a low frequency signal element as shown In (c) of FIG. 19 is outputted from the optical modulator. Since phases of the output signal from the optical modulator 3b as shown in (c) of FIG. 19 and the dither signal as shown in (a) of FIG. 19 are inverted, an output from detecting synchronization is negative. Therefore, a negative error signal is outputted.

Figure 20:
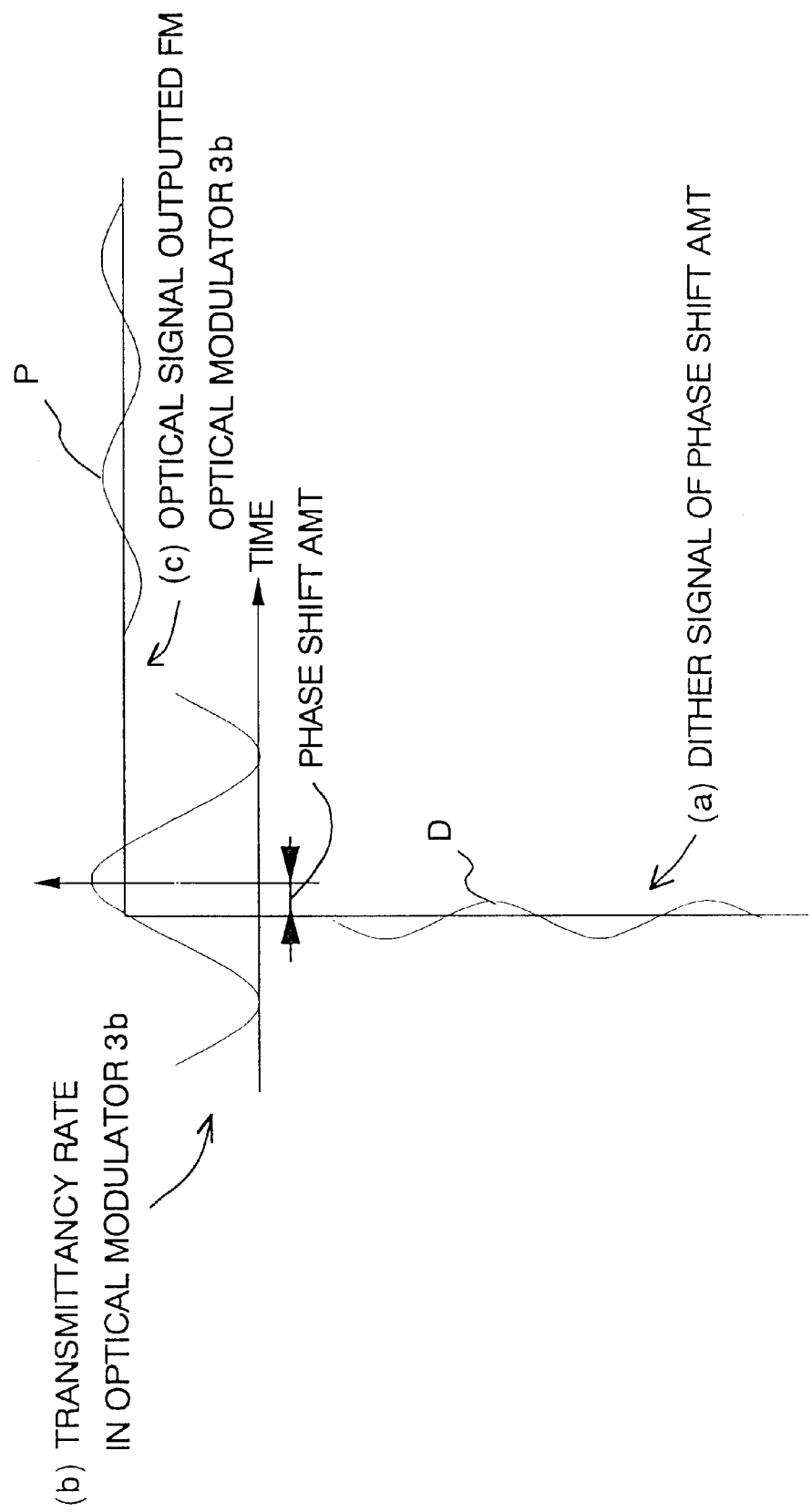
FIG. 20 shows an explanatory chart of an operation of the optical pulse generating apparatus in FIG. 17 when the phase shift amount is less than the optimal phase shift amount.

FIG. 20 shows an operation when the phase shift amount of the phase shifter is less than the optimal value.

The transmittancy rate in the optical modulator 3b is shown in (b) of FIG. 20. When a driving signal of the optical modulator 3b is modulated to a micro amplitude by a dither signal with the frequency f as shown in (a) of FIG. 20, a low frequency signal element as shown in (c) of FIG. 20 is outputted from the optical modulator. Since phases of the output signal from the optical modulator 3b as shown in (c) of FIG. 20 and the dither signal as shown in (a) of FIG. 20 are matched, an output from detecting synchronization is positive. Hence, a positive error signal is outputted.

Since the phase shift amount is constantly optimized by a feedback control, even if there is a fluctuation in a transmission delay time of the optical signal in the optical amplifier 29 and the transmission lines, driving signals of two optical modulators 3a and 3b constantly synchronize with the optical signal. Since the optical modulators synchronize, a short pulse is outputted from the optical pulse output terminal 27.

Since synchronization is detected according to this invention, an accurate feedback circuit is realized in a relatively simple configuration. Further, since a frequency of the dither signal for detecting synchronization does not relate to a repetitive frequency of the inputted optical pulse string, a low frequency of 1 kHz to 15 kHz for easy processing can be selected. Besides, since the dither signal is an alternate current element in a micro amplitude, an error is not caused in the phase shift amount which is a direct current element.

A RF amplifier may be used to amplify the electric clock signal for driving the optical modulators 3a and 3b in the embodiment of this invention. The electric clock signal for driving the optical modulators 3a and 3b may be doubled. Further, even if the optical amplifier 29 is not provided, since there is a delay in transmission of the optical signal in the transmission line between the optical modulator 3a and the optical modulator 3b, the embodiment of this invention is still possible. Besides, the phase controlling circuit 90 may be configured according to the algorithm as shown in FIG. 4.

Embodiment 6.

Figure 21:
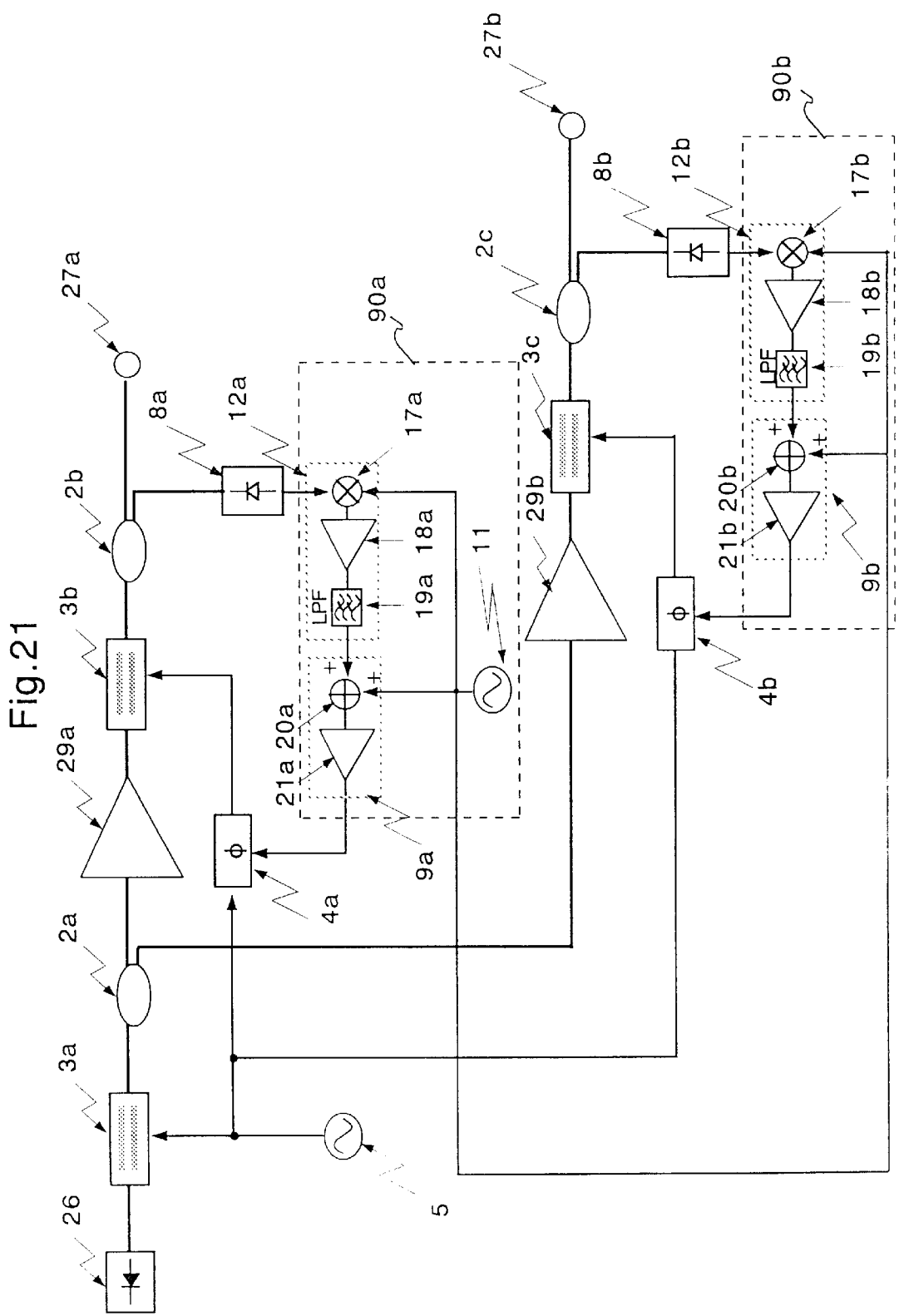
FIG. 21 shows a fundamental configuration block chart of an optical pulse generating apparatus according to embodiment 6 of this invention.

FIG. 21 shows a configuration block chart of an optical pulse generating apparatus according to another embodiment of this invention.

In FIG. 21, an output signal from the optical modulator 3a is branched to two transmission lines by the optical multiplexer 2a. This operation is not in FIG. 17.

In FIG. 21, the first optical modulator 3a, a first optical amplifier 29a, the second optical modulator 3b, a second optical multiplexer 2b, a first optical pulse output terminal 27a, the oscillator 5, a first phase shifter 4a, a photo detector 8a, a phase comparator 12a, a first phase shifter controlling circuit 9a, the dither signal generating circuit 11, a first phase controlling circuit 90a and a second phase controlling circuit 90b are illustrated. The phase shifter controlling circuit 9a includes an adder 20a and an amplifier 21a. The phase comparator 12a includes a mixer 17a, an amplifier 18a and a low-pass filter 19a. In FIG. 21, a second optical amplifier 29b, a third optical modulator 3c, a third optical multiplexer 2c, a second optical pulse out put terminal 27b, a second phase shifter 4b, another photo detector 8b, a phase comparator 12b and a phase shifter controlling circuit 9b are illustrated. The phase shifter controlling circuit 9b includes an adder 20b and an amplifier 21b. The phase comparator 12b includes a mixer 17b, an amplifier 18b and a low-pass filter 19b.

The dither signal generating circuit 11 outputs a dither signal in a micro amplitude with a low frequency.

When the optical pulse is branched by the optical multiplexer 2a, an optical pulse is inputted to the optical amplifier 29a. Then, the optical pulse in a short pulse is outputted from the optical pulse output terminal 27a as in FIG. 17. Similarly, when an optical signal which is branched by the optical multiplexer 2a is inputted to the optical amplifier 29b, an optical pulse in a short pulse is outputted from the optical pulse output terminal 27b. Since the optical signal is branched and processed in parallel in embodiment 6, two optical pulse output terminals 27a and 27b can be provided. In FIG. 21, the first and second phase controlling circuits 90a and 90b receive dither signals from a dither signal generating circuit 11. However, when characteristics of the first and second optical amplifiers 29a and 29b are different or lengths of the transmission lines are different, the dither signal generating circuits 11 may be provided respectively to the first and second phase controlling circuits 90a and 90b.

Obviously, a number of branching from the optical multiplexer 2a and a number of the optical pulse output terminals may be increased, if necessary.

Embodiment 7.

Figure 22:
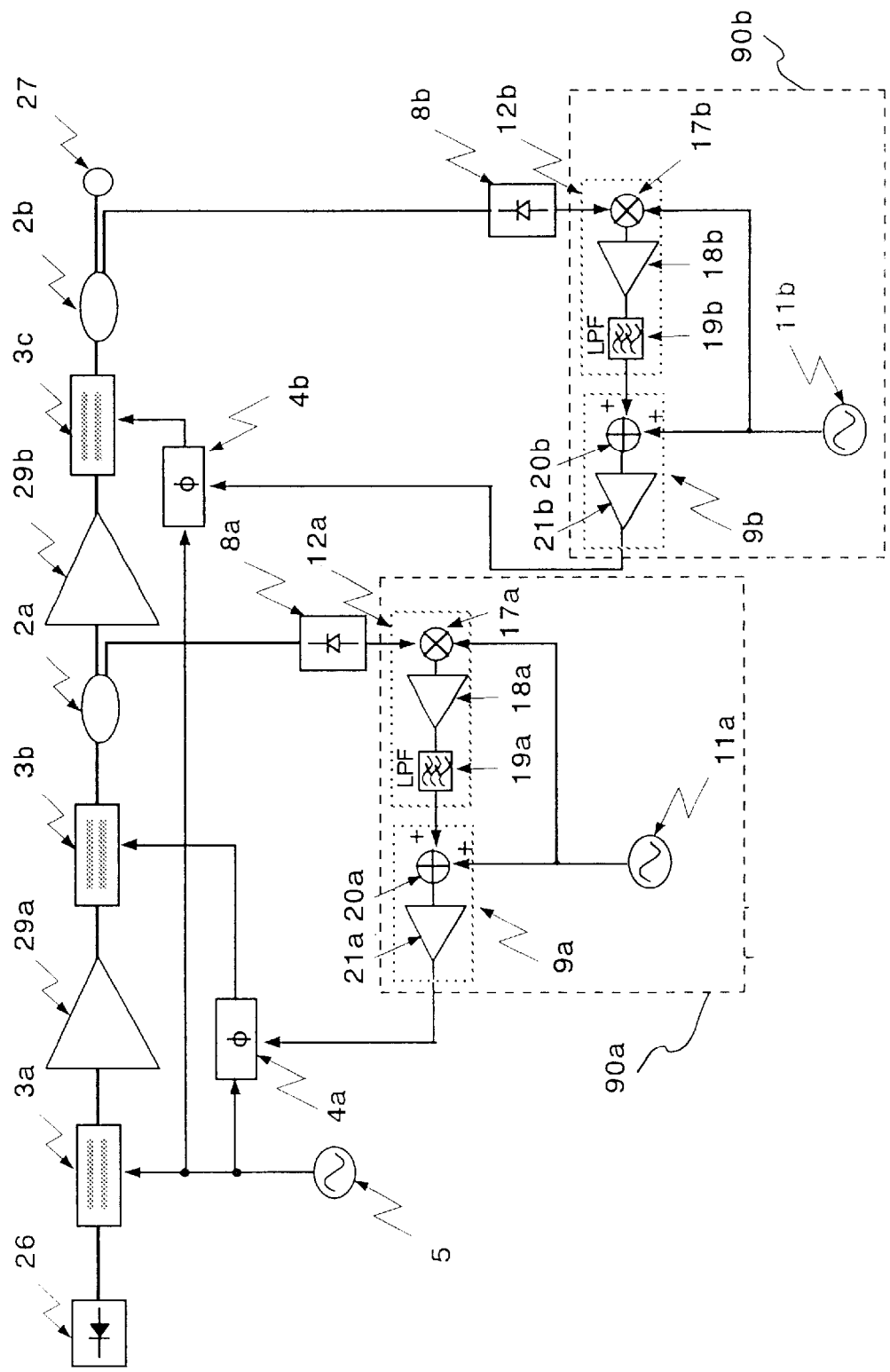
FIG. 22 shows a fundamental configuration block chart of an optical pulse generating apparatus according to embodiment 7 of this invention.

FIG. 22 shows a configuration block chart of an optical pulse generating apparatus according to another embodiment of this invention.

In FIG. 22, the light source 26, the first optical modulator 3a, the first optical amplifier 29a, the second optical modulator 3b, the first optical multiplexer 2a, the second optical amplifier 29b, the third optical modulator 3c, the second optical multiplexer 2b and the optical pulse output terminal 27 are illustrated. In FIG. 22, the oscillator 5, the phase shifter 4a, the photo detector 8a, the phase comparator 12a, the phase shifter controlling circuit 9a, the dither signal generating circuit 11a, the first phase controlling circuit 90a and the second phase controlling circuit 90b are also illustrated. The phase shifter controlling circuit 9a includes the adder 20a and the amplifier 21a. The phase comparator 12a includes the mixer 17a, the amplifier 18a and the low-pass filter 19a. In FIG. 22, the second phase shifter 4b, the photo detector 8b, the phase comparator 12b, the phase shifter controlling circuit 9b and a dither signal generating circuit 11b are also illustrated. The phase shifter controlling circuit 9b includes the adder 20b and the amplifier 21b. The phase comparator 12b includes the mixer 17b, the amplifier 18b and the low-pass filter 19b.

In FIG. 22, the third optical modulator 3c which is not in FIG. 17 is provided to process an optical signal serially. In FIG. 22, the photo detector 8b, the dither signal generating circuit 11b, the phase comparator 12b, the phase shifter controlling circuit 9b and the phase shifter 4b are also provided to optimize the phase of the electric clock signal for driving the optical modulator 3c.

An operation principle of FIG. 22 is same as FIG. 21. However, in FIG. 22, since three serial optical modulators are driven synchronously, an optical pulse signal with a shorter pulse width than the optical pulse outputted from the optical pulse generating apparatus in FIG. 17 can be outputted. In FIG. 22, since the phase shifters 4a and 4b must be controlled independently, the dither signal generating circuits 11a and 11b for performing the feedback control output dither signals with different frequencies. For example, when the dither signal generating circuit 11a outputs the dither signal with the frequency of 10 kHz, the dither signal generating circuit 11b outputs the dither signal with the frequency of 15 kHz.

In addition to the configuration of FIG. 22, fourth and fifth optical modulators may be connected serially to perform a similar feedback control. In that case, an optical pulse signal with an even shorter pulse width can be outputted.

Embodiment 8.

Figure 23:
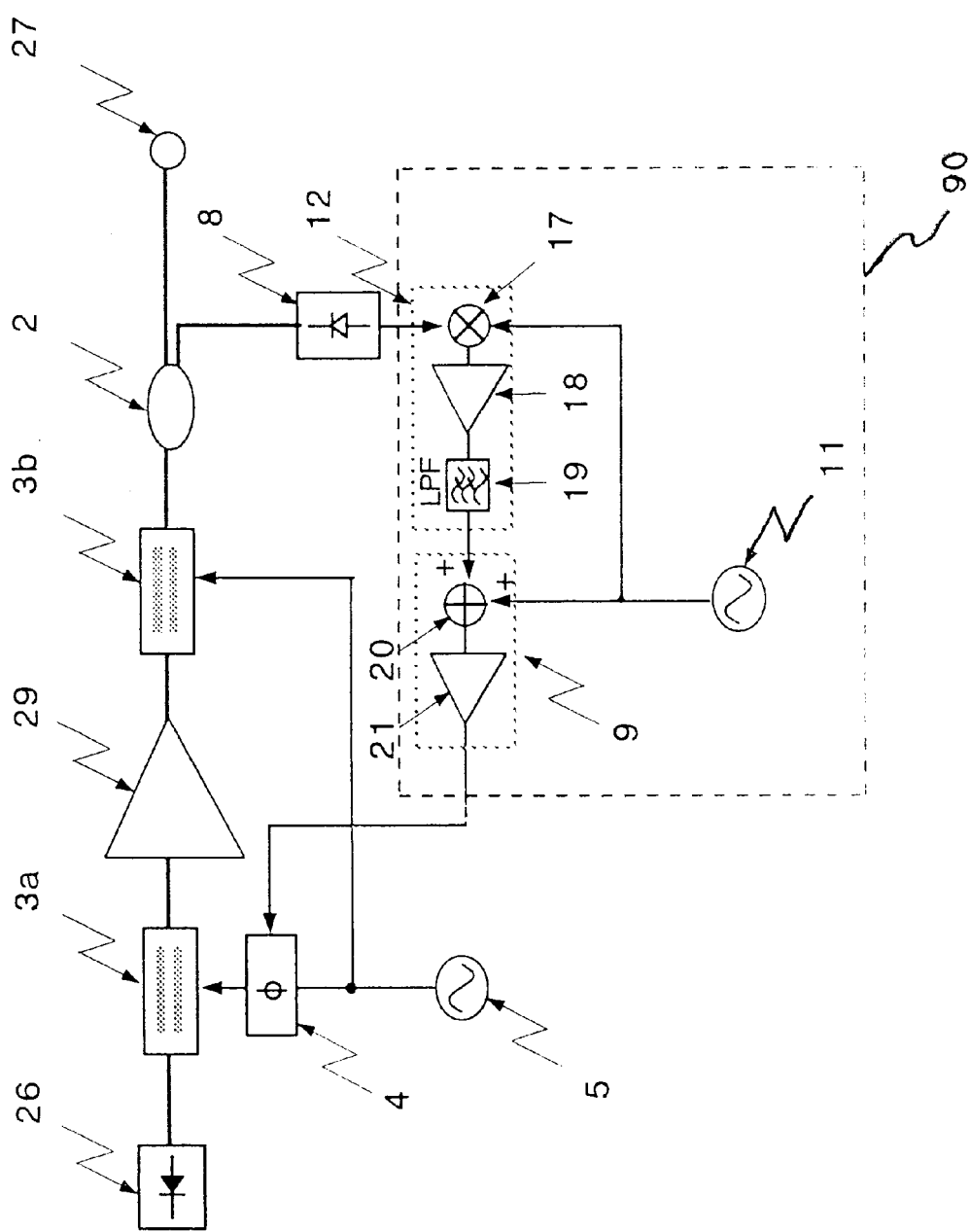
FIG. 23 shows a fundamental configuration block chart of an optical pulse generating apparatus according to embodiment 8 of this invention.

FIG. 23 shows a configuration block chart of an optical pulse generating apparatus according to another embodiment of this invention.

In FIG. 23, the phase shifter 4 controls the phase of the electric clock signal for driving the optical modulator 3a. Since a fluctuation in a transmission delay time of an optical signal generated in the optical amplifier 29 is compensated by controlling the phase of the optical pulse signal outputted from the optical modulator 3a, phases of the optical pulse inputted to the optical modulator 3b and the optical pulse outputted from the optical pulse output terminal 27 do not change. Therefore, as in FIG. 17, an optical pulse signal with a short pulse width can be generated, and the phase of the optical pulse outputted from the optical pulse output terminal 27 can be kept constant.

Embodiment 9.

Figure 24:
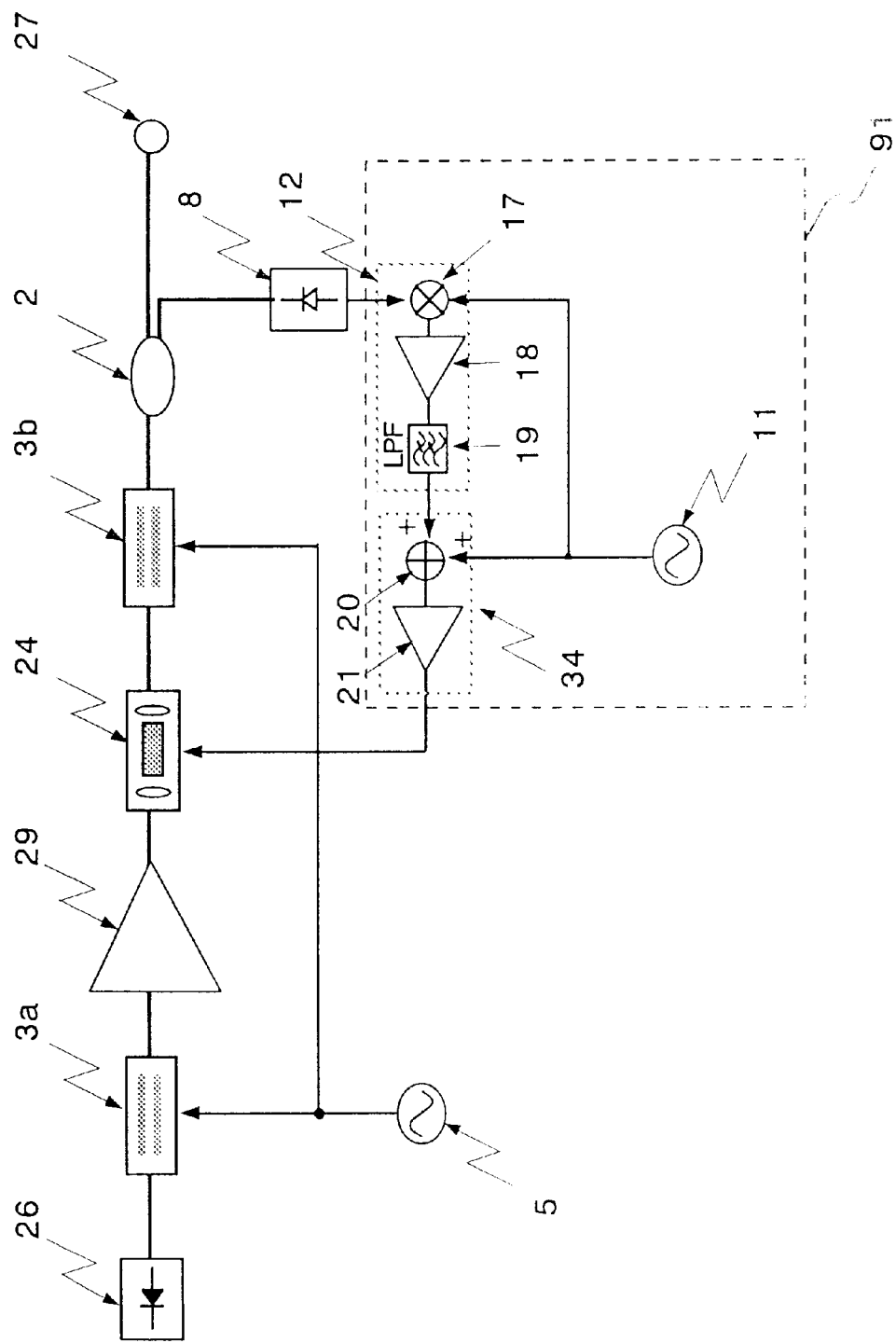
FIG. 24 shows a fundamental configuration block chart of an optical pulse generating apparatus according to embodiment 9 of this invention.

FIG. 24 shows a configuration block chart of an optical pulse generating apparatus according to an embodiment of this invention.

In FIG. 24, the optical delayer 24 which is a kind of the phase shifter according to this invention, the optical delayer controlling circuit 34 and a delay controlling circuit 91 which is a kind of a controlling circuit according to this invention are illustrated. The optical delayer controlling circuit 34 includes the adder 20 and the amplifier 21 which can be easily realized by operation amplifiers. The delay controlling circuit 91 includes the dither signal generating circuit 11, the phase comparator 12 and the optical delayer controlling circuit 34. The delay controlling circuit 91 may also be configured by the algorithm as shown in FIG. 4.

The optical delayer 24 controls a transmission delay time of the optical signal by a control signal outputted from the optical delayer controlling circuit 34. As the optical delayer 24, a device for changing a length of an optical transmission line by a step motor, a device for controlling the transmission delay time by giving a stress on an optical fiber by a piezo element, a device for changing a delay time by switching transmission lines, etc. may be used.

A basic operation of FIG. 24 is same as in FIG. 17. An optical delay amount of the optical delayer 24 is constantly optimized by a feedback control. Therefore, even if there is a fluctuation in a transmission delay time of the optical signal in the optical amplifier 29, driving signals for two optical modulators 3a and 3b constantly synchronize with the optical signal. Since two optical modulators synchronize, a short pulse is outputted from the optical pulse output terminal 27. Since the phase of the optical pulse signal outputted from the optical modulator 3a is controlled to compensate the fluctuation in the transmission delay time of the optical signal in the optical amplifier 29, phases of the optical pulse inputted to the optical modulator 3b and the optical pulse outputted from the optical pulse output terminal 27 do not change. Therefore, the phase of the optical pulse outputted from the optical pulse output terminal 27 can be kept constant.

Embodiment 10.

Figure 25:
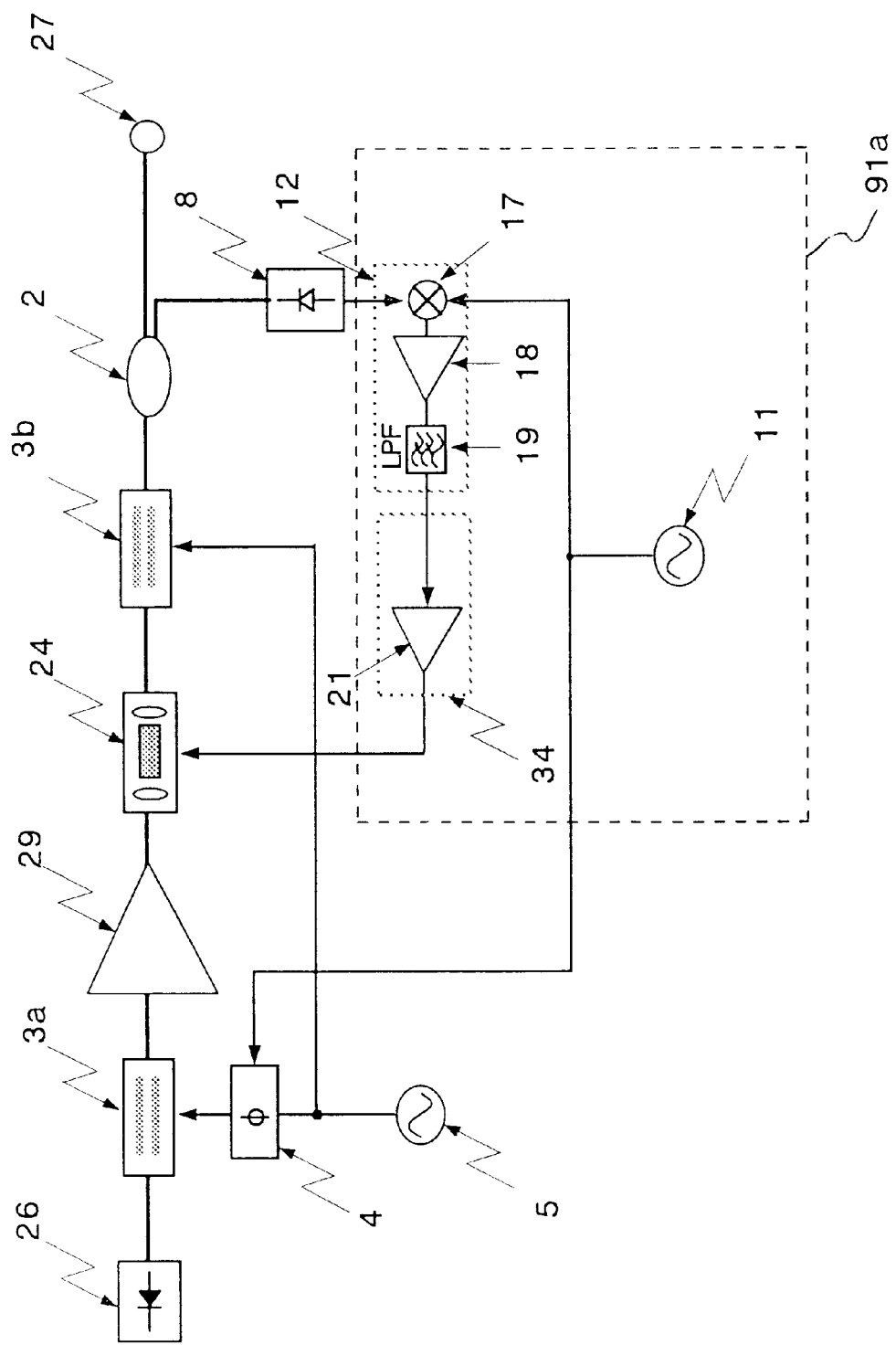
FIG. 25 shows a fundamental configuration block chart of an optical pulse generating apparatus according to embodiment 10 of this invention.

FIG. 25 shows a configuration block chart of another optical pulse generating apparatus according to an embodiment of this invention.

In FIG. 25, a delay controlling circuit 91a which is a kind of a controlling circuit according to this invention is illustrated. The phase changing unit according to this invention includes the phase shifter 4 and the optical delayer 24. The optical delayer controlling circuit 34 includes the amplifier 21.

In contrast to FIG. 24, a dither signal is superimposed on the phase shift amount of the phase shifter 4 in FIG. 25. Since the photo detector 8 detects a same signal even if the dither signal is superimposed in the optical delayer 24 as shown in FIG. 24 or the dither signal is superimposed in the phase shifter 4 as shown in FIG. 25, operations are same. However, it is easier to superimpose the dither signal in the phase shifter than the optical delayer 24. Since many realized optical delayers include a moving unit with a relatively low response frequency, e.g., such as a step motor, piezo element, etc., the optical delayers tend to respond to a dither signal which includes an alternate current element with a low frequency. In FIG. 25, the dither signal with a low frequency is not inputted to the optical delayer 24. Instead, a control signal with a direct current element generated from the error signal E is inputted to the optical delayer 24. Hence, an optical delayer with a relatively slow response can be used.

Embodiment 11

Figure 26:
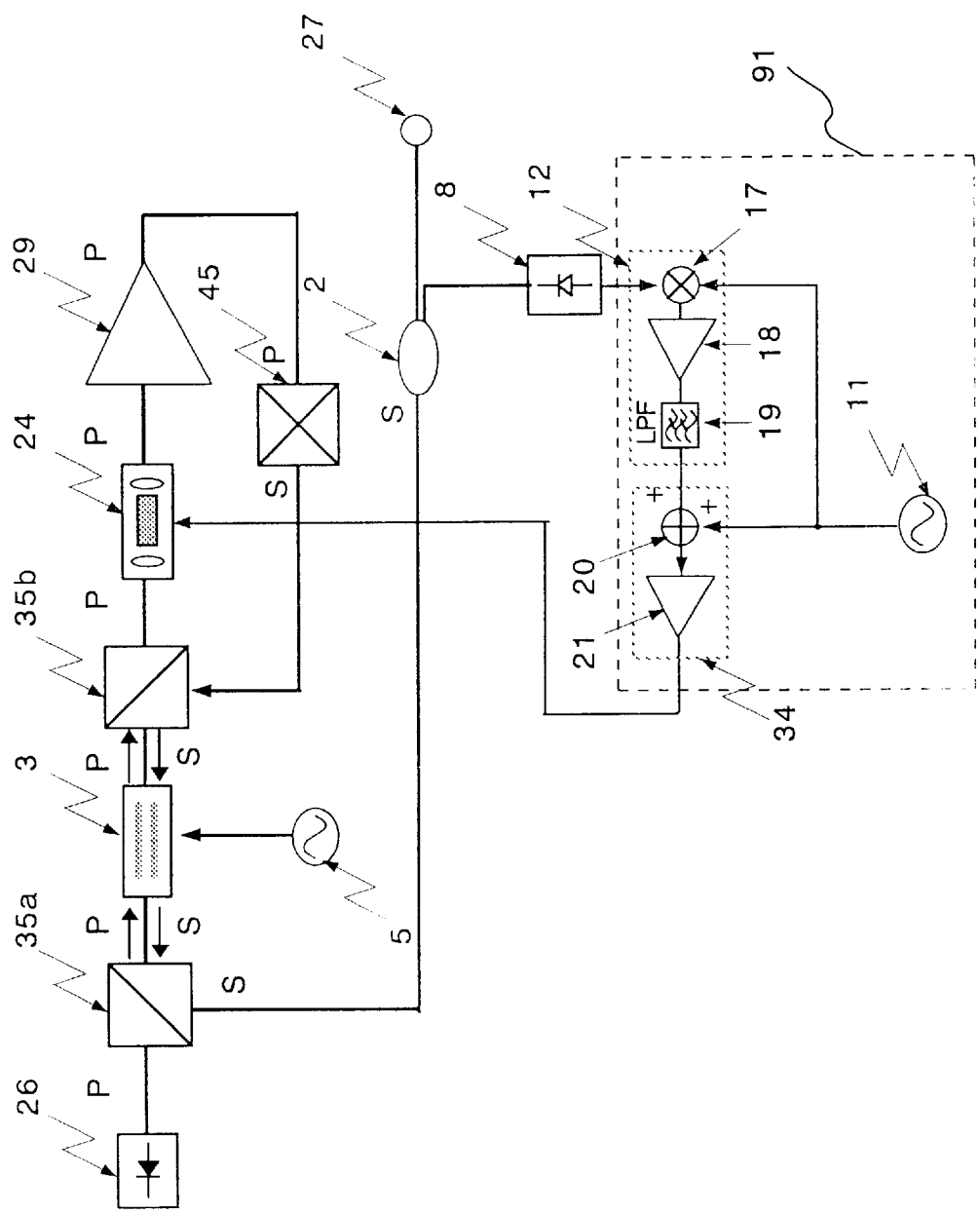
FIG. 26 shows a fundamental configuration block chart of an optical pulse generating apparatus according to embodiment 11 of this invention.

FIG. 26 shows a configuration block chart of an optical pulse generating apparatus according to another embodiment of this invention.

In FIG. 26, the first and second optical modulators are replaced by a single optical modulator.

In FIG. 26, a first polarization multiplexer/demultiplexer 35a, a second polarization multiplexer/demultiplexer 35b and a polarization state converter 45 are illustrated.

A polarized wave of an optical signal outputted from the light source 26 is adjusted to a determined polarized wave condition (P wave). A power level of the optical signal outputted from the light source 26 is modulated by an electric clock signal outputted from the oscillator 5 in the optical modulator 3 and an optical pulse signal is generated. Then, a power level of the optical pulse signal is amplified by the optical amplifier 29. The polarization multiplexer/demultiplexers 35a and 35b are devices which output optical signals from different ports according to the polarized wave condition (P or S wave) of the optical signal. The polarization multiplexer/demultiplexers are sold as polarization beam splitters and polarization prisms. Since the polarized wave condition of the optical signal outputted from the light source 26 is adjusted to a determined polarized wave condition (P wave), the polarization multiplexer/demultiplexer 35a outputs the optical signal received from the light source to the optical modulator 3. The optical signal outputted from the optical modulator 3 is outputted to the optical delayer 24 by the polarization multiplexer/demultiplexer 35b.

When a determined delay is provided to the optical signal by the optical delayer 24, a power level of the optical signal is amplified by the optical amplifier 29 and the optical signal is inputted to the polarization state converter 45. Then, a polarized wave of the optical signal is converted (P wave→S wave) by the polarization state converter 45 and inputted to the polarization multiplexer/demultiplexer 35b. The optical signal is returned to the optical modulator 3. The optical pulse re-modulated by the optical modulator 3 is outputted to the optical multiplexer 2 by the polarization multiplexer/demultiplexer 35a. Since the polarization state (S wave) is vertical to the polarization state (P wave) outputted from the light source 26, the optical pulse is not inputted to the light source 26.

As stated, the optical signal is transmitted to the optical modulator 3 twice and the power level of the optical signal is modulated twice by the optical modulator 3. Since the optical modulator 3 modulates synchronously with the inputted optical pulse signal by controlling the optical delayer 24, an optical pulse with a short pulse width is outputted from the optical pulse output terminal 27. A control principle of the optical delayer is same as in FIG. 24.

The polarization multiplexer/demultiplexers 35a and 35b may be replaced by optical multiplexer/demultiplexers. As the optical multiplexer/demultiplexers, cheap devices such as an optical coupler may be used. However, since the optical coupler has demultiplexing and branching loss fundamentally, the optical coupler is not appropriate as the optical multiplexer/demultiplexer judging from an optical S/N ratio (Optical Signal Noise Ratio).

Embodiment 12

Figure 27:
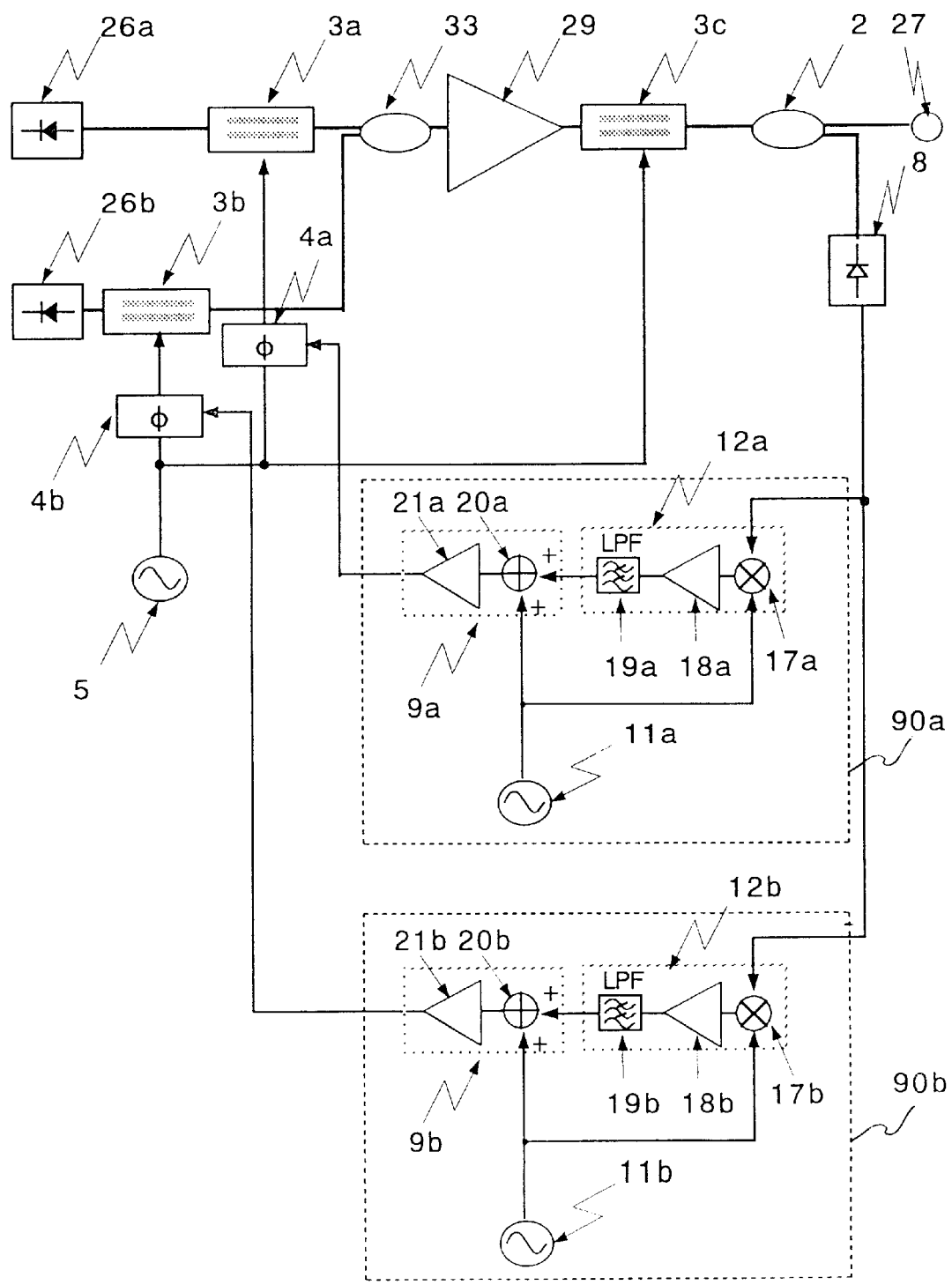
FIG. 27 shows a fundamental configuration block chart of an optical pulse generating apparatus according to embodiment 12 of this invention.

FIG. 27 shows a configuration block chart of an optical pulse generating apparatus according to an embodiment of this invention.

In FIG. 27, a first light source 26a, a second light source 26b, the first optical modulator 3a, the second optical modulator 3b, the optical demultiplexer 33, the optical amplifier 29, the third optical modulator 3c, the first phase shifter 4a, the second phase shifter 4b, a first phase controlling circuit 90a and a second phase controlling circuit 90b are illustrated. The first and second phase controlling circuits 90a, 90b include first and second phase shifter controlling circuits 9a, 9b, first and second dither signal generating circuits and first and second phase comparators 12a, 12b, respectively.

In FIG. 27, two light sources for outputting optical signals with different wavelengths are provided in addition to the elements in FIG. 23 and short pulses with different wavelengths are outputted from the optical pulse output terminal. An optical signal outputted from the first light source is modulated to a short pulse by the first optical modulator 3a and the third optical modulator 3c. An optical signal outputted from the second light source 26b is modulated to a short pulse by the second optical modulator 3b and the third optical modulator 3c. A phase of an electric clock signal for driving the optical modulator 3a is controlled by the first phase shifter 4a.

A driving signal for the first phase shifter 4a is outputted by the first phase shifter controlling circuit 9a. The first dither signal generating circuit 11a outputs a dither signal in a micro amplitude with a low frequency and the dither signal is applied to the phase shifter 4a by an adder 20a. Synchronization of the electric signal outputted from the photo detector 8 and the dither signal is detected by the first phase comparator 12a, which includes a mixer 17a, an amplifier 18a and a low-pass filter 19a. An output signal from the first phase comparator 12a is inputted to the adder 20a as an error signal. The output from the adder 20a is amplified by an amplifier 21a and outputted as the driving signal. Thus, a feedback circuit is configured.

Similarly, a phase of an electric clock signal for driving the optical modulator 3b is controlled by the second phase shifter 4b. A driving signal for the second phase shifter 4b is outputted by the second phase shifter controlling circuit 9b. The second dither signal generating circuit 11b outputs a dither signal in a micro amplitude with a low frequency. The dither signal is applied to the phase shifter 4b by an adder 20b. Synchronization of the electric signal outputted from the photo detector 8 and the dither signal is detected by the second phase comparator 12b, which includes a mixer 17b, an amplifier 18b and a low-pass filter 19b. An output signal from the second phase comparator 12b is inputted to the adder 20b as an error signal, the output of which is amplified by an amplifier 21b, and a feedback circuit is configured.

The first dither signal generating circuit 11a and the second dither signal generating circuit 11b output dither signals with different frequencies. For example, the first dither signal generating circuit 11a outputs a dither signal with a frequency of 10 kHz and the second dither signal generating circuit 11b outputs a dither signal with a frequency of 15 kHz.

In addition to the configuration in FIG. 27, third and fourth light sources may be connected in parallel to perform a similar feedback control. Then, short pulses with three or four different wavelengths can be outputted.

Embodiment 13

Figure 28:
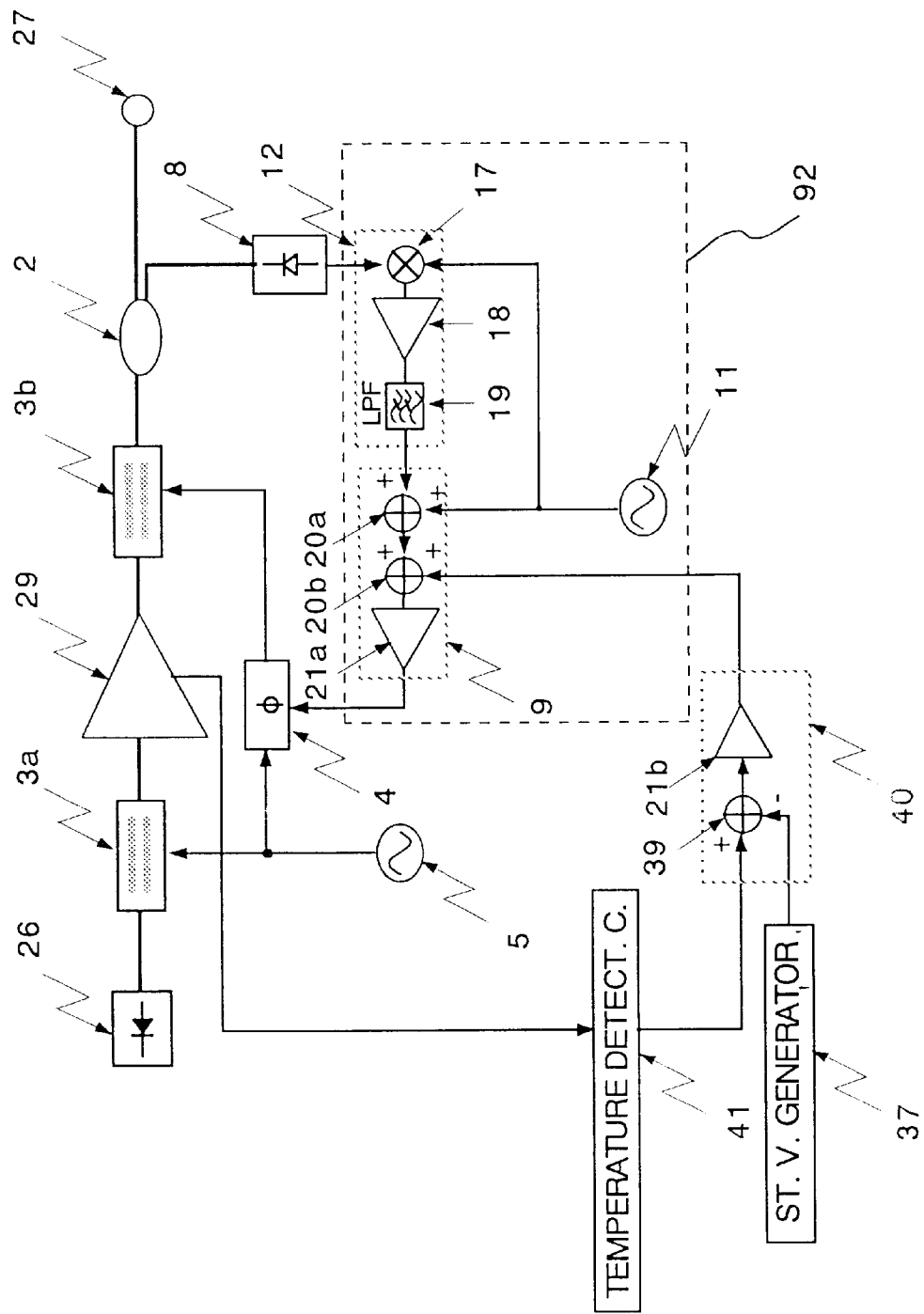
FIG. 28 shows a fundamental configuration block chart of an optical pulse generating apparatus according to embodiment 13 of this invention.

FIG. 28 shows a configuration block chart of an optical pulse generating apparatus according to another embodiment of this invention.

In FIG. 28, a delay controlling circuit 92 is illustrated. The phase shifter controlling circuit 9 includes the adders 20a and 20b and the amplifier 21a. In FIG. 28, a temperature detecting circuit 41, a reference voltage generator 37, a temperature drift detecting circuit 40, a subtractor 39 and the amplifier 21b are also illustrated.

In FIG. 28, the temperature detecting circuit 41, the reference voltage generator 37 and the temperature drift detecting circuit 40 are provided in addition to the elements in FIG. 17 to perform feed-forward controlling. The temperature detecting circuit 41 detects a temperature in an apparatus such as the optical amplifier 29. As the temperature detecting circuit 41, a thermistor element of which resistance value changes according to a temperature or a semiconductor element for detecting a temperature may be used. A change in a temperature of the optical amplifier 29 can be detected by calculating a difference between a voltage of an output signal from the temperature detecting circuit 41 and a reference voltage outputted from the reference voltage generator by the subtractor 39. A fluctuation of a delay time of an optical pulse inputted to the optical modulator 3b is primarily caused by a fluctuation of a transmission delay time in the optical amplifier 29. The transmission delay time in the optical amplifier 29 is caused by a change in a temperature of the optical amplifier. Therefore, a fluctuation of a delay time of the optical pulse inputted to the optical modulator 3b can be predicted by detecting a change in a temperature in the optical amplifier. A feed-forward control of the phase shift amount generated by the phase shifter 4 can be performed to compensate the predicted fluctuation of the delay time by inputting the output signal from the temperature drift detecting circuit 40 to the adder 20b.

Since the feed-forward control is performed, an error which must be compensated by the feedback circuit can be reduced. Hence, accurate processing can be achieved.

Further, even if a very big error is caused and the error is beyond a feeding range of the feedback circuit, the error can be reduced to the feeding range of the feedback circuit by feed-forward controlling. Hence, controlling for a wide dynamic range can be achieved and the optical pulse generating apparatus can operate in a wider temperature range.

Embodiment 14

Figure 29:
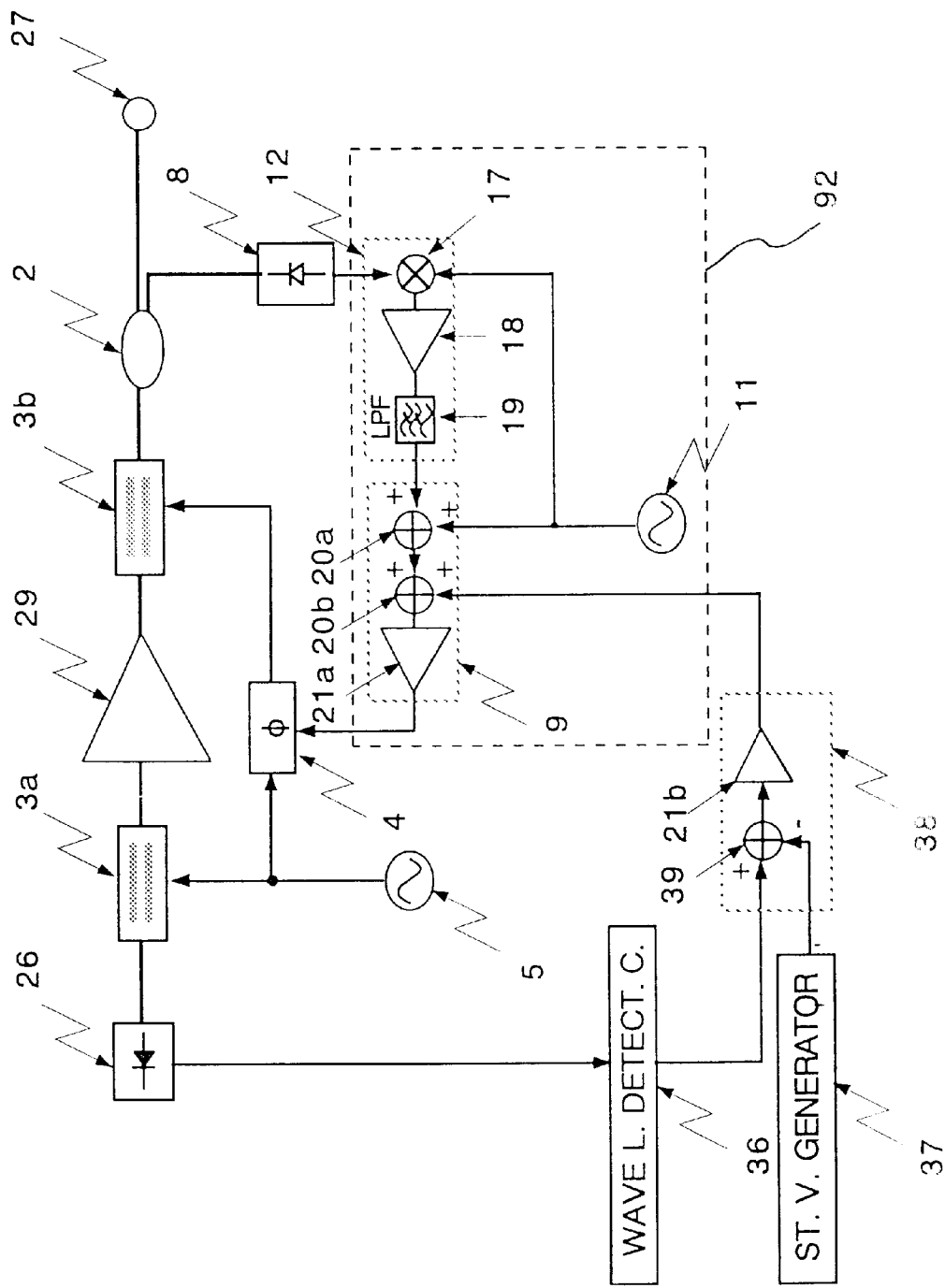
FIG. 29 shows a fundamental configuration block chart of an optical pulse generating apparatus according to embodiment 14 of this invention.

FIG. 29 shows a configuration block chart of an optical pulse generating apparatus according to another embodiment of this invention.

In FIG. 29, a wavelength detecting circuit 36, the reference voltage generator 37, a wavelength drift detecting circuit 38, the subtractor 39 and the amplifier 21b are illustrated.

In FIG. 29, the wavelength detecting circuit 36, the reference voltage generator 37 and the wavelength drift detecting circuit 38 are provided to perform feed-forward controlling in addition to the elements in FIG. 17. The wavelength detecting circuit 36 can use an output from a temperature controlling circuit of the light source 26, a wave meter, etc. A change in a wavelength of an optical signal outputted from the light source 26 can be detected by calculating a difference between an output signal from the wavelength detecting circuit 36 and a reference voltage outputted from the reference voltage generator 37 by the subtractor 39. A fluctuation in a delay time of an optical pulse inputted to the optical modulator 3b is primarily caused by a fluctuation in a transmission delay time of the optical amplifier 29. The transmission delay time of the optical amplifier 29 is caused by a change in a wavelength of an optical signal. Therefore, a change in a delay time of an optical pulse inputted to the optical modulator 3b can be predicted by detecting a change in a wavelength of an optical signal inputted to the optical amplifier. When an output signal from the wavelength drift detecting circuit 38 is inputted to the adder 20b, a feed-forward control of a phase shift amount generated by the phase shifter 4 can be performed to compensate a fluctuation in the predicted delay time.

Since the feed-forward controlling is added, an error which must be compensated by the feedback circuit can be reduced. Hence, more accurate processing can be achieved.

Further, even if a very big error is caused and the error is beyond a feeding range of the feedback circuit, the error can be reduced to the feeding range of the feedback circuit by feed-forward controlling. Hence, the optical pulse generating apparatus can operate in a wider dynamic range.

When both feed-forward controlling by the temperature drift detecting circuit as shown in FIG. 28 and feed-forward controlling by the wavelength drift detecting circuit as shown in FIG. 29 are performed, a control accuracy is further improved. The feed-forward controlling by the temperature drift detecting circuit in FIG. 28 and the feed-forward controlling by the wavelength drift detecting circuit in FIG. 29 may be used in other embodiments of this invention.

Embodiment 15

Figure 30:
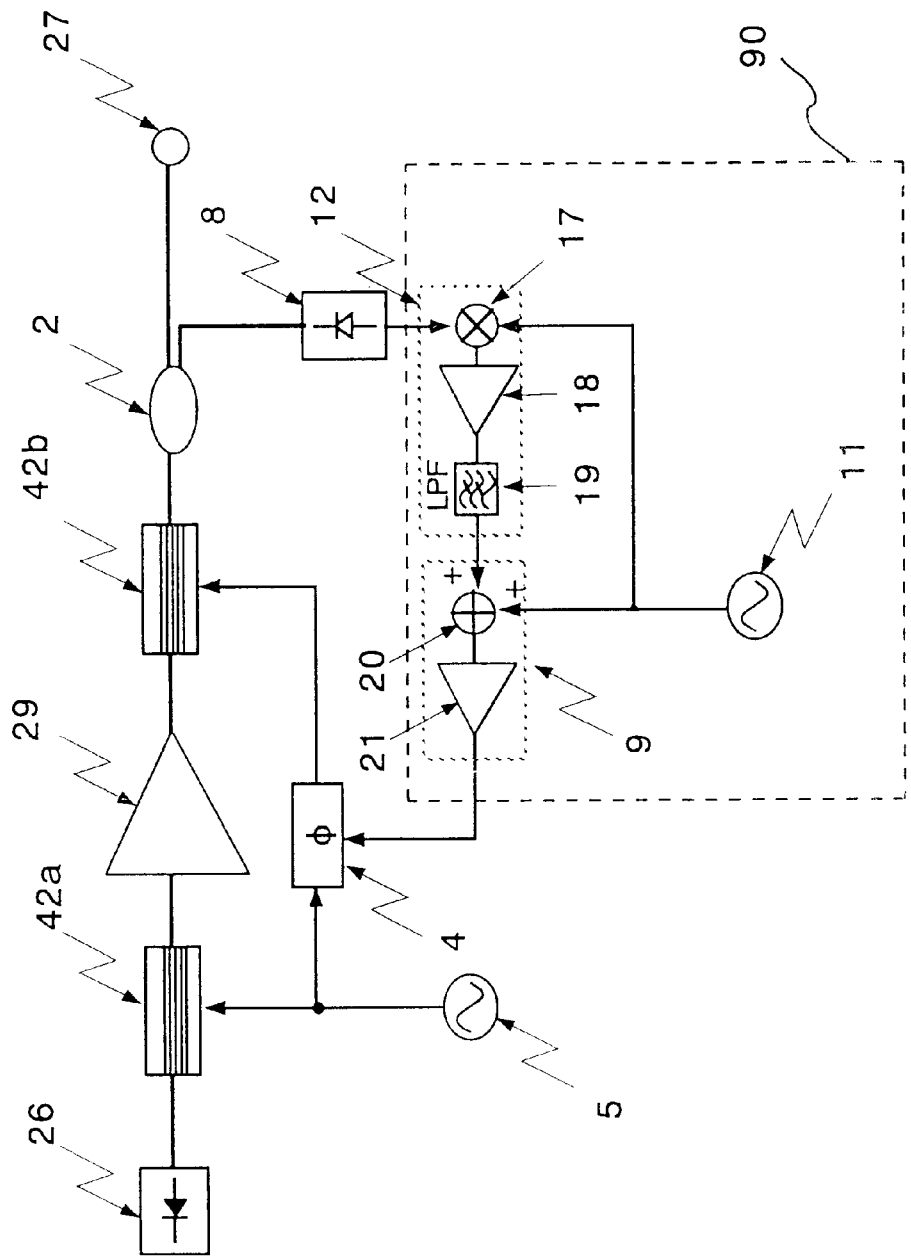
FIG. 30 shows a fundamental configuration block chart of an optical pulse generating apparatus according to embodiment 15 of this invention.

FIG. 30 shows a configuration block chart of an optical pulse generating apparatus according to another embodiment of this invention.

The optical modulators 3a and 3b in FIG. 17 are replaced by semiconductor electro-absorption type optical modulators 42a and 42b in FIG. 30.

As discussed for FIG. 11, since the semiconductor electro-absorption type optical modulators can realize steep gates, an optical pulse with a shorter width can be outputted. When a phase shift amount of the phase shifter changes even slightly, an optical power which is transmitted through the optical modulators changes considerably. Therefore, an optimal phase shift amount can be detected sensitively. Since the semiconductor electro-absorption type optical modulators provide steep gates, when the phase shift amount is much different from an optical value, an optical power outputted from the semiconductor electro-absorption type optical modulator 42b becomes small, and the error signal might not be detected. In that case, feed-forward controlling by the temperature drift detecting circuit as shown in FIG. 28 or feed-forward controlling by the wavelength drift detecting circuit as shown in FIG. 29 should be performed additionally.

Embodiment 16

Figure 31:
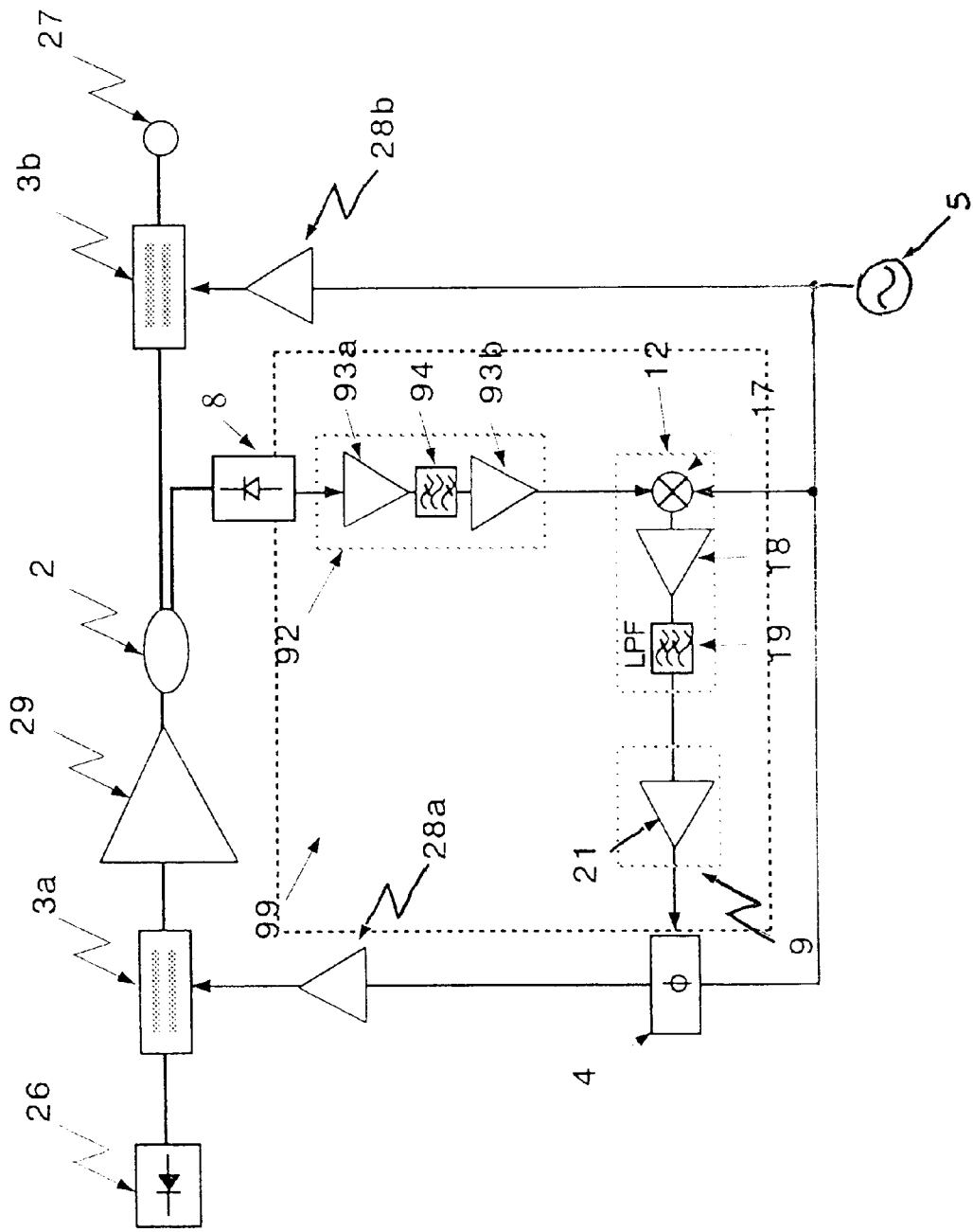
FIG. 31 shows a fundamental configuration block chart of an optical pulse generating apparatus according to embodiment 16 of this invention.

FIG. 31 shows a configuration block chart of an optical pulse generating apparatus according to another embodiment of this invention.

In FIG. 31, the light source 26 for oscillating an optical signal with a determined wavelength, the first optical modulator 3a, the optical amplifier 29, the second optical modulator 3b, the optical multiplexer 2, the optical pulse output terminal 27, the oscillator 5 for outputting an electric clock signal with a determined frequency and the phase shifter 4 which is a kind of a phase changing unit according to this invention are illustrated. In FIG. 31, the photo detector 8, a clock re-generating circuit 92, the phase comparator 12, the phase shifter controlling circuit 9, a first RF (Radio Frequency) amplifier 28a which is a kind of a first modulation signal generating circuit according to this invention and a second RF amplifier 28b which is a kind of a second modulation signal generating circuit according to this invention are illustrated.

In FIG. 31, a phase controlling circuit 99 which is a kind of a controlling circuit according to this invention is also illustrated. The phase controlling circuit 99 receives an electric signal from the photo detector 8 and an electric clock signal outputted from the oscillator 5 and controls a phase change amount of the phase shifter 4 to match a phase of the electric signal and a phase of the electric clock signal.

The clock re-generating circuit 92 includes limiter amplifiers 93a and 93b and a band-pass filter 94, for example. The phase shifter controlling circuit 9 includes the amplifier 21. The amplifier 21 can be easily realized by an operation amplifier. The phase comparator 12 includes the mixer 17, the amplifier 18 and the low-pass filter 19. The phase controlling circuit 99 includes the clock re-generating circuit 92, the phase comparator 12 and the phase shifter controlling circuit 9.

As the light source 26, a semiconductor laser diode, fiber laser, solid laser, etc. may be used. As the optical modulators 3a and 3b, Lithium Niobate (LiNbO3: Lithium Niobate) Mach-Zehnder (Mach-Zehnder) type optical modulator, semiconductor electro-absorption type optical modulator, etc. for controlling an optical power level by an electric signal may be used. The phase shifter 4 is a device for controlling a phase shift amount by an electric signal. As discussed regarding FIG. 1, many types of devices for the phase shifter are available in the market. As the optical amplifier 29, a fiber amplifier for using a fiber doped with a rare-earth element, a semiconductor optical amplifier for using a semiconductor, an optical amplifier for using non-linear effect such as Raman effect, etc. can be used.

A power level of an optical signal outputted from the light source 26 is modulated by an electric clock signal outputted from the oscillator 5 in the optical modulator 3a and an optical pulse signal is generated. The power level of the optical pulse signal is amplified by the optical amplifier 29. The optical pulse signal is outputted from the optical amplifier 29 and the power level of the optical pulse signal is further modulated by the optical modulator 3b. Since the phase shifter 4 controls the optical modulator 3a to modulate synchronously with the optical pulse signal inputted to the optical modulator 3b via the phase controlling circuit 99, a pulse width of the optical pulse outputted from the optical modulator 3b is less than a pulse width of the optical pulse inputted to the optical modulator 3b. The operations and effects are same as in FIG. 17.

The clock re-generating circuit 92 receives the electric signal from the photo detector 8 and outputs a re-generating clock signal. The phase comparator 12 receives the re-generating clock signal from the clock re-generating circuit 92 and the electric clock signal from the oscillator 5 and compares the phase of the re-generating clock signal and the phase of the electric clock signal. Then, the phase comparator 12 controls the phase shifter 4 to make an error to zero. This operation is discussed with reference to FIGS. 32, 33 and 34.

Figure 32:
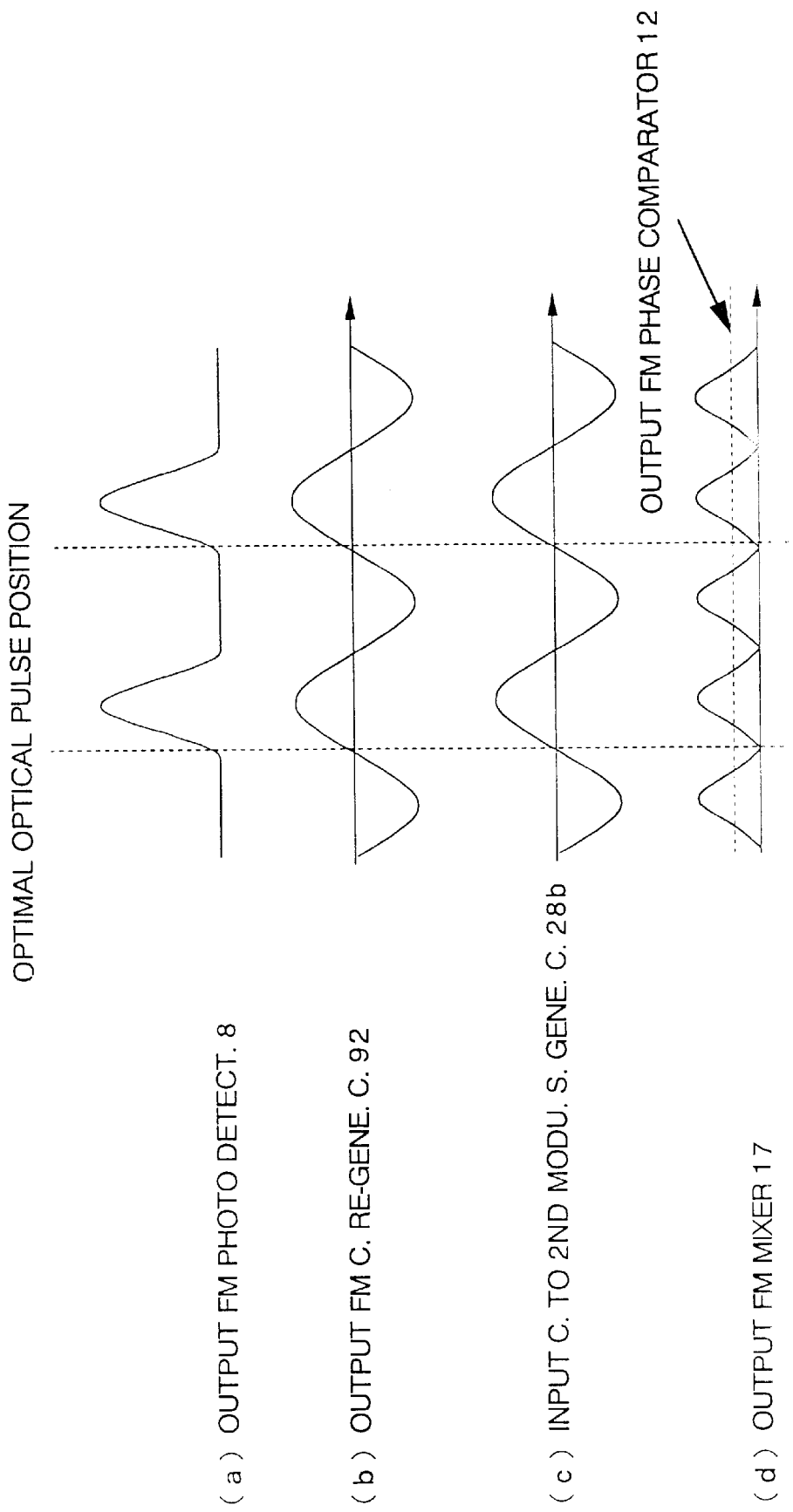
FIG. 32 shows an explanatory chart of an operation of the optical pulse generating apparatus of FIG. 31 when a phase shift amount is less than the optimal value.

FIG. 32 shows an operation when the phase shift amount of the phase shifter is more than an optimal value.

An output signal from the photo detector 8 is shown as (a) in FIG. 32. The clock re-generating circuit 92 extracts a re-generating clock signal as (b) in FIG. 32 from the signal from the photo detector 8. The re-generating clock signal outputted from the clock re-generating circuit and the electric clock signal inputted to the second modulation signal generating circuit (RF amplifier 28b in this case) as (c) in FIG. 32 are inputted to the mixer 17. Then, the mixer 17 outputs a signal as (d) in FIG. 32. When the output signal is inputted to the low-pass filter 19, an error signal with a positive value is outputted and the phase shift amount of the phase shifter is decreased. Accordingly, a phase of the electric clock signal as (c) in FIG. 32 is shifted to a direction of an optimal pulse position (left in FIG. 32).

Figure 33:
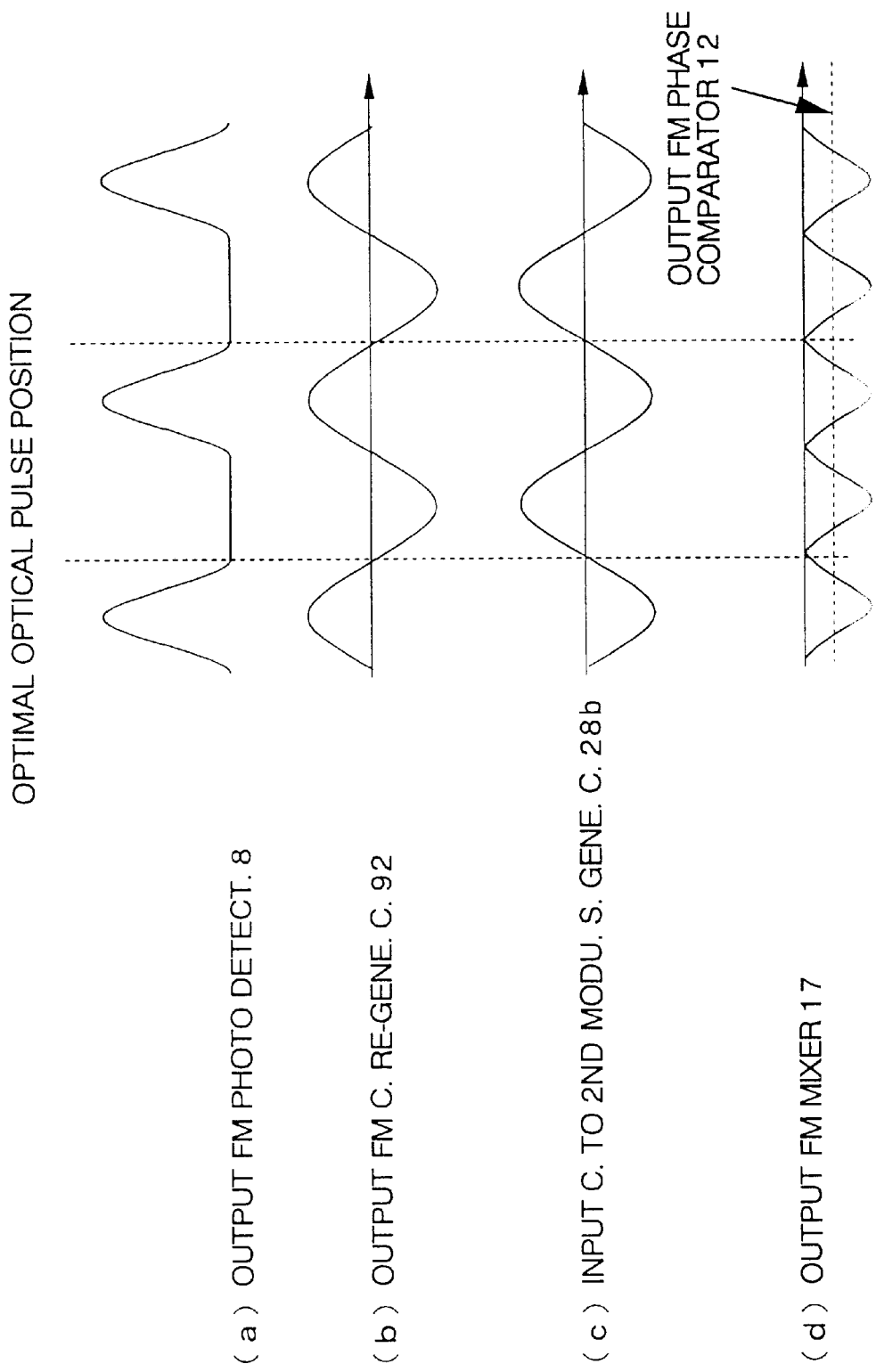
FIG. 33 shows an explanatory chart of an operation of the optical pulse generating apparatus of FIG. 31 when a phase shift amount is more than the optimal value.

FIG. 33 shows an operation when the phase shift amount of the phase shifter is less than the optimal value.

An output signal from the photo detector 8 is shown as (a) in FIG. 33. The clock re-generating circuit 92 extracts a re-generating clock signal as (b) in FIG. 33 from the re-generating clock signal. The re-generating clock signal outputted from the clock re-generating circuit and the electric clock signal inputted to the second modulation signal generating circuit (RF amplifier 28b in this case) as (c) in FIG. 33 are inputted to the mixer 17. Then, the mixer 17 outputs a signal as (d) in FIG. 33. When the output signal is inputted to the low-pass filter 19, an error signal with a negative value is outputted and the phase shift amount of the phase shifter is increased. Accordingly, a phase of the electric clock signal as (c) in FIG. 33 is shifted to a direction of an optimal pulse position (right in FIG. 33).

Figure 34:
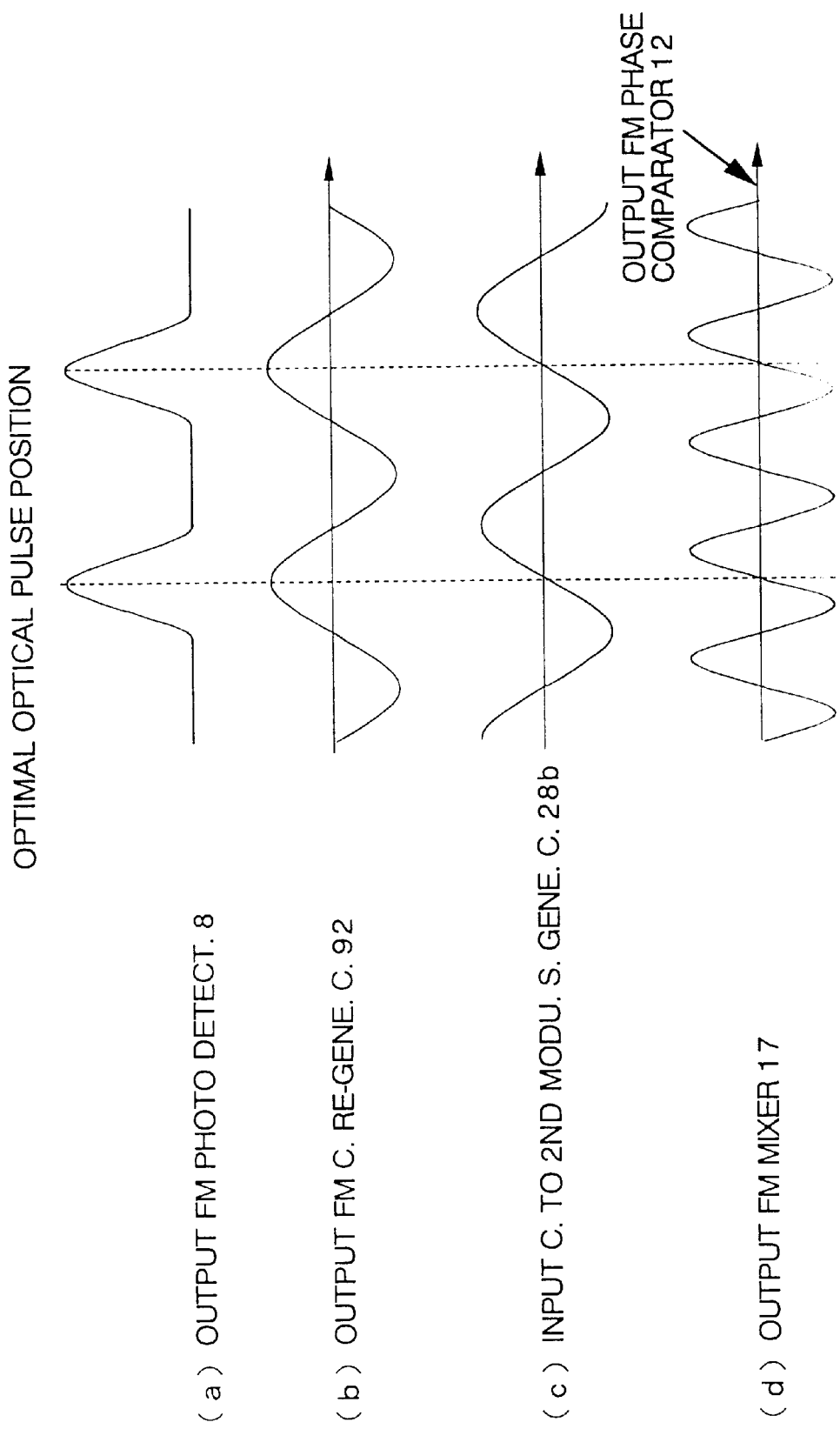
FIG. 34 shows an explanatory chart of an operation of the optical pulse generating apparatus of FIG. 31 when a phase shift amount is optimal.

In FIG. 34, the phase shift amount of the phase shifter is optimal.

An output signal from the photo detector 8 is shown as (a) in FIG. 34. The clock re-generating circuit 92 extracts a re-generating clock signal as (b) in FIG. 34 from the signal from the photo detector 8. The re-generating clock signal outputted from the clock re-generating circuit and the electric clock signal inputted to the second modulation signal generating circuit (RF amplifier 28b in this case) as (c) in FIG. 34. are inputted to the mixer 17. Then, the mixer 17 outputs a signal as (d) in FIG. 34. When the output signal is inputted to the low-pass filter 19, an error signal of zero is outputted. Accordingly, the phase of the electric clock signal is not changed.

As discussed, the phase shift amount is constantly controlled. Therefore, even if the transmission delay time of an optical signal in the optical amplifier 29 and a transmission line fluctuates, phases of the driving signals for two optical modulators 3a and 3b are kept constant.

Figure 35:
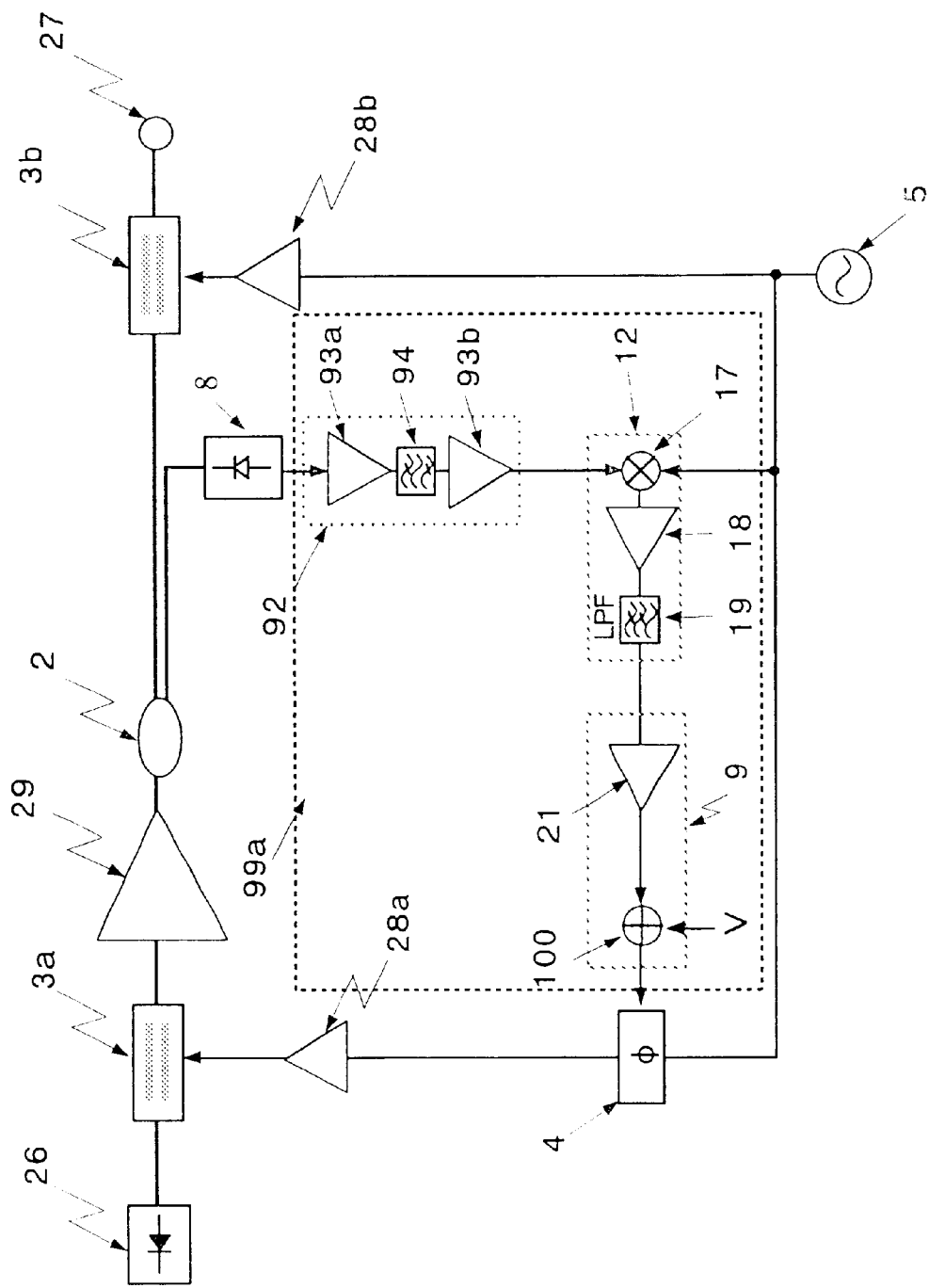
FIG. 35 shows a fundamental configuration block chart of an optical pulse generating apparatus of FIG. 31 including an adder.

A transmission delay time from the optical multiplexer 2 to the second optical modulator 3b, a transmission delay time from the optical multiplexer 2 to the mixer 17, a transmission delay time from the oscillator 5 to the mixer 17, a transmission delay time from the oscillator 5 to the first optical modulator 3a, and a transmission delay time from the oscillator 5 to the second optical modulator 3b are all different. Therefore, even if the mixer 17 controls to reduce the error to zero, the optical modulator 3a does not always synchronize. In order to synchronize two optical modulators 3a and 3b completely, an adder 100 for offering a proper offset voltage V to an output from the phase shifter controlling circuit 9 may be provided as shown in FIG. 35 in the configuration to control the phase relationship. Since the optical modulators synchronize completely, a short pulse is outputted from the optical pulse output terminal 27.

Since synchronization is detected according to this invention, a highly accurate control circuit can be realized in a relatively simple configuration. Further, it is not necessary to superimpose a dither signal according to this invention.

As discussed regarding FIG. 17, controlling is not performed to maximize an output according to this invention. Therefore, output wave-forms from the optical modulators 3a and 3b are not relied on. Therefore, in FIG. 31, RF amplifiers are used as the first modulation signal generating circuit and the second modulation signal generating circuit. However, as the modulation signal generating circuits, frequency multiplexer, waveform former, modulators, etc. may be also used.

Even if the optical amplifier 29 does not exist, a delay in transmission of an optical signal in a transmission line exists, this invention can still be applied.

When the oscillator 5 generates an electric clock signal with a sufficient power, the first modulation signal generating circuit and the second modulation signal generating circuit are not necessary.

Figure 36:
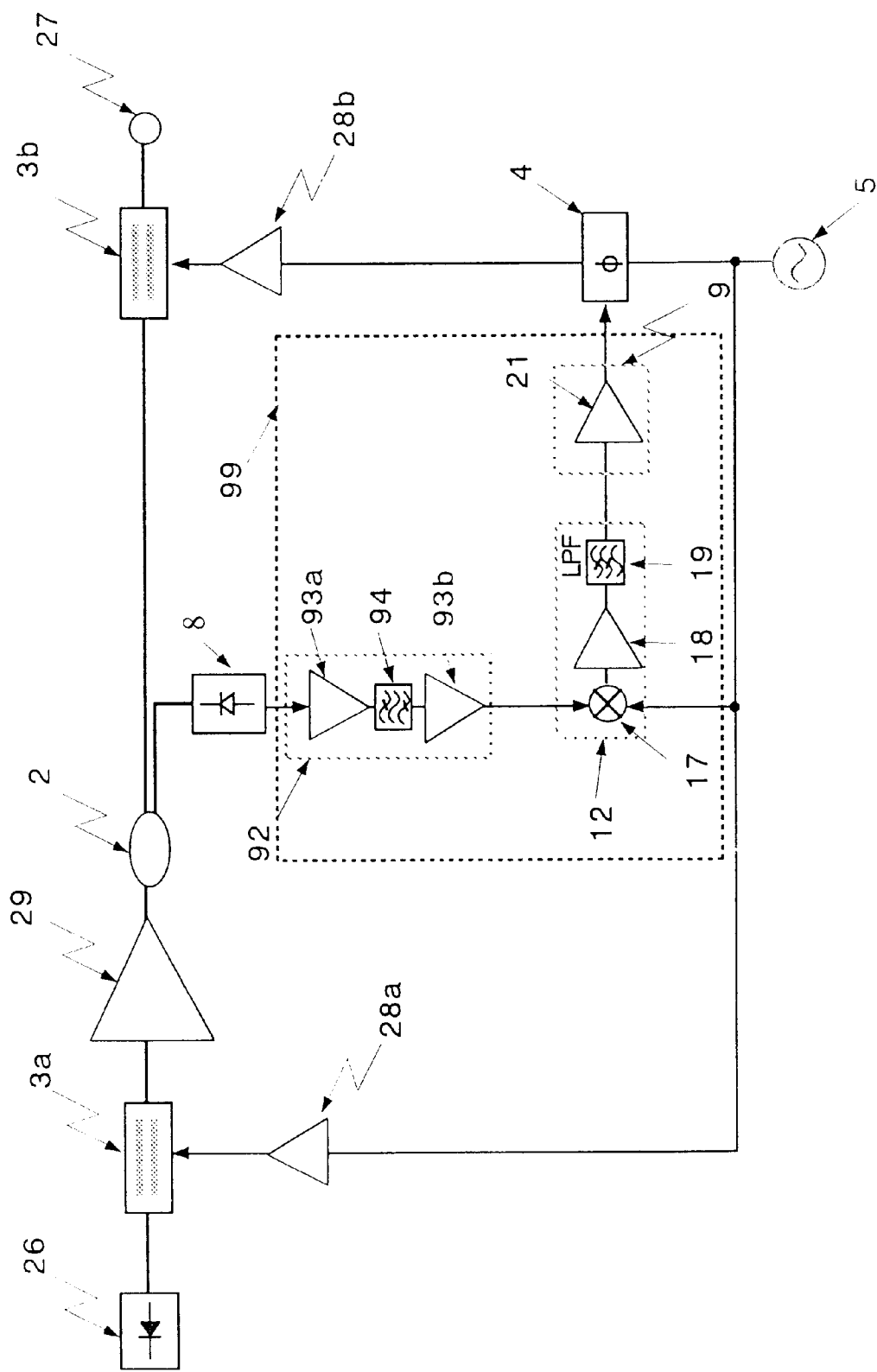
FIG. 36 shows a fundamental configuration block chart of an optical pulse generating apparatus of FIG. 31 with a phase shifter relocated.

When the phase shifter 4 is provided at an input side of the second modulation signal generating circuit as shown in FIG. 36, this invention can still be applied.

In the configuration of FIG. 36. a change in a controlling object (phase shifter 4 in this case) is not detected to return to the controlling object. Therefore, it is a kind of feed-forward circuit. The inventors have confirmed through experiments that effects of this invention can be achieved even in such feed-forward circuits.

Figure 37:
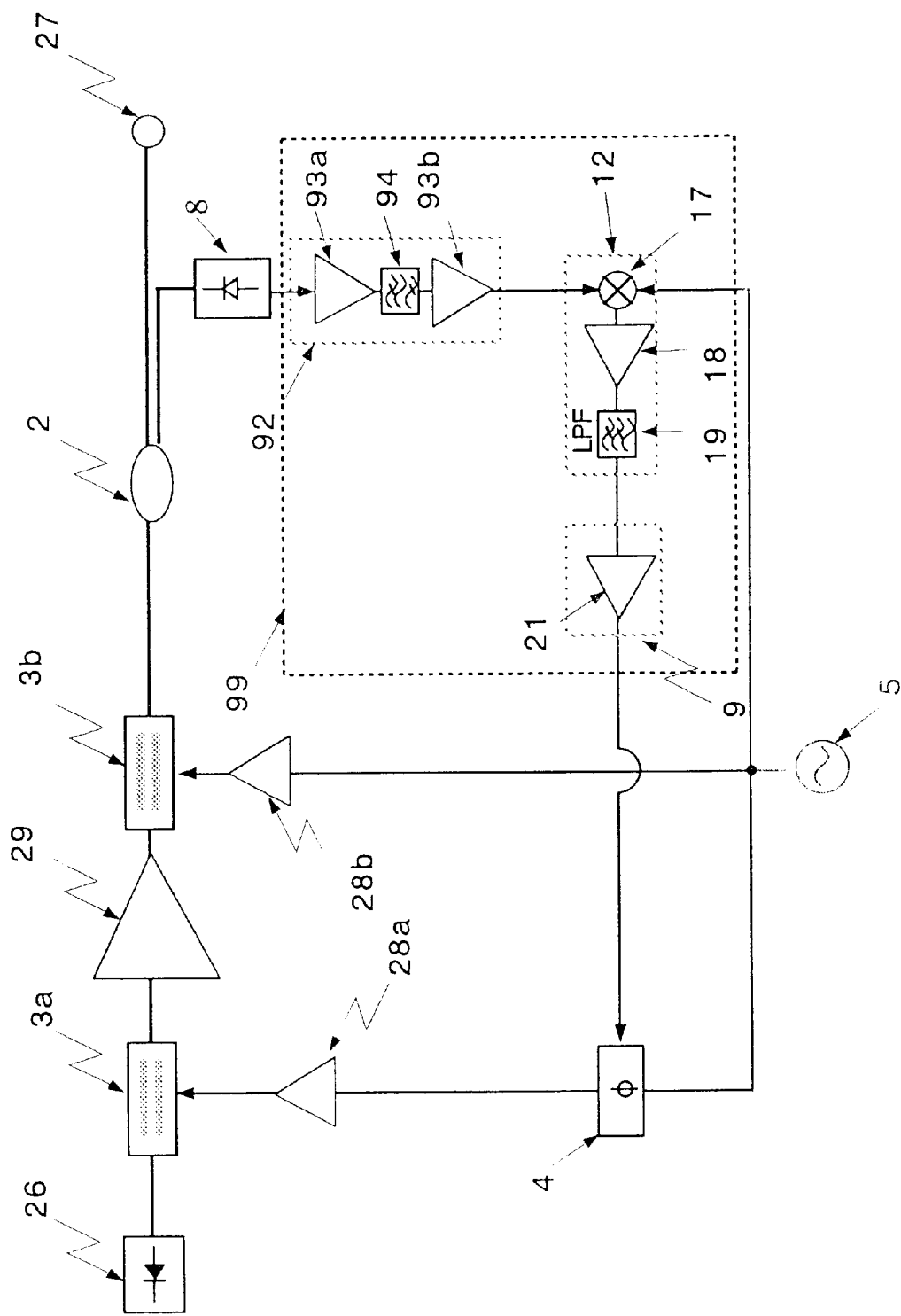
FIG. 37 shows a fundamental configuration block chart of an optical pulse generating apparatus of FIG. 31 with a multiplexer repositioned.
Figure 38:
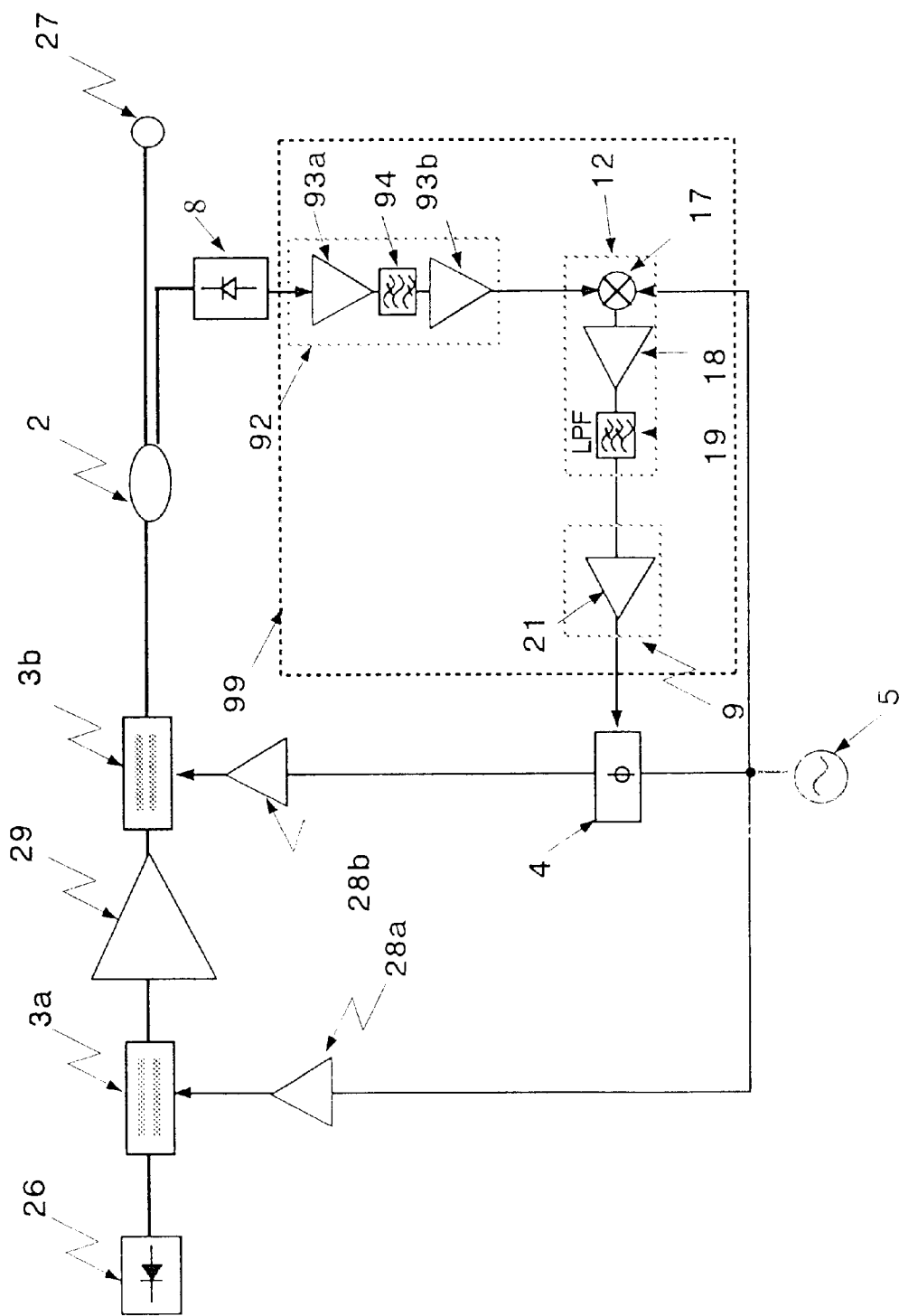
FIG. 38 shows a fundamental configuration block chart of an optical pulse generating apparatus of FIG. 36 with a multiplexer repositioned.

As illustrated in FIGS. 37 and 38, the optical multiplexer 2 can be provided at an output side of the optical modulator 3b instead of the input side of the optical modulator 3b. Further, in the configuration of FIG. 17, the optical multiplexer 2 may be provided at an output side of the optical modulator 3b instead of the input side of the optical modulator 3b.

Embodiment 17

Figure 39:
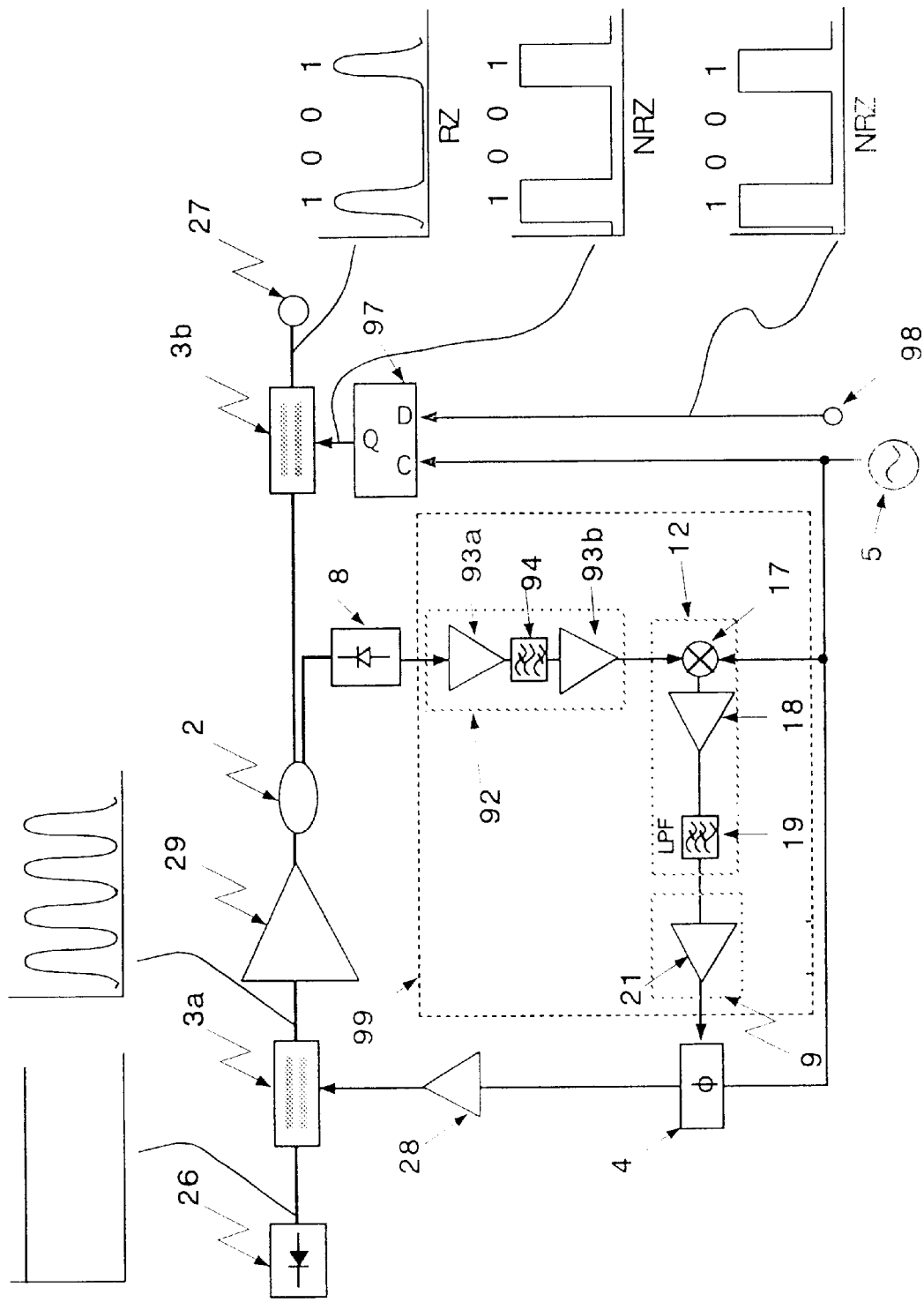
FIG. 39 shows a fundamental configuration block chart of an optical pulse generating apparatus according to embodiment 17 of this invention.

FIG. 39 shows a configuration block chart of a pulse generating circuit according to an embodiment of this invention.

A distinguisher 97 may be realized with a D-type flip-flop, for example. The D-type flip-flop delays a data inputted from a data input D by a clock signal inputted from a clock input C and outputs from an output Q. Hence, data inputted from the data signal input terminal 98 is synchronized with the clock signal and outputted to the optical modulator 3b. Accordingly, an optical signal inputted to the optical modulator 3b and a modulation signal for driving the optical modulator 3b can be synchronized. Other operation principles are the same as in FIG. 31.

FIG. 39 shows a case in which a signal with RZ (Return to Zero) format is modulated by NRZ (Non Return to Zero) signal.

A phase relationship of modulation signals for driving the optical modulators 3a and 3b can be controlled by providing the adder 100 for providing a proper offset voltage V to an output from the phase shifter controlling circuit 9 as shown in FIG. 35. Even if a phase fluctuation amount changes in the optical amplifier 29, other transmission lines and circuits, the phase relationship of the optical modulators can be kept constant by controlling the offset voltage V.

According to this embodiment, since the optical pulse generated by the optical modulator 3a is modulated by a data signal inputted from the data signal input terminal 98, an optical pulse generating apparatus for generating a modulated pulse can be provided. As modulation methods for this embodiment, there are a power level modulation method, phase modulation method, frequency modulation method, polarization plane modulation method, etc.

For the configuration in FIGS. 35–38, the distinguisher 97 in FIG. 39 may be provided.

Embodiment 18

Figure 40:
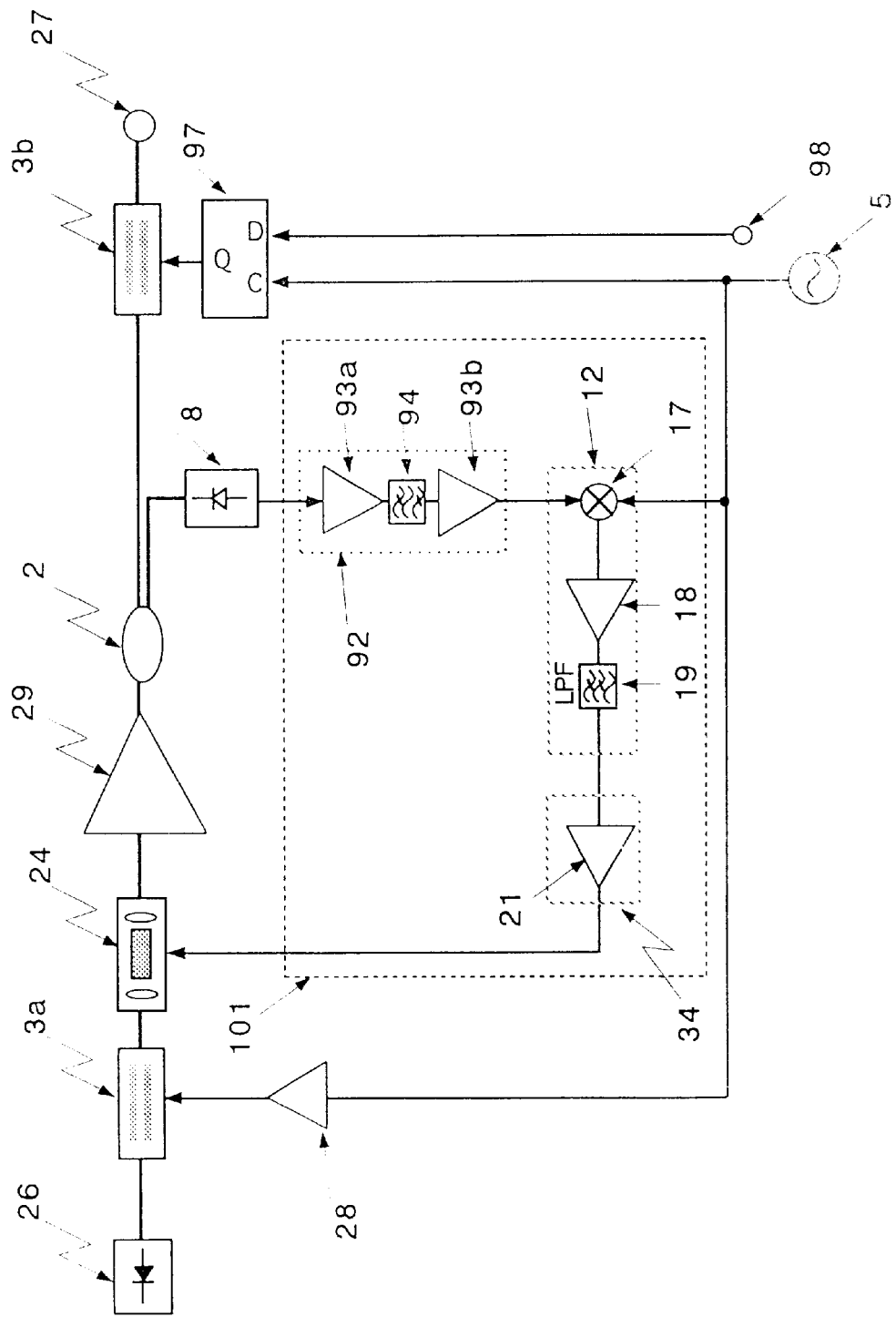
FIG. 40 shows a fundamental configuration block chart of an optical pulse generating apparatus according to embodiment 18 of this invention.

FIG. 40 is a configuration block chart of a pulse generating apparatus according to an embodiment of this invention.

In FIG. 40, the light source 26 for oscillating an optical signal with a determined wavelength, the first optical modulator 3a, the delayer 24, the optical amplifier 29, the second optical modulator 3b, the optical multiplexer 2, and the optical pulse output terminal 27 are illustrated. In FIG. 40, the oscillator 5, the photo detector 8, the clock re-generating circuit 92, the phase comparator 12, the optical delayer controlling circuit 34, the first RF amplifier 28 which is a kind of the first modulation signal generating circuit, the distinguisher 97 which is a kind of the second modulation signal generating circuit according to this invention, the data signal input terminal 98, and a delay controlling circuit 101 which is a kind of a controlling circuit according to this invention are also illustrated.

The clock re-generating circuit 92 includes limiter amplifiers 93a and 93b and the band-pass filter 94. The optical delayer controlling circuit 34 includes the amplifier 21. The amplifier 21 can be easily realized by an operation amplifier. The phase comparator 12 includes the mixer 17, the amplifier 18, and the low-pass filter 19. The delay controlling circuit 101 includes the clock re-generating circuit 92, the phase comparator 12, and the optical delayer controlling circuit 34.

Fundamental operations are same as in FIG. 39. The optical modulator 3a and the optical modulator 3b can be synchronized by inputting an error signal from the phase comparator 12 to the optical delayer 24.

The optical delayer 24 may be connected to an output side of the optical amplifier 29 instead of an input side of the optical amplifier 29.

The optical multiplexer 2 may be connected to an output side of the optical modulator 3b instead of an input side of the optical modulator 3b as shown in FIGS. 37 and 38.

Embodiment 19

Figure 41:
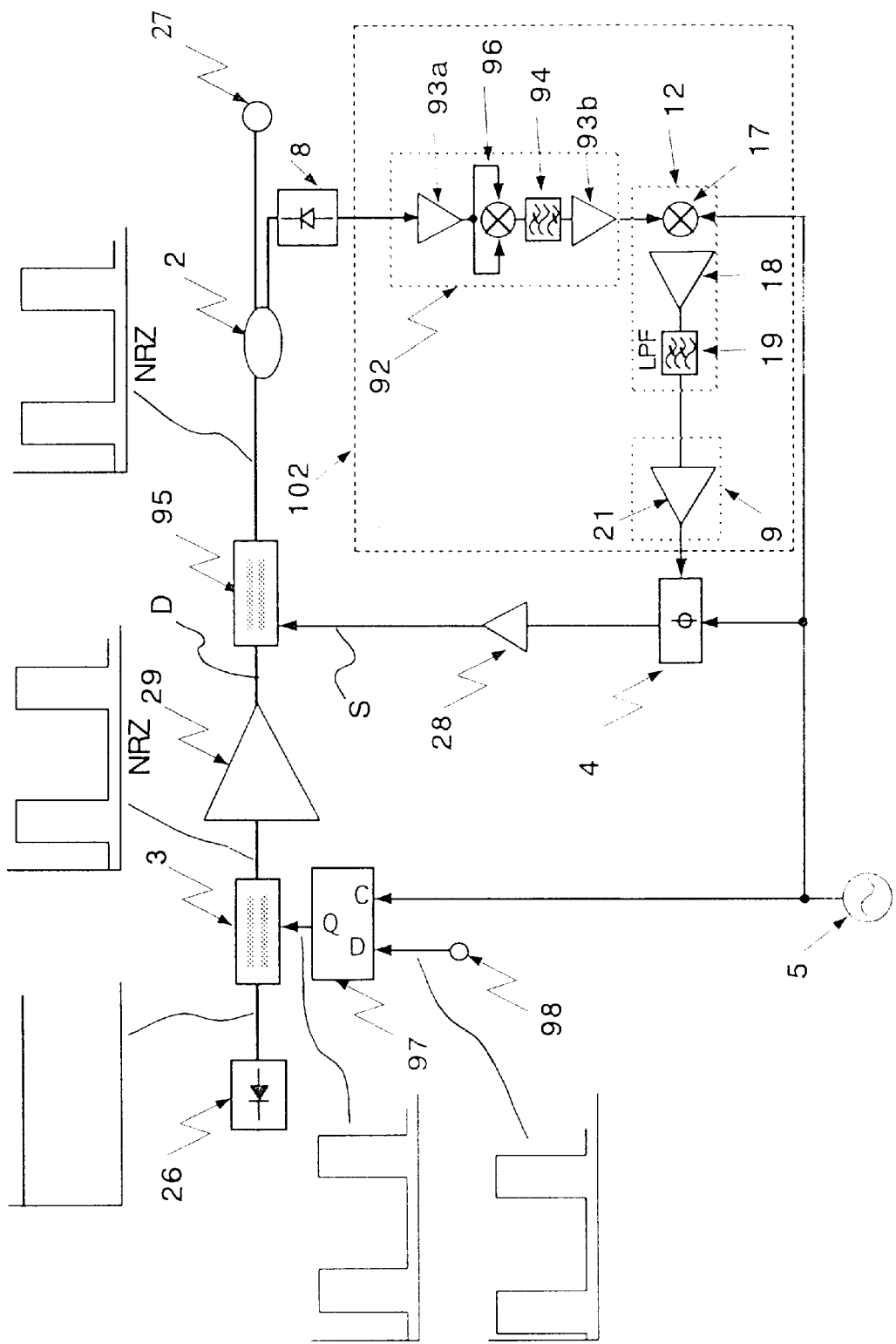
FIG. 41 shows a fundamental configuration block chart of an optical pulse generating apparatus according to embodiment 19 of this invention.

FIG. 41 shows a configuration block chart of a bit synchronization circuit which includes a polarization scrambler according to an embodiment of this invention.

In FIG. 41, the light source 26 for oscillating an optical signal with a determined wavelength, the optical modulator 3, the distinguisher 97 which is the first modulation signal generating circuit, the data signal input terminal 98, the oscillator 5, the optical amplifier 29 for compensating a loss of the optical modulator 3 and the polarization scrambler 95 which is an embodiment of the optical modulator are illustrated. In FIG. 41, the optical multiplexer 2, the optical signal output terminal 27, the RF amplifier 28 which is an embodiment of the second modulation signal generating circuit, the photo detector 8, the clock re-generating circuit 92, the phase comparator 12, the phase shifter controlling circuit 9, and a phase controlling circuit 102 which is a kind of the controlling circuit according to this invention are also illustrated.

The clock re-generating circuit 92 includes the limiter amplifiers 93a and 93b, a multiplexer 96 and the band-pass filter 94. The phase shifter controlling circuit 9 includes the amplifier 21. The amplifier 21 can be easily realized by an operation amplifier. The phase comparator 12 includes the mixer 17, the amplifier 18, and the low-pass filter 19.

Operations are as follows.

A power level of an optical signal outputted from the light source 26 is modulated by the optical modulator 3. Generally, a modulation format of NRZ (Non Return to Zero) is used. A driving signal for the optical modulator 3 is generated from a clock signal outputted from the oscillator 5 and a data signal inputted from the data signal input terminal 98 by the distinguisher 97. An output from the distinguisher 97 is generally amplified by a voltage amplifying circuit (not illustrated), if necessary.

The optical amplifier 29 compensates for a loss in the optical signal of which poser level is modulated. As discussed in other embodiments, the optical amplifier 29 includes optical fibers of several to several tens of meters, a fluctuation in transmission delay time due to environment temperatures cannot be ignored. Polarization scramble is performed for an optical signal inputted to the polarization scrambler 95 which is modulated in power level by a clock signal outputted from the RF amplifier 28. However, the phase relationship of the data signal D and the polarization scramble signal S must be kept constant.

A part of an optical signal outputted from the polarization scrambler is branched by the optical multiplexer 2. Then, an optical signal is converted to an electric signal by the photo detector 8. Since a power level is not changed by the polarization scramble, an electric signal detected by the photo detector 8 is also an electric signal like the electric signal detected from a power modulation signal applied by the optical modulator 3.

The electric signal is converted and a re-generating clock signal is re-generated from the clock re-generating circuit 92. The clock re-generating circuit 92 includes the multiplexer 96 which includes the mixer, the band-pass filter 94, the amplifier and the limiter. A phase-lock loop circuit may be provided as the clock re-generating circuit 92 to achieve a same effect. Phases of the re-generating clock signal and the electric clock signal outputted from the oscillator 5 are compared in the mixer 17.

A voltage signal corresponding to a relationship between the phase of the electric clock signal and the phase (data phase) of the clock signal re-generated from the electric signal detected by the photo detector 8 in the mixer 17 is compared with a determined reference voltage in the amplifier 21. Then, an error signal is outputted. The phase shifter 4 is driven by the error signal and a phase of the data signal D in the polarization scrambler and a phase of the polarization signal S are synchronized.

Figure 42:
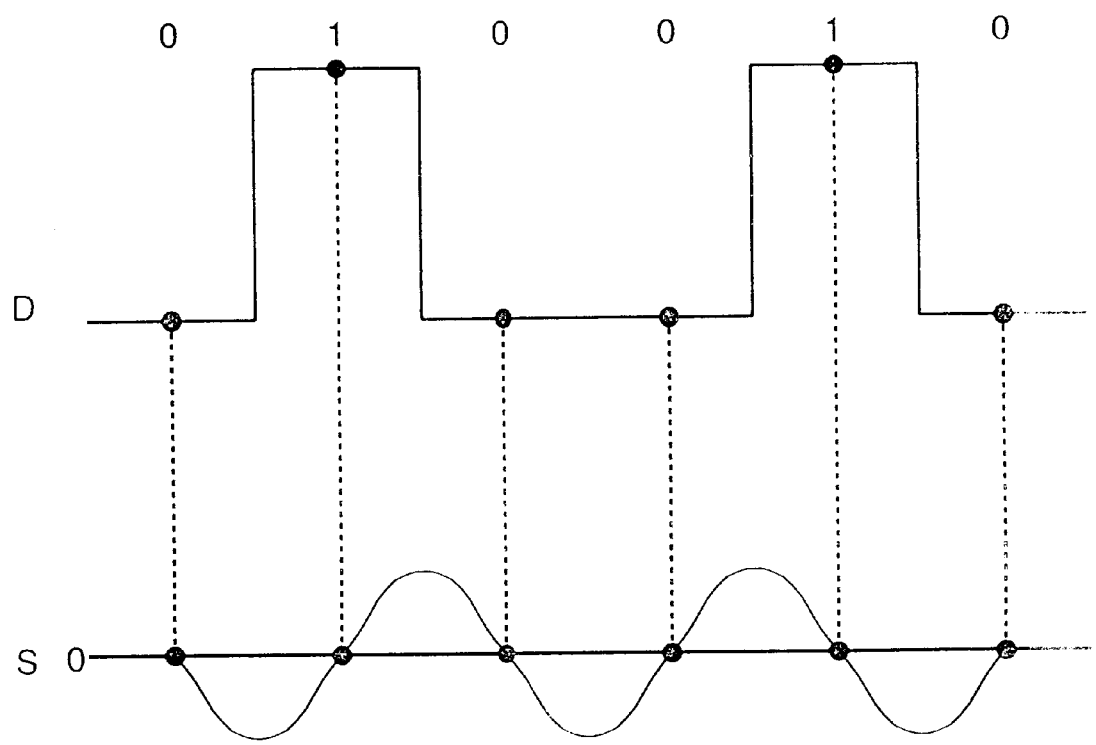
FIG. 42 shows a block chart showing relationship a data signal D and a polarization scramble signal S for the apparatus of FIG. 41.
Figure 43:
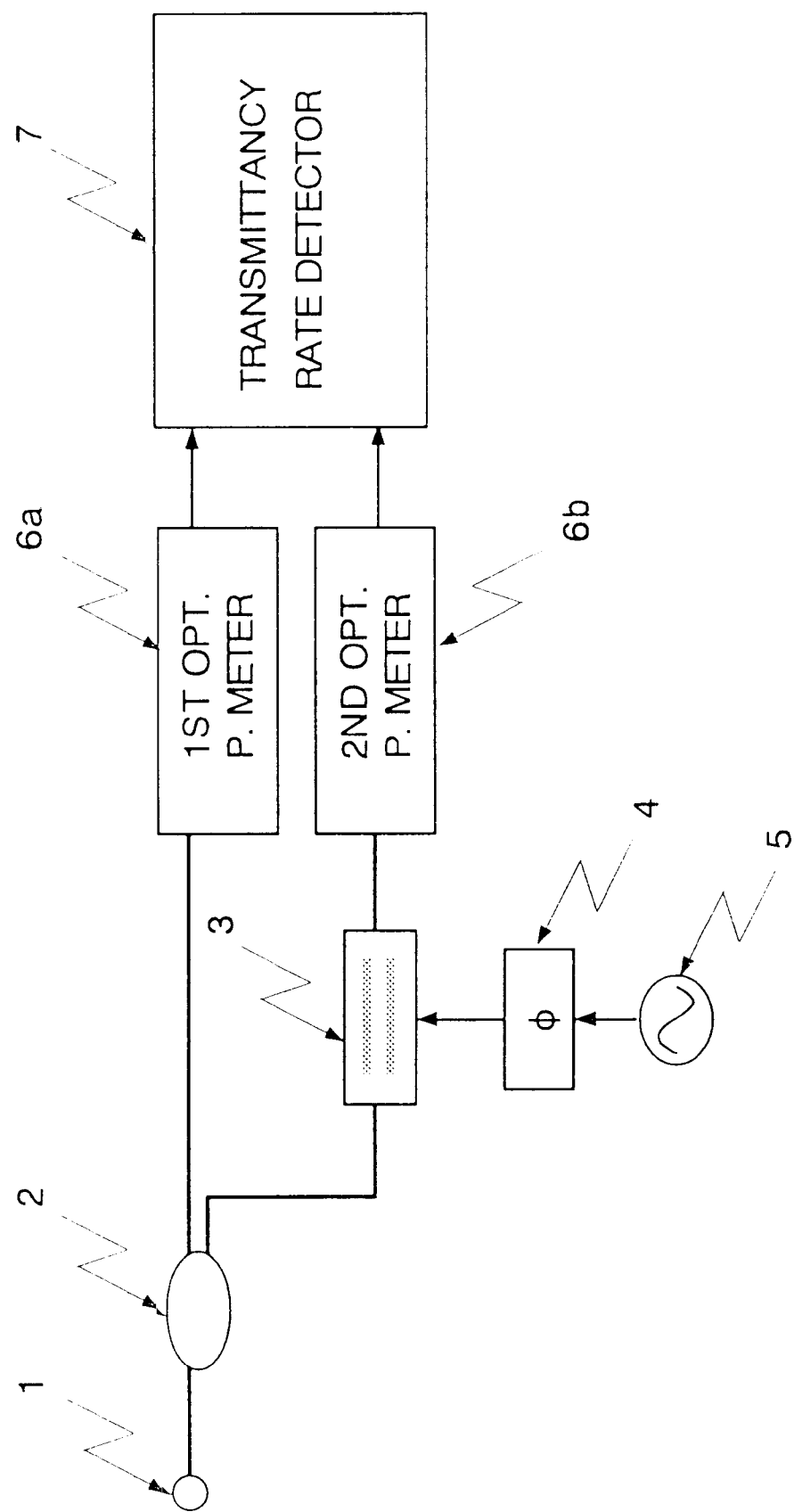
FIG. 43 shows a block chart for controlling phases between optical modulators.
Figure 44:
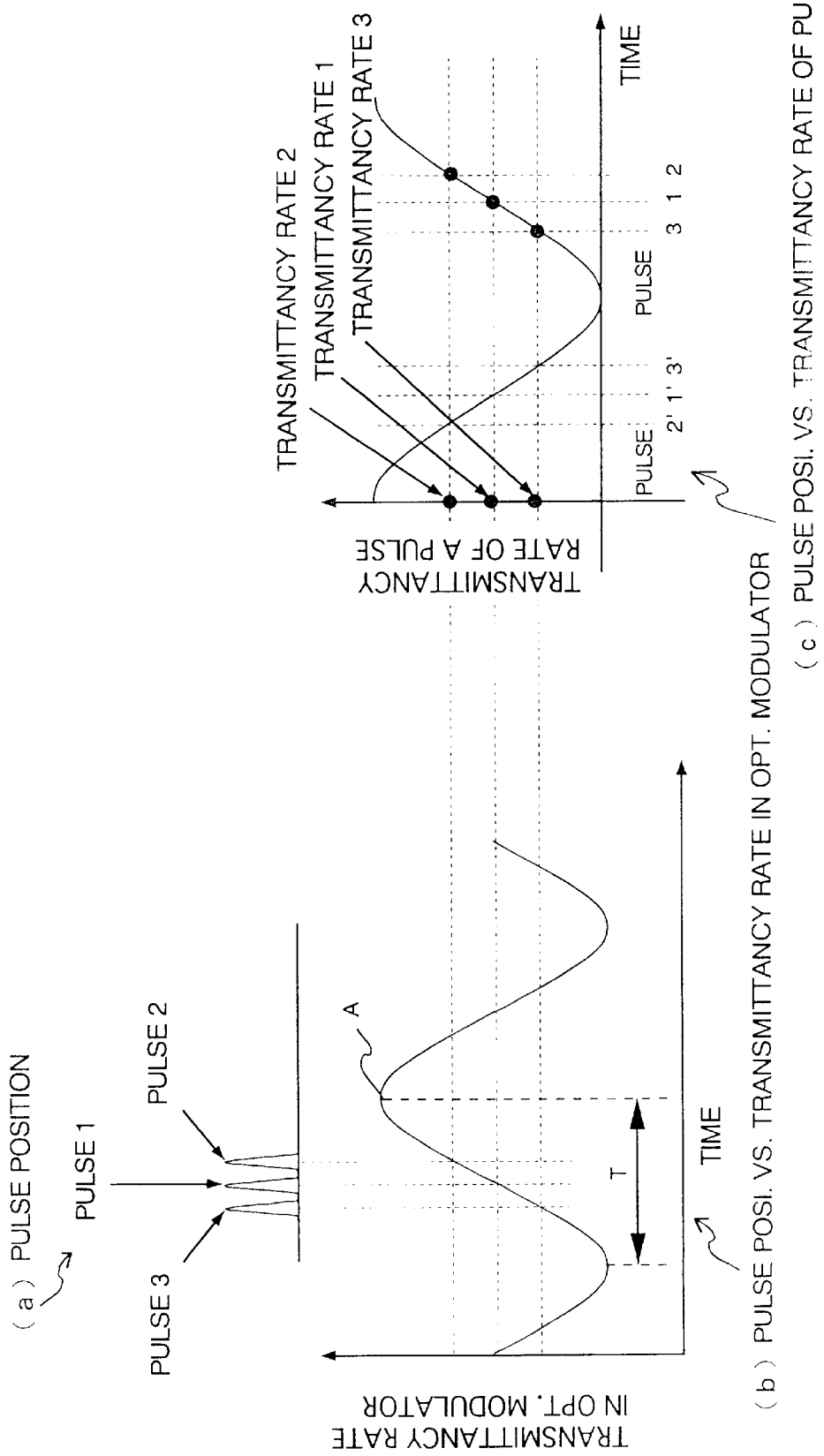
FIG. 44 shows an explanatory chart for FIG. 43.
Figure 45:
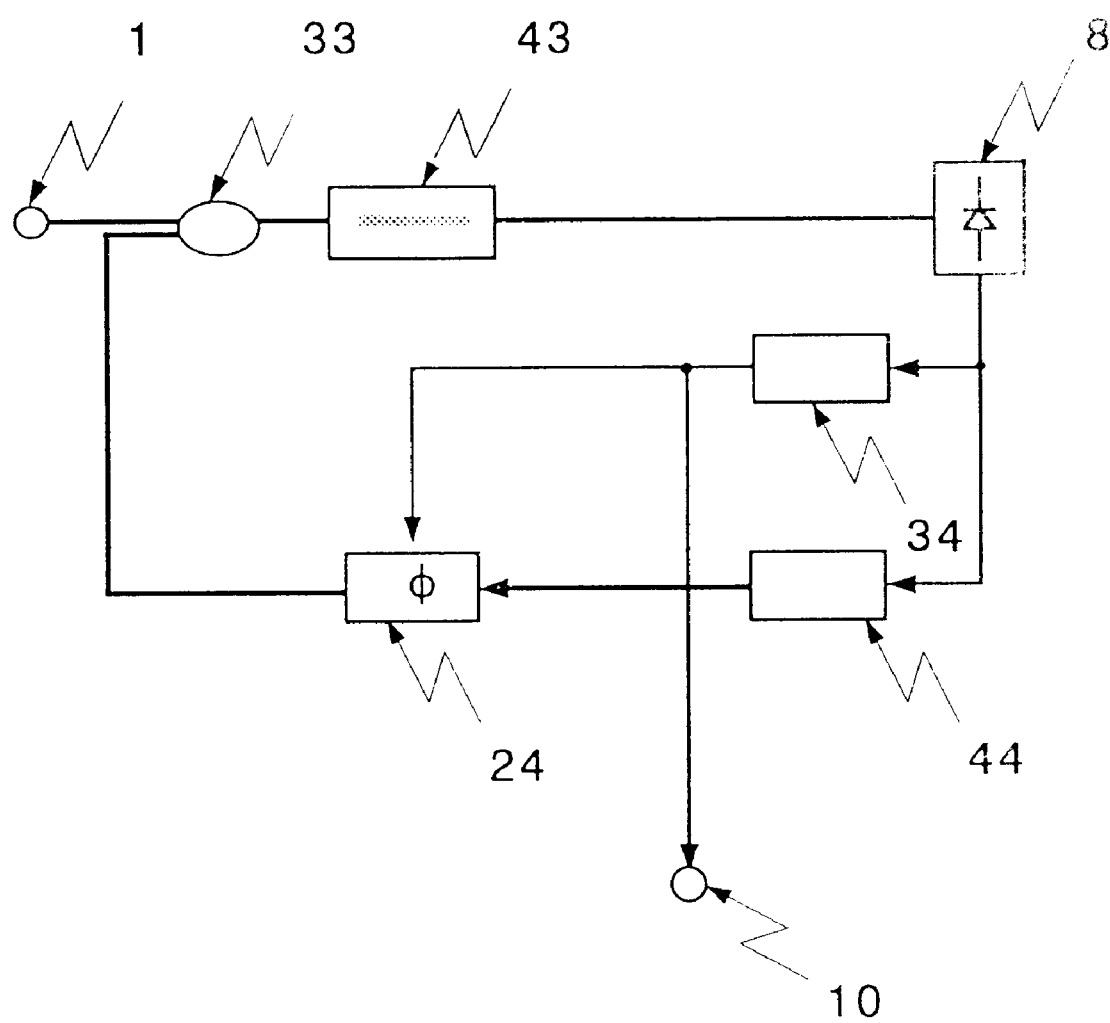
FIG. 45 shows a block chart for detecting pulse position.
Figure 46:
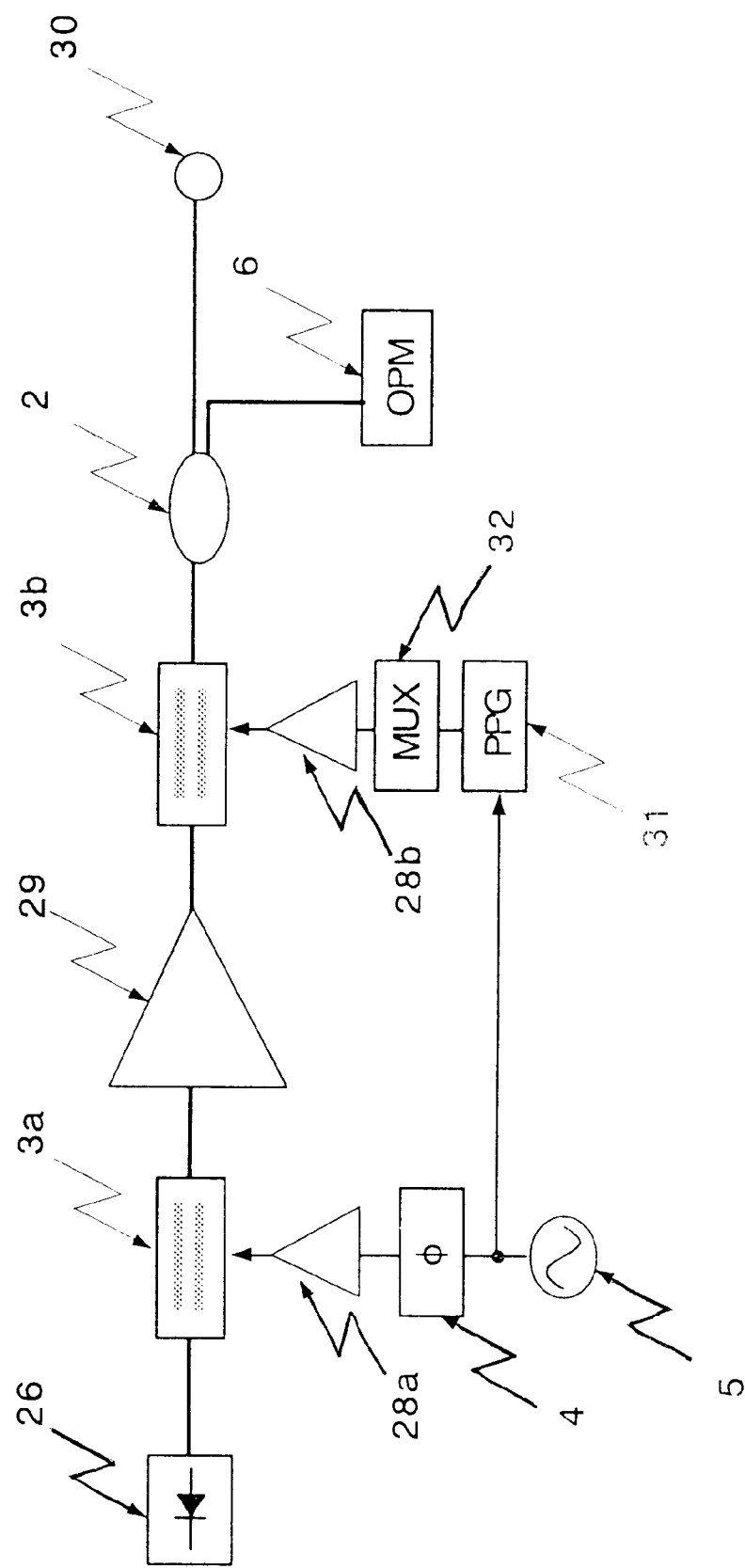
FIG. 46 shows a block chart for generating an optical pulse.
Figure 47:
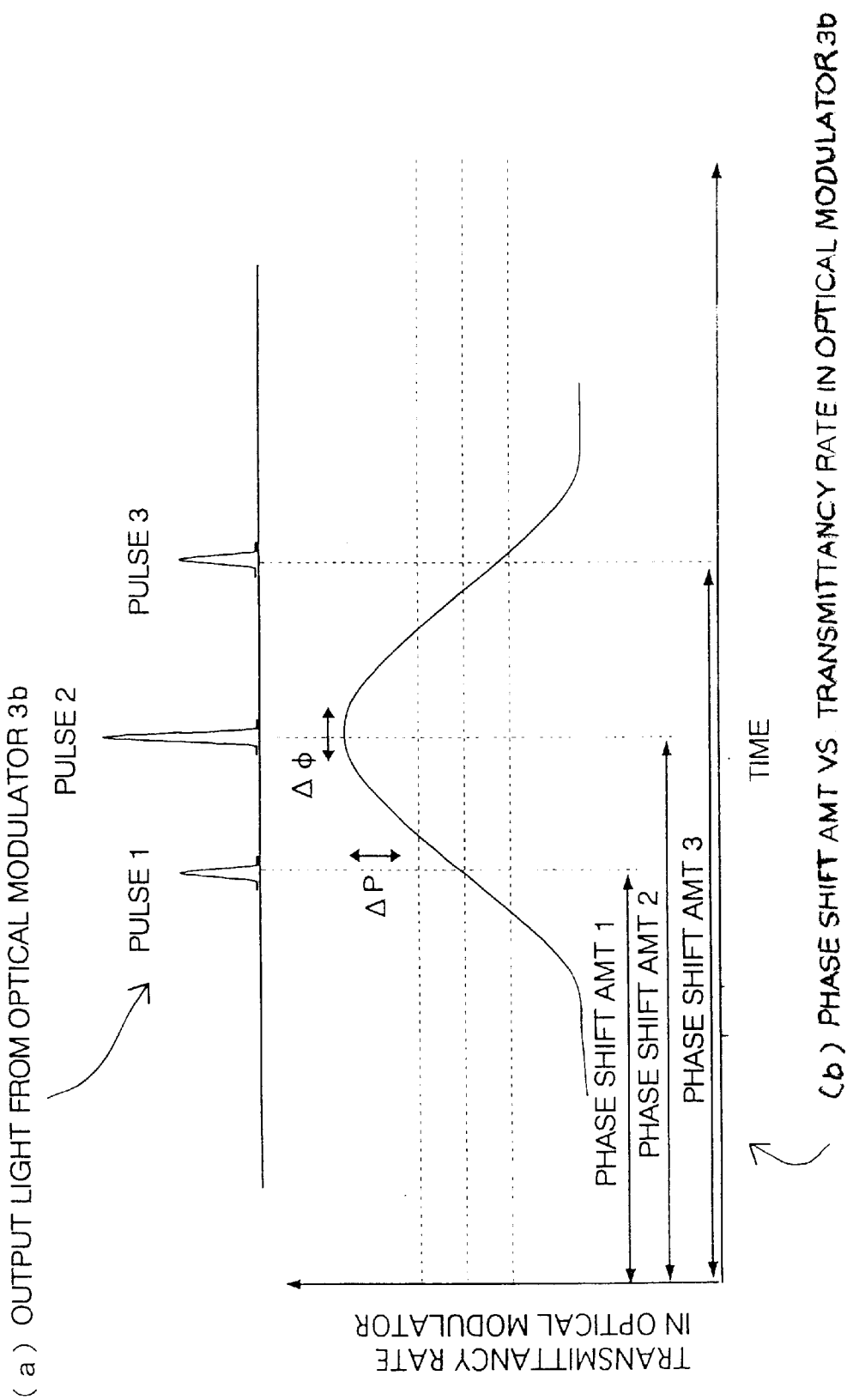
FIG. 47 shows an explanatory chart for FIG. 46.

For example, as shown in FIG. 42, controlling may be performed to make the polarization scramble signal S to zero at a center of each bit of the data signal D. When the polarization scramble signal S crosses a zero level, polarization is switched. Accordingly, polarization is switched at a center of each bit. The relationship of the phases can be changed by modifying the reference voltage in the amplifier 21.

In this discussion, it is assumed that the optical amplifier 29 causes uncertain fluctuations of the phases. It is assumed that connection lines for the electric signals and an optical line between an output from the polarization scrambler to the photo detector are short enough and the fluctuations can be ignored. Therefore, even when an optical signal inputted to the polarization scrambler 95 is branched by the optical multiplexer 2 and inputted the photo detector 8, a same effect can be achieved. When such fluctuations cannot be ignored, the adder 100 is provided to input the offset voltage V as in FIG. 35.

According to the optical pulse position detecting circuit and method discussed, for example, in connection with FIG. 1, an optical pulse string is inputted to the optical modulator and a phase of an electric clock signal for driving the optical modulator is controlled to maximize an optical signal power outputted from the optical modulator. Since a phase shift amount for maximizing an optical signal power is outputted from the optical modulator, an optical pulse position can be detected accurately.

According to the optical pulse position detecting circuit and method discussed, for example, in connection with FIG. 6, an optical pulse string is inputted to the optical modulator and a dither signal is superimposed on a phase of an electric clock signal for driving the optical modulator. Then, synchronization of a dither signal element extracted from an optical signal outputted from the optical modulator and the dither signal superimposed on the electric clock signal is detected and a feed back is outputted from detecting synchronization to the phase shifter. Accordingly, the phase shift amount of the phase shifter is controlled to maximize an optical power outputted from the optical modulator. Since a phase shift amount for maximizing an optical signal power from the optical modulator is outputted, an optical pulse position can be detected accurately.

According to the optical pulse position detecting circuit in FIG. 13, a repetitive ratio of an optical pulse string is changed and a relationship of the repetitive ratio of the optical pulse string and a phase shift amount is operated. Accordingly, a transmission time of the optical pulse string in a transmission line can be detected for a dynamic range.

According to the optical pulse position detecting circuit in FIG. 14, a semiconductor electro-absorption type optical modulator is used as the optical modulator. Therefore, a pulse position can be detected more accurately.

According to the optical pulse generating apparatus and method discussed in connection with FIG. 17, a phase of an optical signal is changed to maximize an output from the photo detector. Therefore, a feedback control is performed to optimize a phase change amount constantly. Since the first optical modulator and the second optical modulator are synchronized at this time, an optical pulse with a short width can be outputted.

According to another aspect of the optical pulse generating apparatus and method of the present invention, a dither signal element is added to a phase change amount and synchronization of the dither signal element extracted from an optical signal outputted from the optical modulator and the dither signal is detected. Then, a feedback of an output from detecting synchronization is performed. Therefore, a maximum optical signal power is outputted from the optical modulator.

According to another aspect of the optical pulse generating apparatus of the present invention, the phase shifter controlling circuit receives a dither signal and an output from the phase comparator and controls the phase shifter to shift a phase of a signal for driving the second optical modulator to maximize an output from the photo detector. Therefore, a phase shift amount is constantly optimized by feedback controlling. Since the first and second optical modulators synchronize, an optical pulse with a short width can be outputted.

When a fluctuation in a transmission delay time of an optical pulse signal inputted to the second optical modulator is compensated, a phase of an outputted optical pulse can be kept constant.

According to another aspect of the optical pulse generating apparatus of the present invention, the optical delayer controlling circuit receives the dither signal and the output from the phase comparator and controls the optical delayer for delaying an optical signal inputted to the second optical modulator to maximize an output from the photo detector.

Therefore, a feedback control is performed to optimize the delay time constantly. Since the first and second optical modulators synchronize, an optical pulse with a short pulse width can be outputted.

When a fluctuation in a transmission delay time of an optical pulse signal inputted to the second optical modulator is compensated, a phase of an outputted optical pulse can be kept constant.

According to another aspect of the optical pulse generating apparatus of the present invention, a dither signal is superimposed on a phase of a signal for driving the first and second optical modulators and the optical delayer for delaying an optical signal inputted to the second optical modulator is controlled to maximize an output from the photo detector. Since the dither signal is superimposed on the phase shifter, a device with a low response can be used as the optical delayer.

According to another aspect of the optical pulse generating apparatus of the present invention, an optical signal is transmitted to the optical modulator twice and the optical pulse inputted to the optical modulator and a driving signal of the optical modulator are synchronized. Therefore, an optical pulse with a short width can be outputted.

Since only a single optical modulator is necessary, a configuration can be simplified.

According to the optical pulse generating apparatus discussed in connection with FIG. 27, an optical pulse outputted from a first light source and an optical pulse outputted from a second light source can be modulated to short pulses simultaneously. Therefore, optical pulses with two wavelengths can be outputted.

According to the optical pulse generating apparatus discussed in connection with FIG. 28, a phase shift amount of the phase shifter is controlled by a feed-forward control to compensate a fluctuation in a predicted delay time based on an output signal from the temperature drift detecting circuit. Therefore, an optical pulse with a short width can be outputted more accurately in a dynamic range. Further, the optical pulse generating apparatus can operate in a wider temperature range.

According to the optical pulse generating apparatus discussed in connection with FIG. 29, a phase shift amount of the phase shifter is controlled by a feed-forward control to compensate a fluctuation in a predicted delay time based on an output signal from the wavelength drift detecting circuit. Therefore, an optical pulse with a short width can be outputted more accurately in a dynamic range.

According to the optical pulse generating apparatus discussed in connection with FIG. 30, the semiconductor electro-absorption type optical modulator is used as the optical modulator. Therefore, an optical pulse with a shorter width can be outputted.

According to the optical pulse generating apparatus discussed in connection with FIG. 21, optical pulses are processed in parallel. Therefore, a plurality of optical pulse strings can be outputted.

According to the optical pulse generating apparatus discussed in connection with FIG. 22, an optical signal is processed serially. Therefore, an optical pulse string with short pulses can be outputted.

According to another aspect of the optical pulse generating apparatus and method of the present invention, a phase of a re-generating clock signal extracted from an optical signal inputted to the first or second optical modulator and a phase of an electric clock signal for driving the first or second optical modulator are controlled to be matched. Accordingly, the first and second optical modulators synchronize, and an optical pulse with a short pulse width can be outputted.

According to another aspect of the optical pulse generating apparatus and method of the present invention, the phases of the re-generating clock signal and the electric clock signal are compared and a fluctuation in a delay time is detected. Therefore, a highly accurate control circuit can be realized with a simple configuration.

According to another aspect of the optical pulse generating apparatus of the present invention, the phase shifter controlling circuit receives an output from the phase comparator and controls the phase shifter for shifting a phase of a driving signal for the optical modulator. Therefore, a phase shift amount is constantly optimized.

According to another aspect of the optical pulse generating apparatus in the present invention, the optical delayer controlling circuit receives an output from the phase comparator and controls the phase delayer for delaying an optical signal inputted to the optical modulator. Therefore, a delay time is constantly optimized.

According to another aspect of the optical pulse generating apparatus of the present invention, the optical modulator modulates with a data signal and outputs a modulated optical pulse.

According to another aspect of the optical pulse generating apparatus of the present invention, a phase of an electric clock signal for driving the polarization scrambler and a phase data can be synchronized in determined relationship. Therefore, an opening of an eye can be enlarged to be an advantage for distinguishing a signal even if an amplitude fluctuates at a receiving terminal due to a fiber dispersion and a change in non-linear reflective rate.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. An optical pulse position detecting circuit comprising:
    an optical pulse string input terminal receiving an optical pulse string with a determined repetitive cycle;
    an oscillator for outputting an electric clock signal with a same frequency as the repetitive cycle of the optical pulse string;
    a phase shifter for receiving the electric clock signal output from the oscillator, shifting a phase of the electric clock signal, and outputting a shifted electric clock signal;
    an optical modulator for receiving the shifted electric clock signal output from the phase shifter and the optical pulse string received by the optical pulse string input terminal, modulating the optical pulse string based on the electric clock signal and outputting a modulated optical signal;
    an optical detector for converting the modulated optical signal output from the optical modulator to an electric signal and outputting the electric signal;
    a phase controlling circuit for receiving the electric signal output from the optical detector and controlling a phase shift amount of the phase shifter to maximize an output from the optical detector; and
    a phase shift amount output terminal for outputting the phase shift amount of the phase shifter.

2. The optical pulse position detecting circuit of claim 1, wherein the phase controlling circuit comprises:
    a dither signal generating circuit for outputting a dither signal;
    a phase comparator for detecting synchronization of the output from the optical detector and the dither signal output from the dither signal generating circuit and outputting an error signal; and
    a phase shifter controlling circuit for superimposing the dither signal output from the dither signal generating circuit and the error signal output from the phase comparator, and outputting a control signal for controlling the phase shift amount of the phase shifter.

3. The optical pulse position detecting circuit of claim 1, further comprising:
    an optical pulse string generating light source driven by the electric clock signal output from the oscillator;
    a transmission line connecting the optical pulse string generating light source and the optical pulse string input terminal,
    wherein the oscillator further outputs electric clock signals at two or more frequencies; and
    a transmission time detecting circuit receiving the phase shift amount output from the phase shift amount output terminal and detecting a transmission time of an optical pulse in the transmission line based on the frequency of the electric clock signal output from the oscillator.

4. The optical pulse position detecting circuit of claim 1, wherein the optical modulator includes a semiconductor electric field absorbing type optical modulator.

5. An optical pulse generating circuit comprising:
    a light source for outputting an optical signal with a determined wavelength;
    an oscillator for outputting an electric clock signal with a determined frequency;
    a first optical modulator connected to the oscillator for modulating a power of the optical signal based on an electric clock signal and outputting a first modulated optical signal;
    a second optical modulator for modulating a power of the first modulated optical signal output from the first optical modulator based on the electric clock signal and outputting a second modulated optical signal;
    an optical multiplexer, receiving one of the first modulated optical signal and the second modulated optical signal, outputting a part of the optical signal and branching a part of the optical signal;
    an optical detector for converting the optical signal multiplexed by the optical multiplexer to an electric signal;
    a phase changing unit for changing a phase of the signal; and
    a controlling circuit for receiving the electric signal output from the optical detector and controlling a phase change amount of the phase changing unit to maximize the output from the optical detector.

6. The optical pulse generating apparatus of claim 5, wherein the controlling circuit comprises:
    a dither signal generating circuit for outputting a dither signal;
    a phase comparator for detecting synchronization of the output from the optical detector and the dither signal output from the dither signal generating circuit and outputting an error signal; and
    a circuit for superimposing the dither signal output from the dither signal generating circuit and the error signal output from the phase comparator and outputting a control signal for controlling the phase change amount of the phase changing unit.

7. The optical pulse generating apparatus of claim 5, wherein the phase changing unit comprises a phase shifter for shifting a phase of the electric clock signal output from the oscillator and outputting the electric clock signal to one of the first optical modulator and the second optical modulator, wherein the controlling circuit comprises a phase shifter controlling circuit for controlling the phase shift amount of the phase shifter.

8. The optical pulse generating apparatus of claim 5, wherein the phase changing unit comprises an optical delayer for delaying the optical signal output from the first optical modulator and outputting the optical signal to the second optical modulator, wherein the controlling circuit comprises a delay controlling circuit for controlling a delay amount of the optical delayer.

9. The optical pulse generating apparatus of claim 8, wherein the first and second optical modulators are configured in a single optical modulator, wherein the light source outputs an optical signal in a first polarization condition, wherein the optical pulse generating apparatus, further comprises:

a first polarization multiplexer/demultiplexer connected between the light source and the single optical modulator;

a single polarization multiplexer/demultiplexer connected between the single optical modulator and the optical delayer; and a polarization condition converter for converting a polarization condition of the optical signal output from the optical delayer and outputting to the second polarization multiplexer/demultiplexer, wherein the optical multiplexer outputs a part of the optical signal output from the first polarization multiplexer/demultiplexer with a converted polarization condition and branches a part of the optical signal via the second polarization multiplexer/demultiplexer, the optical modulator and the first polarization multiplexer/demultiplexer.

10. The optical pulse generating apparatus of claim 5, wherein the phase changing unit comprises:

a phase shifter for shifting a phase of the electric clock signal output from the oscillator and outputting to one of the first optical modulator and the second optical modulator; and an optical delayer for delaying an optical signal output from the first optical modulator and outputting to the second optical modulator, wherein the controlling circuit comprises a delay controlling circuit for controlling a delay amount of the optical delayer, wherein the phase shifter receives a dither signal and shifts a phase of the electric clock signal output from the oscillator.

11. The optical pulse generating apparatus of claim 5, wherein:

the light source includes a first light source for outputting a first optical signal with a first wavelength and a second light source for outputting a second optical signal with a second wave-length and further comprising:

first and third optical modulators corresponding to the first and second light sources; and an optical demultiplexer for demultiplexing optical signals output from the first and third optical modulators and outputting to the second optical modulator.

12. The optical pulse generating apparatus of claim 5 comprising:

a temperature detecting circuit for detecting a temperature in an apparatus;

a standard voltage generator; and a temperature drift detecting circuit for receiving an output signal from the temperature detecting circuit and an output signal from the standard voltage generator, generating a compensation signal for compensating the phase change amount and outputting the compensation signal to the controlling circuit.

13. The optical pulse generating apparatus of claim 5, comprising:

a wavelength detecting circuit for detecting a wavelength of the optical signal output from the light sources;

a standard voltage generator; and a wavelength drift detecting circuit for receiving an output signal from the wavelength detecting circuit and an output signal from the standard voltage generator, generating a compensation signal for compensating the phase change amount and outputting the compensation signal to the controlling circuit.

14. The optical pulse generating apparatus of claim 5, wherein the optical modulator is a semi-conductor electric field absorbing type optical modulator.

15. The optical pulse generating apparatus of claim 5, wherein a plurality of sets of the second optical modulator, the phase changing unit, the optical detector and the controlling circuit is provided in parallel, wherein an optical signal output from the first optical modulator is branched and processed in parallel.

16. The optical pulse generating apparatus of claim 5, wherein a plurality of sets of the second optical modulator, the phase changing unit, the optical detector and the controlling circuit is provided serially, wherein an optical signal output from the first optical modulator is processed serially.

17. An optical pulse position detecting method comprising:

inputting an optical pulse string with a determined repetitive cycle;

oscillating an electric clock signal with a same frequency with the repetitive cycle of the optical pulse string and outputting an oscillated electric clock signal;

shifting a phase of the oscillated electric clock signal and outputting a shifted electric clock signal;

modulating the optical pulse string based on the shifted electric clock signal;

converting the optical signal output from the modulating step to an electric signal and outputting the electric signal;

controlling, in response to the electric signal, a phase shift amount in the shifting step to maximize the electric signal output from the converting step; and outputting the phase shift amount for the shifting step.

18. The optical pulse position detecting method of claim 17, wherein the controlling step comprises:

generating a dither signal;

detecting synchronization of the electric signal and the dither signal and outputting an error signal; and superimposing the dither signal and the error signal, and outputting a control signal for controlling the phase shift amount in the shifting step.

19. An optical pulse generating method comprising:

outputting an optical signal with a determined wavelength;

outputting an electric clock signal with a determined frequency;

first modulating a power of the optical signal based on the electric signal and outputting a first modulated optical signal;

second modulating a power of the optical signal based on the electric signal and outputting a second modulated optical signal;

multiplexing one of the first modulated optical signal and the second modulated optical signal, outputting a part of a multiplexed optical signal and branching a part of the multiplexed optical signal;

converting the multiplexed optical signal to an electric signal;

changing a phase of the optical signal; and controlling, in accordance with the electric signal, a phase change amount in the changing step to maximize the electric signal output from the converting step.

20. The optical pulse generating method of claim 19, wherein the controlling step comprises:

generating a dither signal;

detecting synchronization of the electric signal and the dither signal and outputting an error signal; and superimposing the dither signal and the error signal outputted in the phase comparing step, and outputting a control signal for controlling a phase change amount in the changing step.

* * * * *

UNITED STATES PATENT AND TRADEMARK OFFICE
CERTIFICATE OF CORRECTION

PATENT NO. : 6,236,488 B1
DATED : May 22, 2001
INVENTOR(S) : Katsuhiro Shimizu et al.

It is certified that error appears in the above-identified patent and that said Letters Patent is hereby corrected as shown below:

<u>Title page,</u>
Item [56], References Cited, FOREIGN PATENT DOCUMENTS, delete "2001928A" and add -- 2001828A --

Signed and Sealed this

Twentieth Day of July, 2004

JON W. DUDAS
*Acting Director of the United States Patent and Trademark Office*

(12) EX PARTE REEXAMINATION CERTIFICATE (4957th)
United States Patent
Shimizu et al.

(10) Number: US 6,236,488 C1
(45) Certificate Issued: Jul. 6, 2004

(54) OPTICAL PULSE POSITION DETECTING CIRCUIT AND AN OPTICAL PULSE GENERATING APPARATUS AND THEIR METHODS

(75) Inventors: Katsuhiro Shimizu, Tokyo (JP); Takashi Mizuochi, Tokyo (JP); Takeshi Komiya, Tokyo (JP); Kiwami Matsushita, Tokyo (JP); Tadayoshi Kitayama, Tokyo (JP); Masatoshi Suzuki, Tokyo (JP); Hidenori Taga, Tokyo (JP); Shu Yamamoto, Tokyo (JP); Noboru Edagawa, Tokyo (JP); Itsuro Morita, Tokyo (JP)

(73) Assignees: Mitsubishi Denki Kabushiki Kaisha, Tokyo (JP); Kokusai Denshin Denwa Co., Ltd., Tokyo (JP)

Reexamination Request:
No. 90/006,540, Feb. 6, 2003

Reexamination Certificate for:
Patent No.: 6,236,488
Issued: May 22, 2001
Appl. No.: 09/052,072
Filed: Mar. 31, 1998

(30) Foreign Application Priority Data

Mar. 31, 1997 (JP) .............................................. 9-080069
Aug. 8, 1997 (JP) .............................................. 9-214215

(51) Int. Cl.$^7$ .............................................. H04B 10/04
(52) U.S. Cl. ........................ 398/198; 398/154; 398/183; 398/209; 398/9; 398/163; 398/191; 398/193
(58) Field of Search .................................. 398/183, 188, 398/189–191, 154, 195, 163, 202, 209; 375/239, 340

(56) References Cited

U.S. PATENT DOCUMENTS 6,445,478 B2 * 9/2002 Shimizu et al. ............. 398/192

FOREIGN PATENT DOCUMENTS

JP 9-181683 A 7/1997

* cited by examiner

*Primary Examiner*—Kinfe-Michael Negash

(57) ABSTRACT

Detection of an optical pulse position uses an optical pulse string with a determined repetitive ratio and an electric clock signal with a same frequency as the repetitive ratio of the optical pulse string. A phase of the electric clock signal oscillator is shifted and supplied to an optical modulator. The optical modulator modulates the optical pulse string based on the electric clock signal and outputs a modulated optical signal. A photo detector converts the modulated optical signal output from the optical modulator to an electric signal. The phase shift amount of the electric clock signal is controlled to maximize an output from the photo detector. Additionally, a dither signal may be used in the control of the phase shift, more than the optical modulator may be employed, and/or more than color light source may be employed. The use of at least one of feed forward and feedback control provided by maximizing an output of the photo detector allows an optical pulse having a short width to be realized.

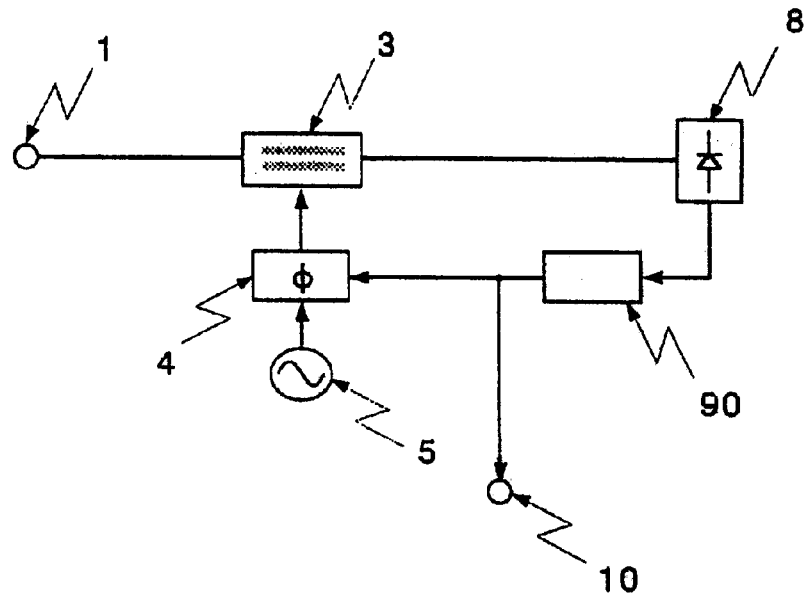

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *